(12) United States Patent
Nichols et al.

(10) Patent No.: US 12,546,071 B1
(45) Date of Patent: Feb. 10, 2026

(54) HANGER WITH POSITIONING TAB AND OPPOSED ARMS

(71) Applicant: Ameristar Perimeter Security USA Inc., Tulsa, OK (US)

(72) Inventors: Robert W Nichols, Owasso, OK (US); Fred L Givens, Tulsa, OK (US); Bryan L Hudson, Beggs, OK (US)

(73) Assignee: Ameristar Perimeter Security USA Inc., Tulsa, OK (US)

( * ) Notice: Subject to any disclaimer, the term of this patent is extended or adjusted under 35 U.S.C. 154(b) by 0 days.

(21) Appl. No.: 18/393,709

(22) Filed: Dec. 22, 2023

Related U.S. Application Data

(62) Division of application No. 16/440,195, filed on Jun. 13, 2019, now Pat. No. 11,851,833.

(60) Provisional application No. 62/684,787, filed on Jun. 14, 2018.

(51) Int. Cl.
*E01F 15/06* (2006.01)

(52) U.S. Cl.
CPC .................................. *E01F 15/06* (2013.01)

(58) Field of Classification Search
CPC ... E01F 15/06; E01F 15/02; F16L 3/00; F16L 3/006; F16L 3/02; F16L 3/08; F16L 3/22; E04H 17/1447; E04H 17/143
USPC ..... 248/686, 688, 56, 66, 87, 156, 152, 174, 248/247, 218.4, 219.1, 219.2, 219.3, 248/219.4; 256/13.1, 65.14, 1, 23
See application file for complete search history.

(56) References Cited

U.S. PATENT DOCUMENTS

| | | | | |
|---|---|---|---|---|
| 340,311 | A | | 4/1886 | Hayden |
| 558,418 | A | | 4/1896 | Pitney et al. |
| 2,299,674 | A | * | 10/1942 | Austin, Jr. ............. H02G 3/125 |
| | | | | 220/3.9 |
| 2,518,004 | A | | 8/1950 | Greenwell |
| 2,879,964 | A | * | 3/1959 | Anderson ............... H01F 27/06 |
| | | | | 248/219.3 |
| 3,486,739 | A | | 12/1969 | Nelson et al. |
| 3,879,017 | A | * | 4/1975 | Maxcy .................. E04F 11/181 |
| | | | | 256/22 |
| 3,910,561 | A | * | 10/1975 | Fornells .............. E04H 17/1408 |
| | | | | 403/386 |
| 4,028,489 | A | * | 6/1977 | Berg, Jr. ............... H01B 17/145 |
| | | | | 174/166 R |
| 4,037,788 | A | | 7/1977 | Riley |
| D265,050 | S | * | 6/1982 | Riedl ............................. D8/354 |
| 4,599,488 | A | * | 7/1986 | Wilson, Jr. ........... H01B 17/145 |
| | | | | 174/158 F |

(Continued)

*Primary Examiner* — Eret C McNichols
(74) *Attorney, Agent, or Firm* — Gary Peterson

(57) ABSTRACT

A barrier is formed from one or more intermediate posts situated between a pair of end posts. Long flexible cables interconnect the end posts and extend adjacent each intermediate post. Each cable is wrapped one or more times around each post. End posts may include dual columns that permit cable windings around both columns. A spike embedded within the end of each cable enhances the purchase that can be gained by a clamp that presses the cable against the end post. The clamp has contact elements with converging side walls that grip the cable near the spike. To maintain the spike in place, a wire rope clip grips the cable over a constriction in its contained spike. Each cable is enclosed by a cable cover extending between adjacent posts. The cable cover is suspended at each post by a pair of tiltable hangers.

13 Claims, 56 Drawing Sheets

(56) References Cited

U.S. PATENT DOCUMENTS

| | | | |
|---|---|---|---|
| 4,771,137 A * | 9/1988 | Thompson | H01B 17/145 174/172 |
| 4,899,991 A * | 2/1990 | Brunkan | E04H 17/1447 256/65.06 |
| 4,934,644 A * | 6/1990 | Nagy | H02G 3/105 24/339 |
| 4,982,932 A * | 1/1991 | Baker | E04H 17/12 256/48 |
| 5,355,642 A | 10/1994 | Palamarz | |
| D363,875 S * | 11/1995 | Korb | D8/373 |
| 5,775,676 A | 7/1998 | Hoggan | |
| 5,920,036 A * | 7/1999 | Egger | H01B 17/145 174/161 F |
| 5,941,497 A * | 8/1999 | Inoue | H01Q 1/125 248/514 |
| 5,971,345 A * | 10/1999 | Khalaf | H01Q 1/1228 343/890 |
| 6,378,821 B1 * | 4/2002 | McKelvy | H02B 5/02 248/219.4 |
| 6,517,280 B2 | 2/2003 | Carter | |
| 6,766,992 B1 * | 7/2004 | Parker | F16M 13/022 248/219.3 |
| 6,874,767 B1 | 4/2005 | Gibbs | |
| 6,969,034 B2 * | 11/2005 | Ware | H01G 2/04 248/230.9 |
| 7,111,815 B2 * | 9/2006 | Mettler | E04H 12/2246 248/519 |
| 7,188,826 B1 | 3/2007 | Gibbs | |
| 7,268,743 B2 * | 9/2007 | Lin | H01Q 1/125 343/882 |
| D562,115 S * | 2/2008 | Michaud | D8/364 |
| 7,339,549 B2 * | 3/2008 | Maxwell | H01Q 1/1228 343/890 |
| 7,364,137 B2 | 4/2008 | Neusch | |
| 7,388,156 B2 | 6/2008 | Knagge | |
| D572,374 S | 7/2008 | Gibbs | |
| 7,441,751 B1 | 10/2008 | Gibbs | |
| 7,604,221 B2 * | 10/2009 | Lass | E01F 15/0453 256/13.1 |
| 7,677,503 B2 * | 3/2010 | Michaud | H02G 3/123 248/300 |
| D625,168 S * | 10/2010 | Chen | D8/354 |
| 7,883,065 B2 * | 2/2011 | Nelson | F16M 11/2021 248/70 |
| 7,942,602 B2 | 5/2011 | Bunk et al. | |
| 7,950,870 B1 | 5/2011 | Thompson et al. | |
| 8,112,938 B2 | 2/2012 | Bolduc et al. | |
| 8,413,934 B2 * | 4/2013 | Hara | F16L 3/237 248/65 |
| 8,505,880 B2 | 8/2013 | Langenwalter | |
| 8,523,479 B2 | 9/2013 | Adler et al. | |
| 8,561,952 B2 * | 10/2013 | Pfeiler | F16M 11/045 396/428 |
| 8,631,551 B1 * | 1/2014 | Payne | E04H 17/1426 256/65.11 |
| 8,683,909 B1 * | 4/2014 | Copus | F41A 23/16 182/127 |
| 8,794,578 B2 * | 8/2014 | Lin | H01Q 1/125 343/890 |
| 8,834,057 B2 * | 9/2014 | Adams, Jr. | F16B 7/0493 403/233 |
| 8,910,925 B2 * | 12/2014 | Payne | E04H 17/24 256/45 |
| 9,080,691 B2 * | 7/2015 | Bartos | F16L 3/02 |
| 9,115,506 B2 * | 8/2015 | Hill | E04H 17/1417 |
| 9,136,681 B1 * | 9/2015 | Medlin, Jr. | H02G 3/32 |
| 9,273,802 B2 * | 3/2016 | Allendorf | F16L 3/2235 |
| 9,493,918 B1 | 11/2016 | Frey | |
| 9,837,185 B2 * | 12/2017 | Korczak | G02B 6/44785 |
| 9,976,674 B2 * | 5/2018 | Jolly | F16L 3/26 |
| 10,221,586 B2 * | 3/2019 | Mayer, Jr. | E04H 17/1488 |
| 10,233,601 B2 | 3/2019 | Gerrard et al. | |
| 10,260,538 B2 | 4/2019 | Keller | |
| 10,584,513 B2 * | 3/2020 | Boado | E04H 17/1417 |
| 10,826,155 B2 * | 11/2020 | Roy | H01Q 1/12 |
| 11,159,006 B2 * | 10/2021 | Heath | H01Q 1/1242 |
| D972,393 S * | 12/2022 | Karlsson | D8/354 |
| 11,781,282 B2 * | 10/2023 | Olah | E04F 11/1812 52/170 |
| 11,849,868 B2 * | 12/2023 | Li | F16B 12/42 |
| 11,891,831 B1 * | 2/2024 | Hudson | E04H 17/16 |
| 12,281,488 B2 * | 4/2025 | Gutierrez | E04H 17/1488 |
| 2006/0032990 A1 | 2/2006 | Cask | |
| 2006/0145131 A1 | 7/2006 | Purvis | |
| 2007/0132655 A1 * | 6/2007 | Lin | H01Q 1/12 343/882 |
| 2009/0188751 A1 * | 7/2009 | Gilliam | E04G 21/3276 182/112 |
| 2009/0230266 A1 * | 9/2009 | Hillstrom | F16M 13/022 248/219.4 |
| 2010/0314514 A1 * | 12/2010 | Nelson | F16M 11/2021 248/218.4 |
| 2011/0083399 A1 * | 4/2011 | Lettkeman | E04H 12/24 248/219.4 |
| 2011/0186795 A1 | 8/2011 | Bianchi | |
| 2011/0308887 A1 * | 12/2011 | Johnson | A01M 31/02 182/187 |
| 2012/0001041 A1 * | 1/2012 | Yang | H05K 5/0204 248/219.4 |
| 2012/0138758 A1 * | 6/2012 | Graber | E04H 17/1417 248/221.11 |
| 2012/0261529 A1 * | 10/2012 | Lettkeman | H01Q 1/125 248/231.71 |
| 2013/0207060 A1 | 8/2013 | Tonks et al. | |
| 2014/0008380 A1 * | 1/2014 | Zou | F16M 13/022 248/219.4 |
| 2014/0264220 A1 * | 9/2014 | Doyle | E04H 17/1417 256/65.06 |
| 2015/0034786 A1 * | 2/2015 | Huhn | F16M 13/02 248/300 |
| 2015/0123062 A1 | 5/2015 | Scullion | |
| 2015/0129822 A1 | 5/2015 | Wallace | |
| 2015/0197958 A1 | 7/2015 | Wilson | |
| 2015/0252941 A1 * | 9/2015 | Sirkin | E04H 17/1417 248/219.4 |
| 2016/0178115 A1 * | 6/2016 | Kho | H01Q 1/1228 248/219.4 |
| 2020/0278052 A1 * | 9/2020 | Meyer | F16L 3/24 |
| 2022/0133061 A1 * | 5/2022 | Li | A47B 96/06 52/36.5 |

* cited by examiner

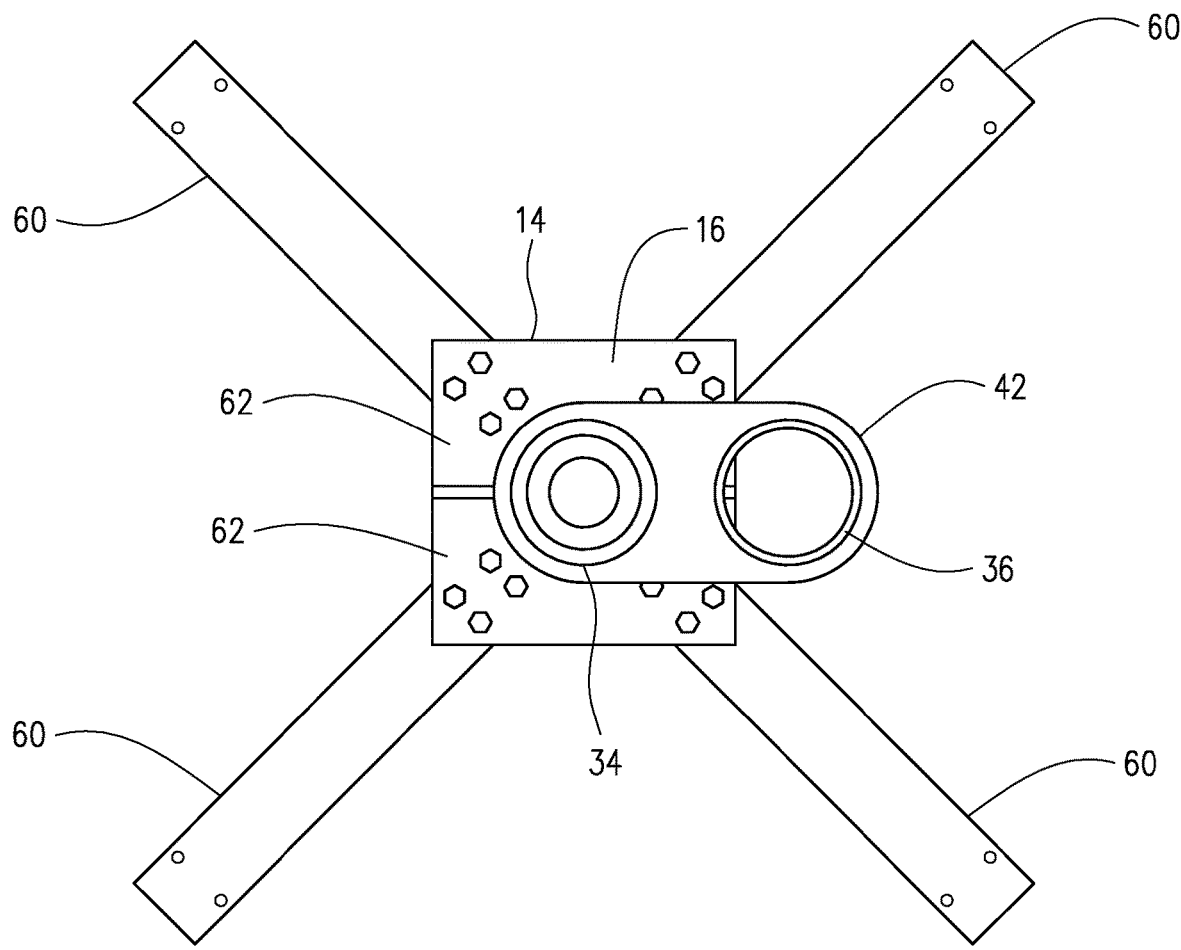
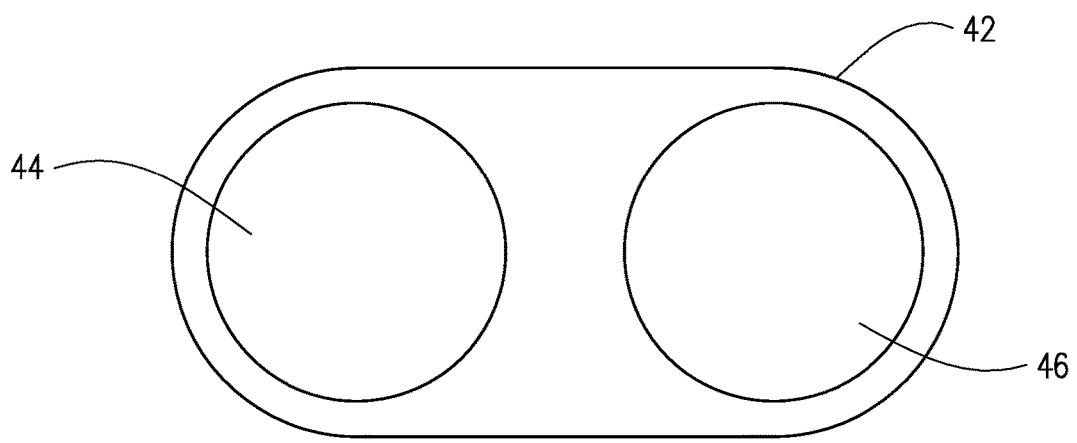

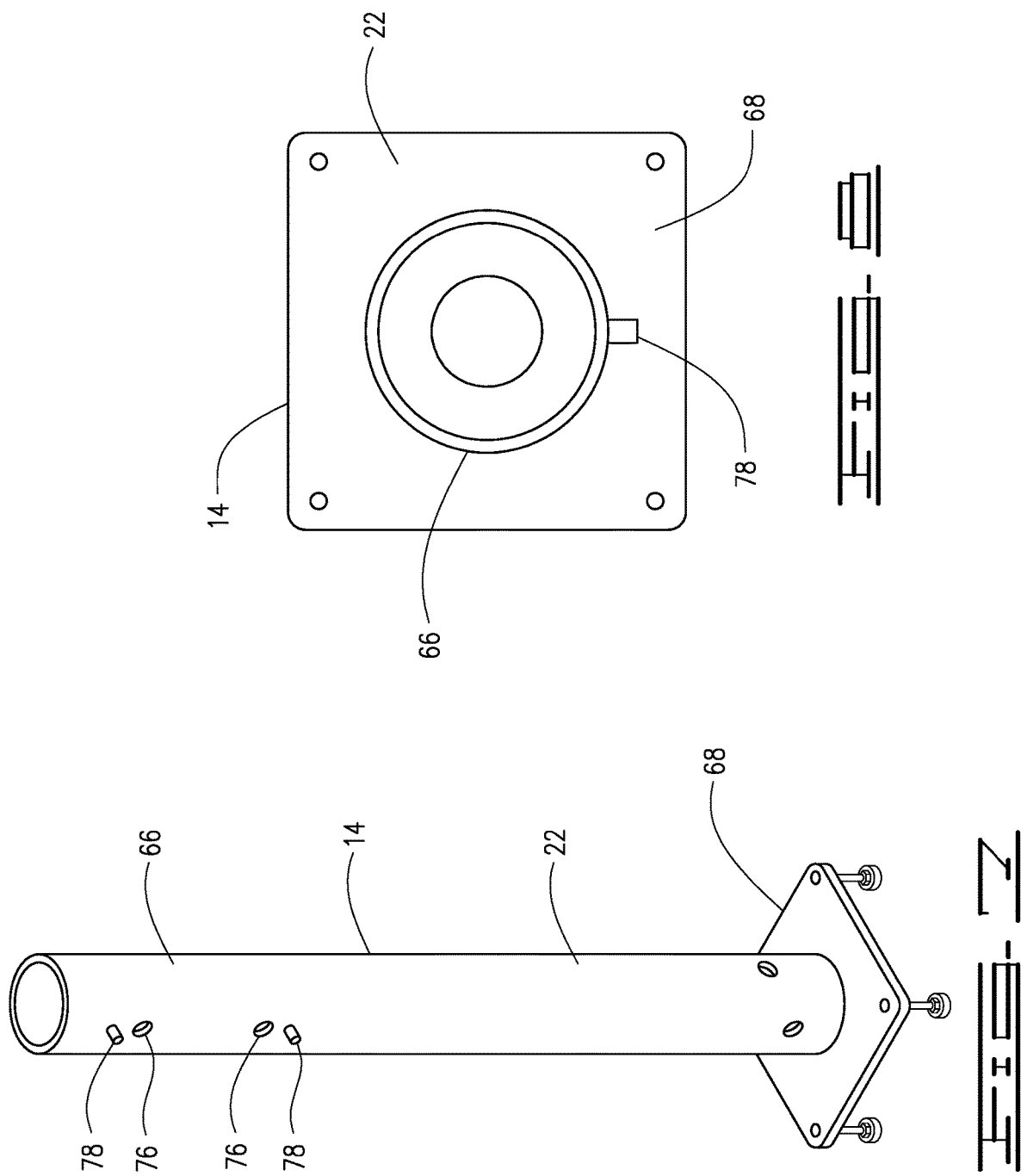

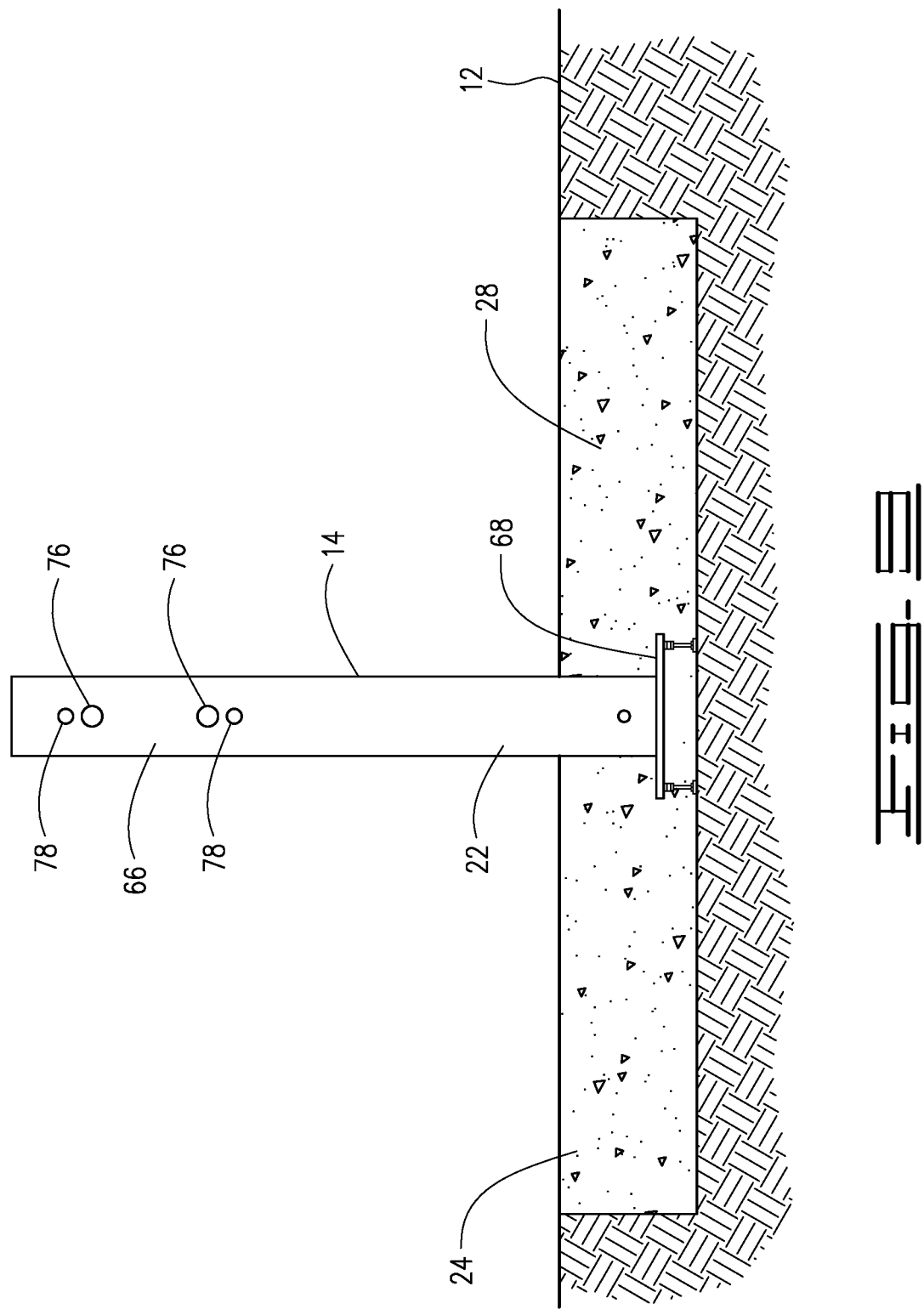

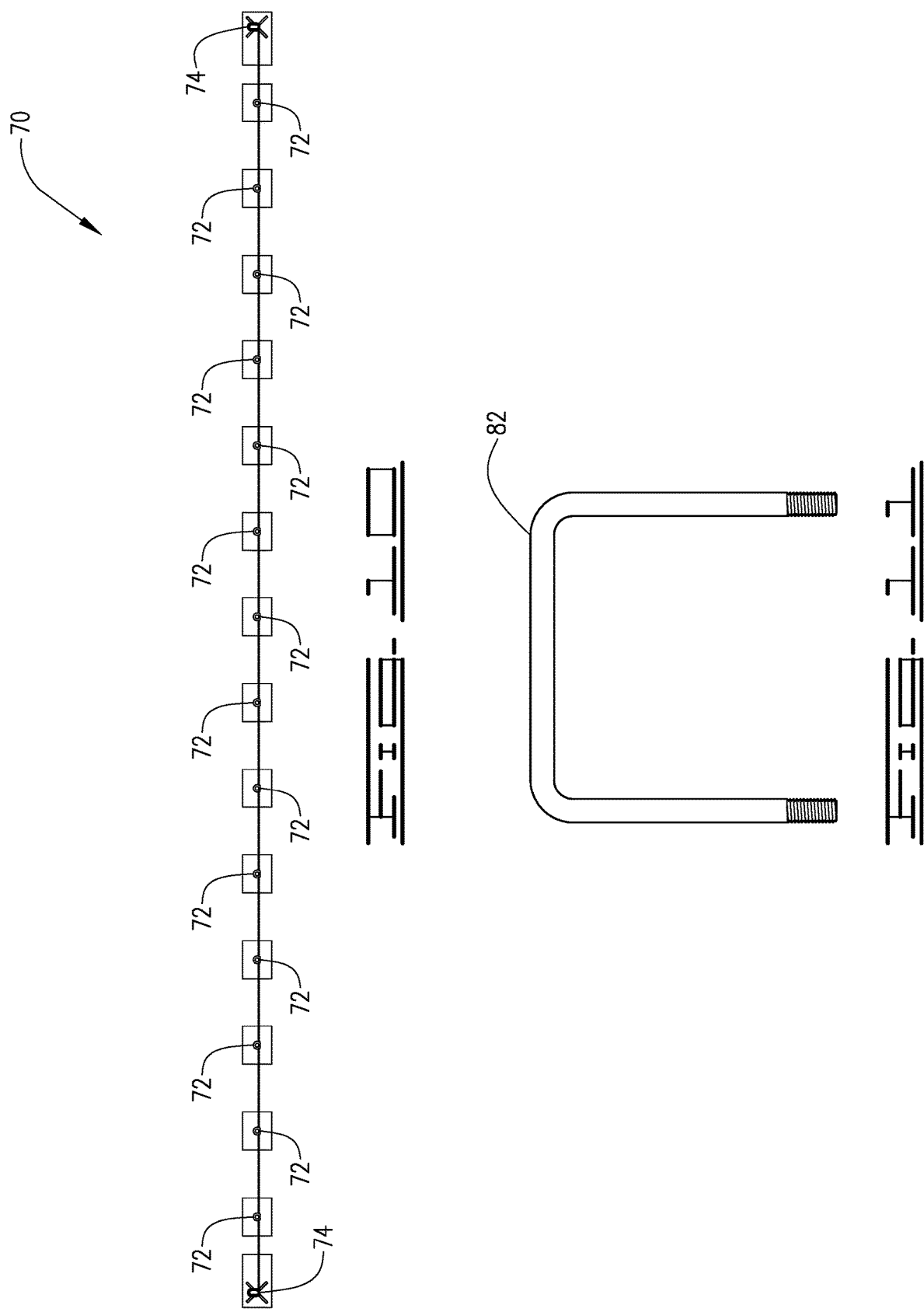

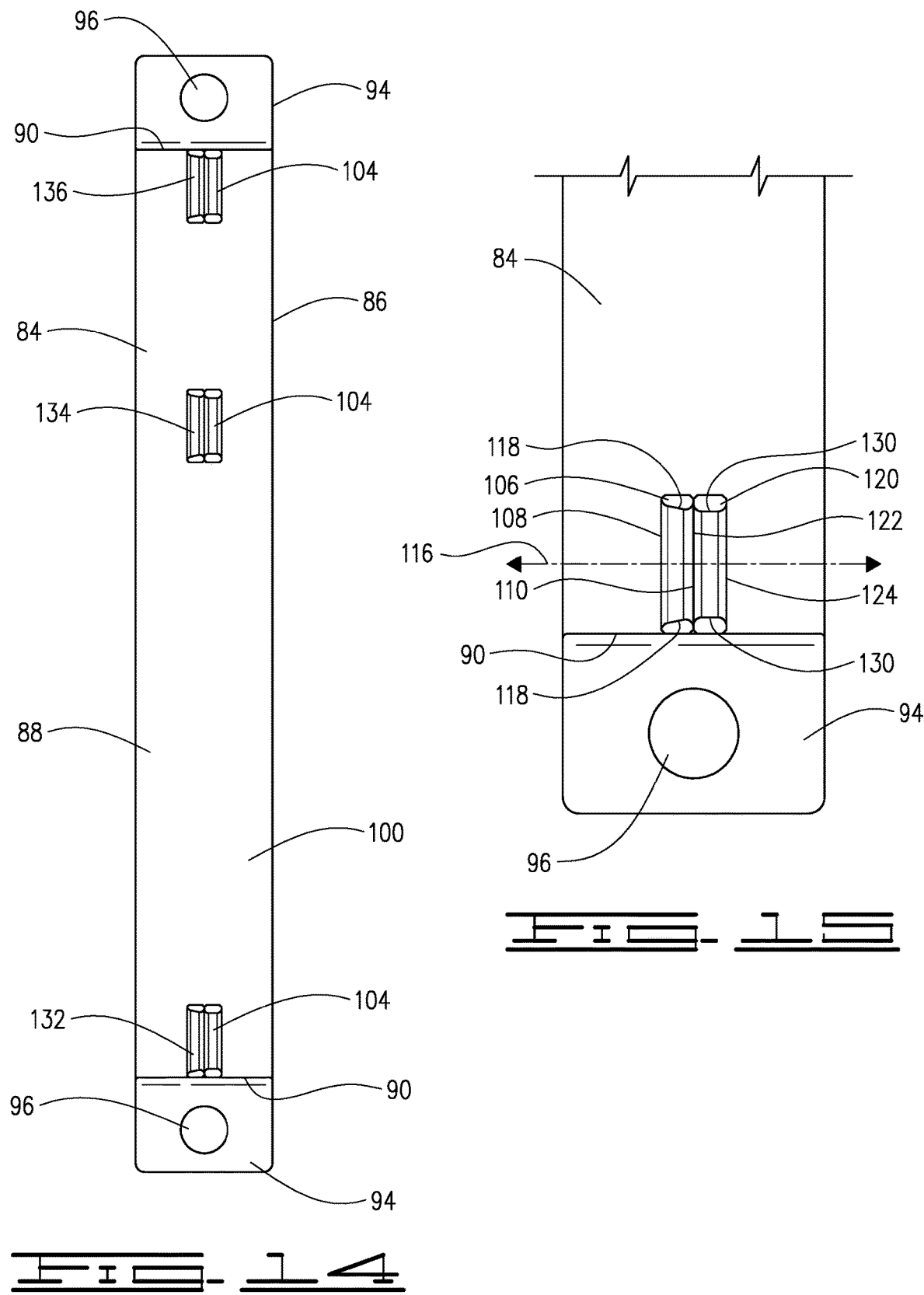

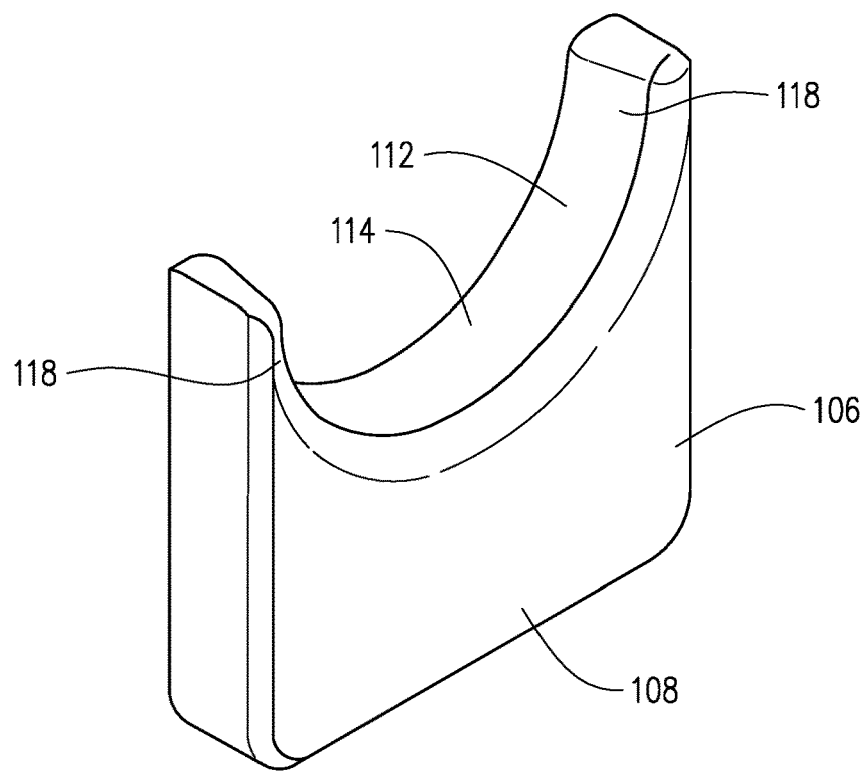
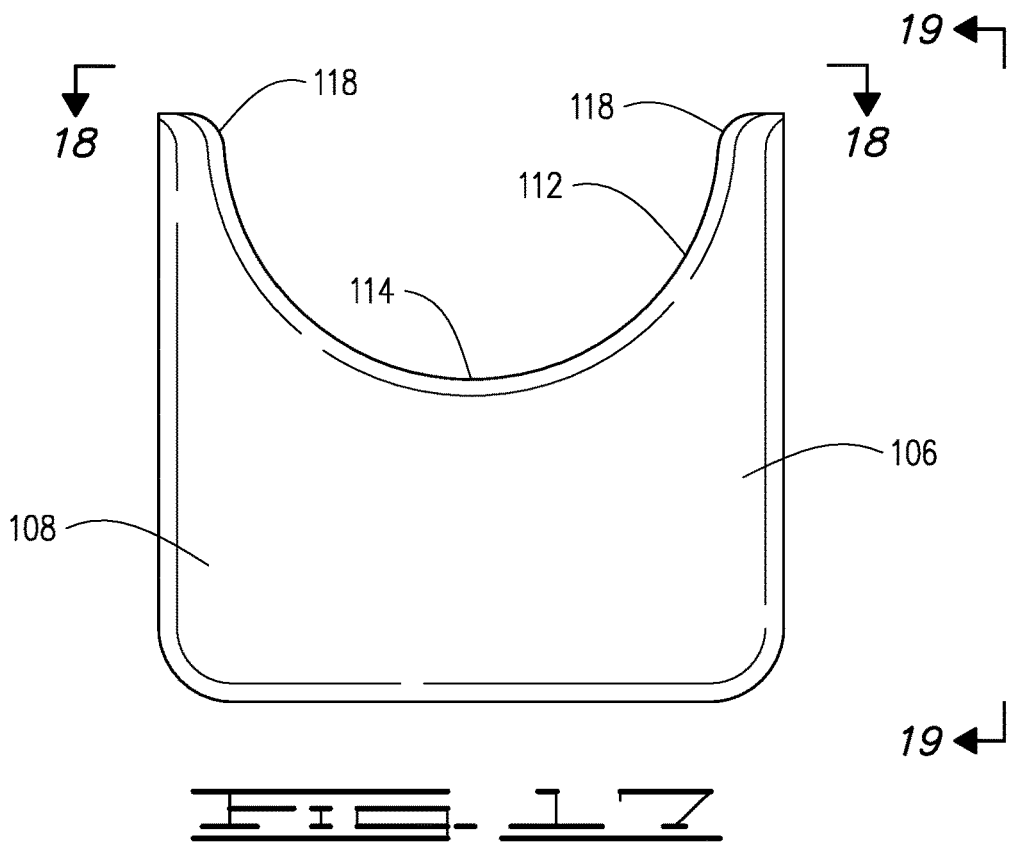
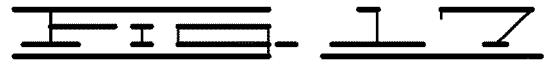

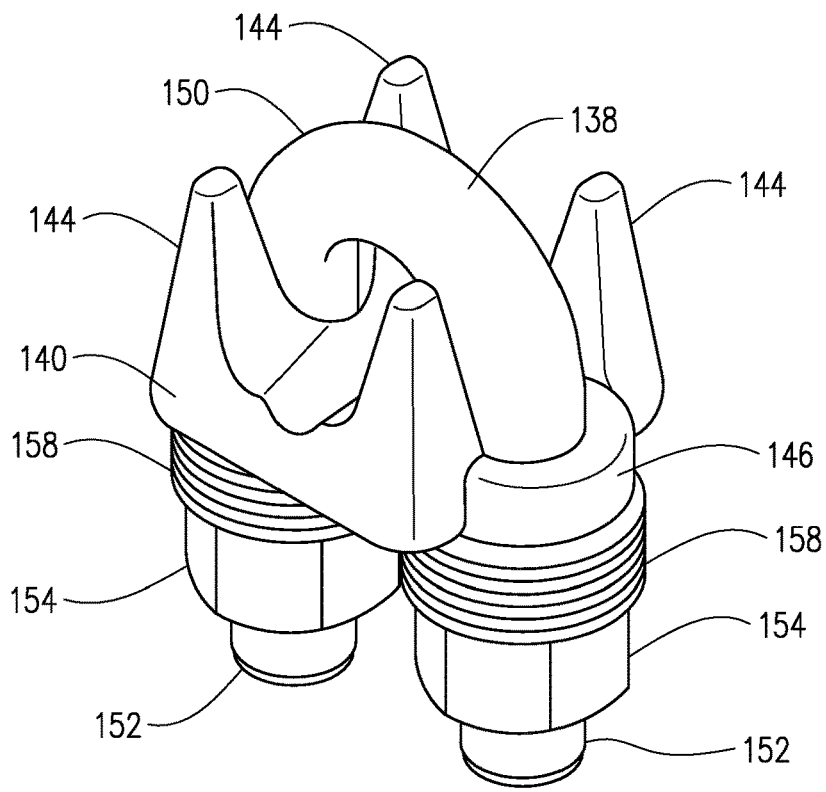
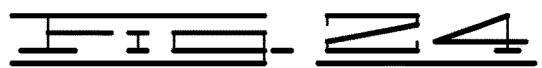
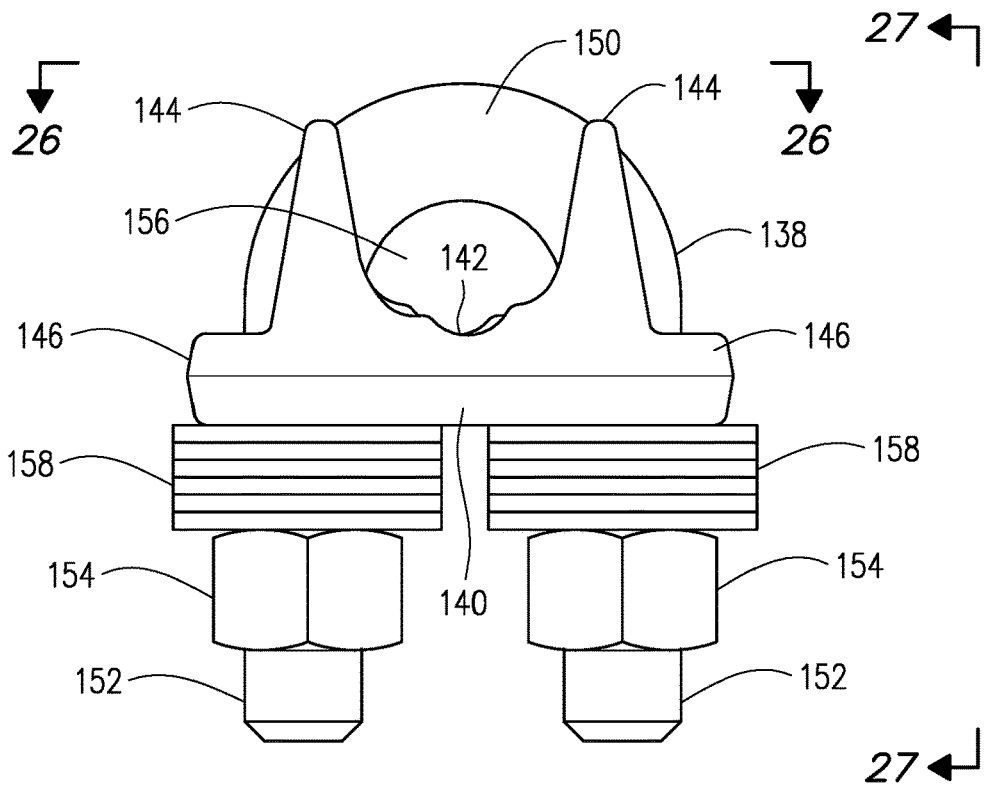

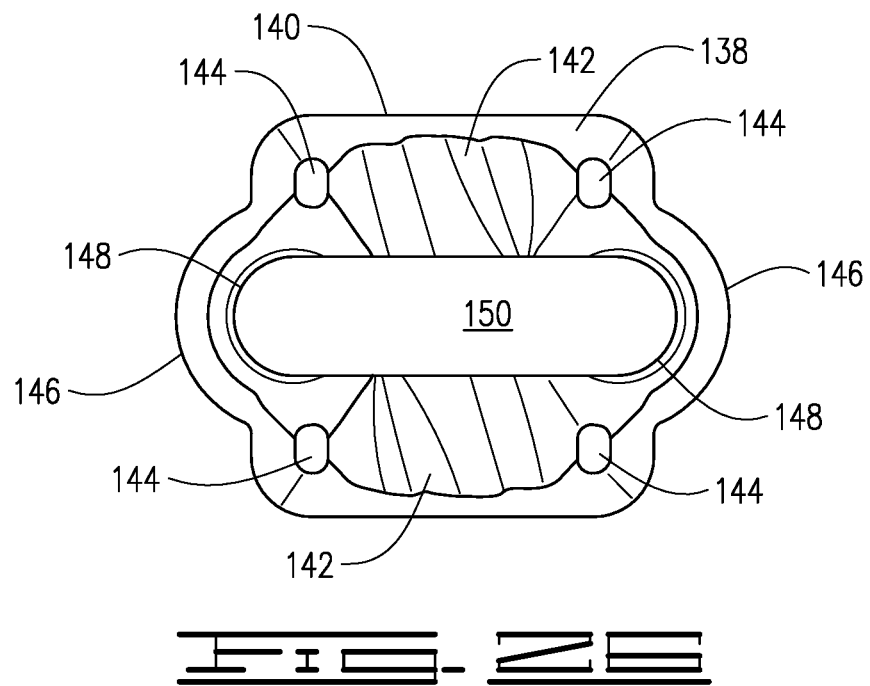
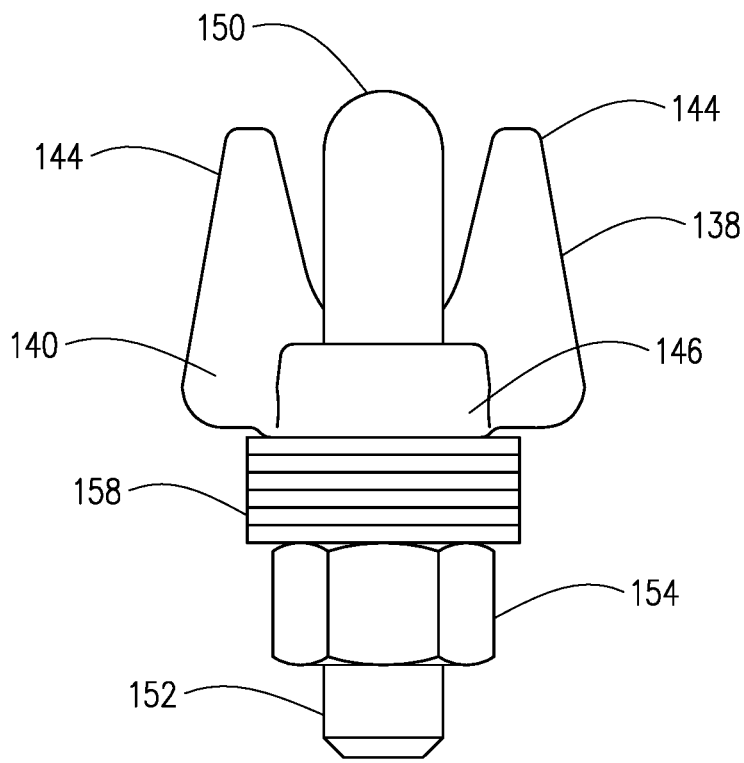

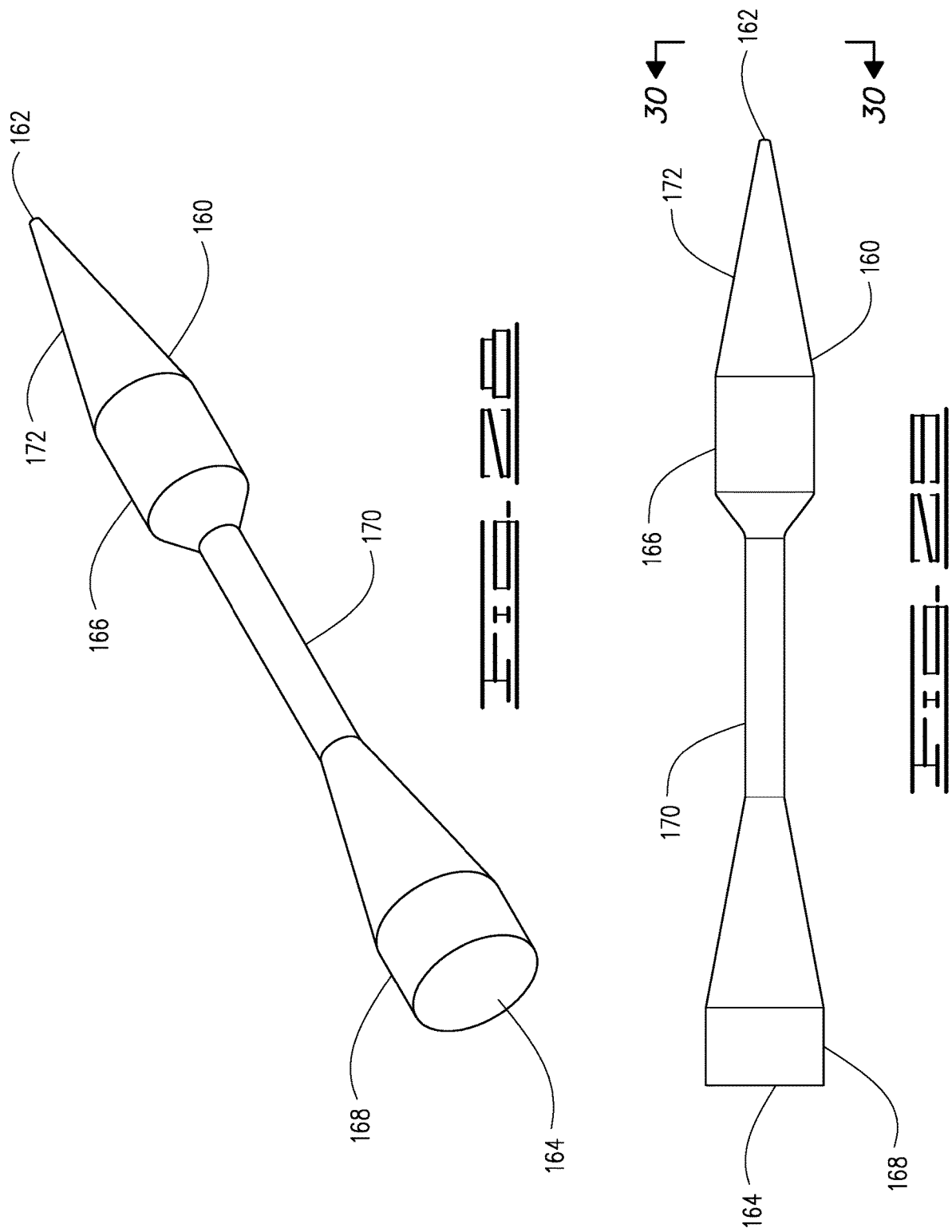

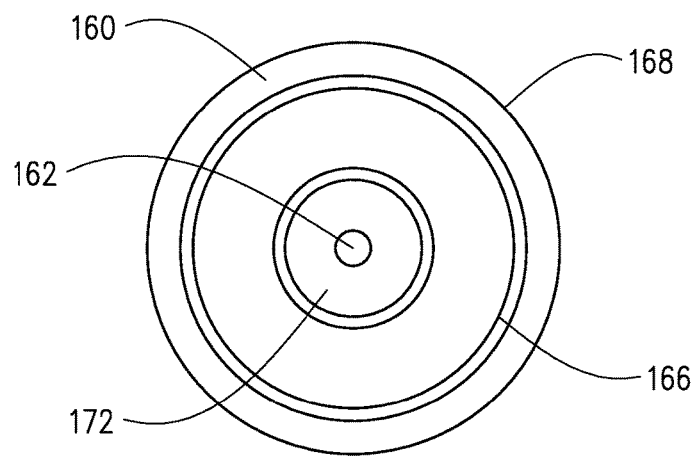
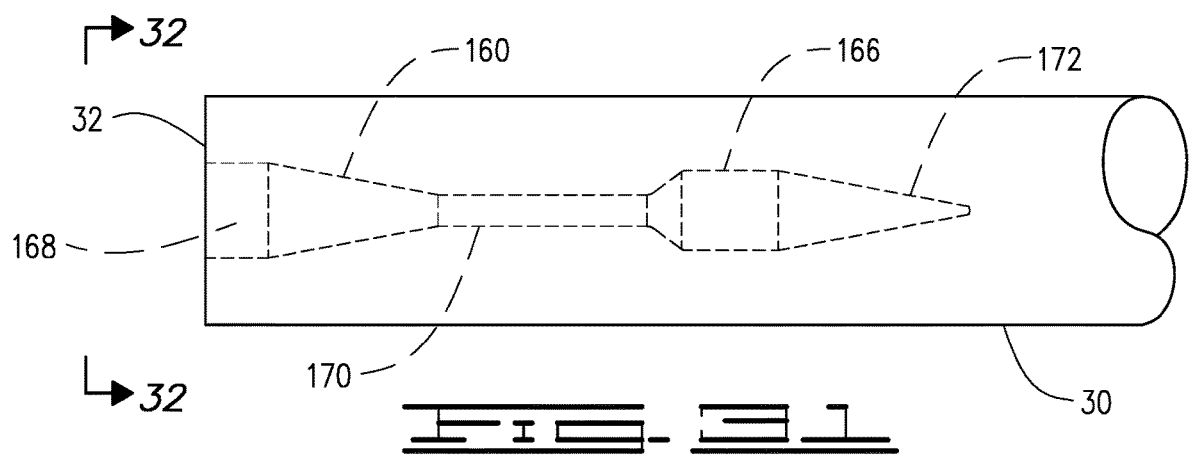
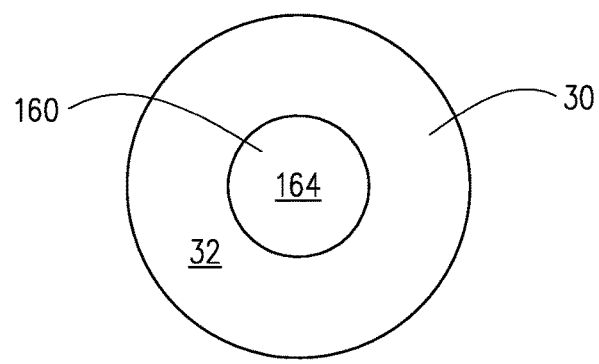

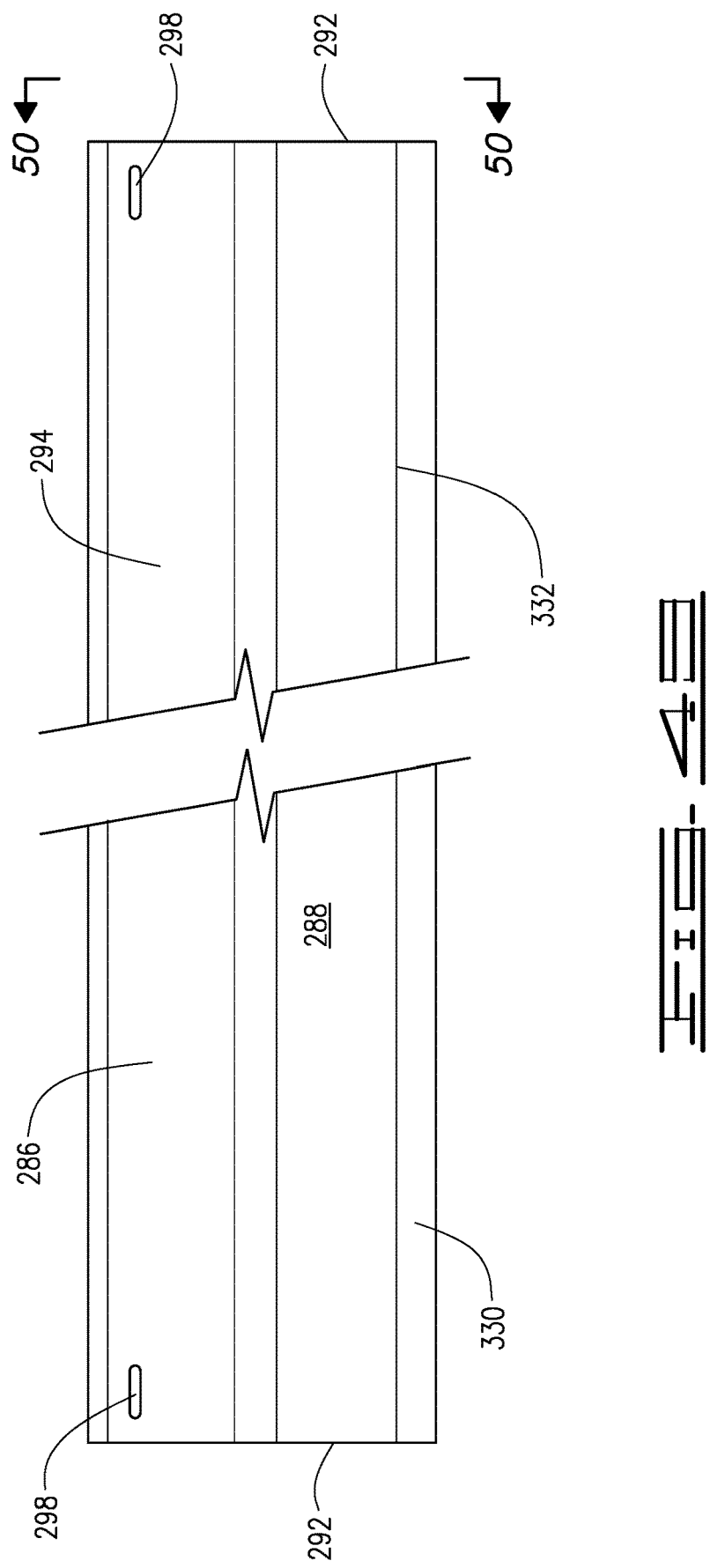

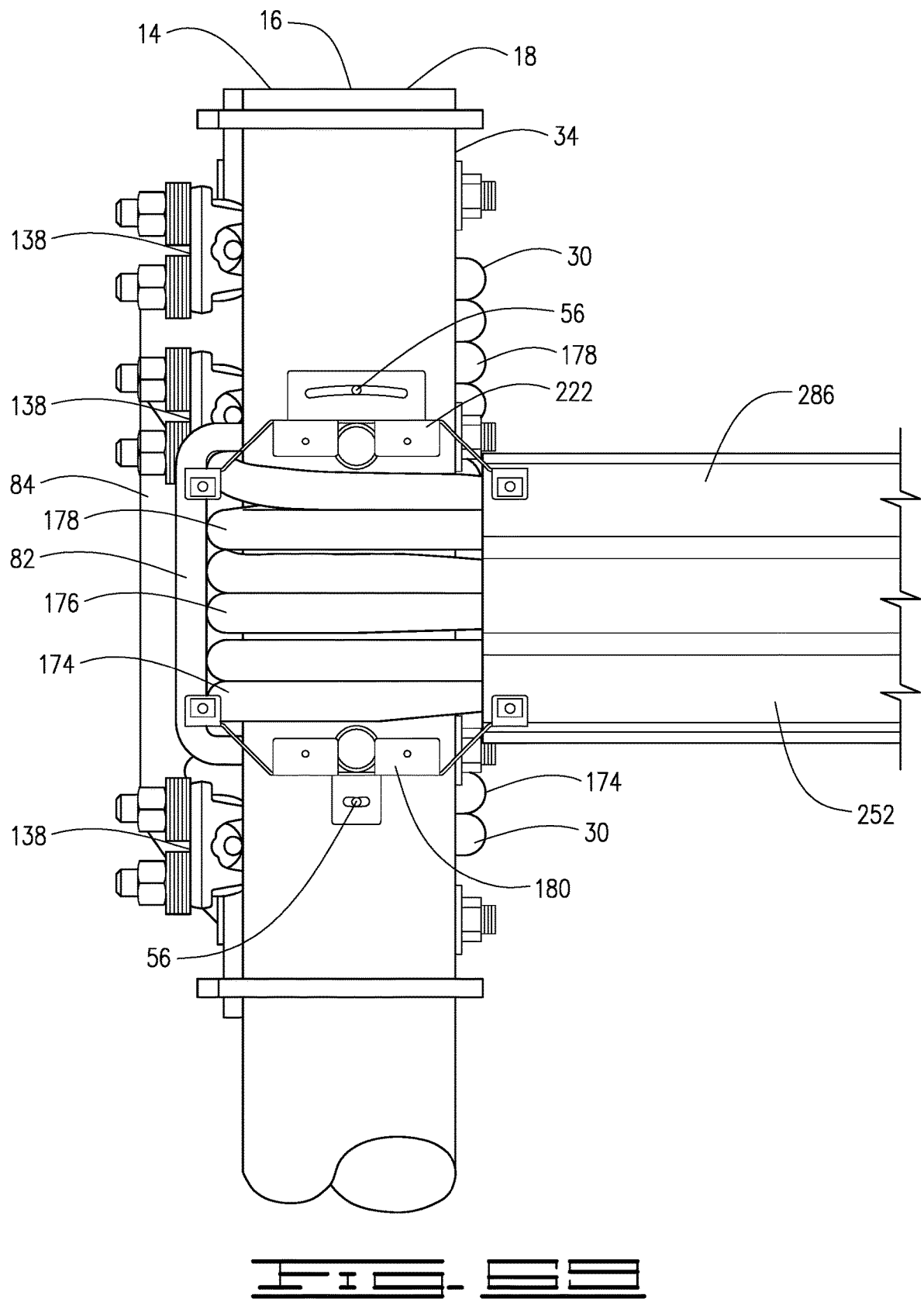

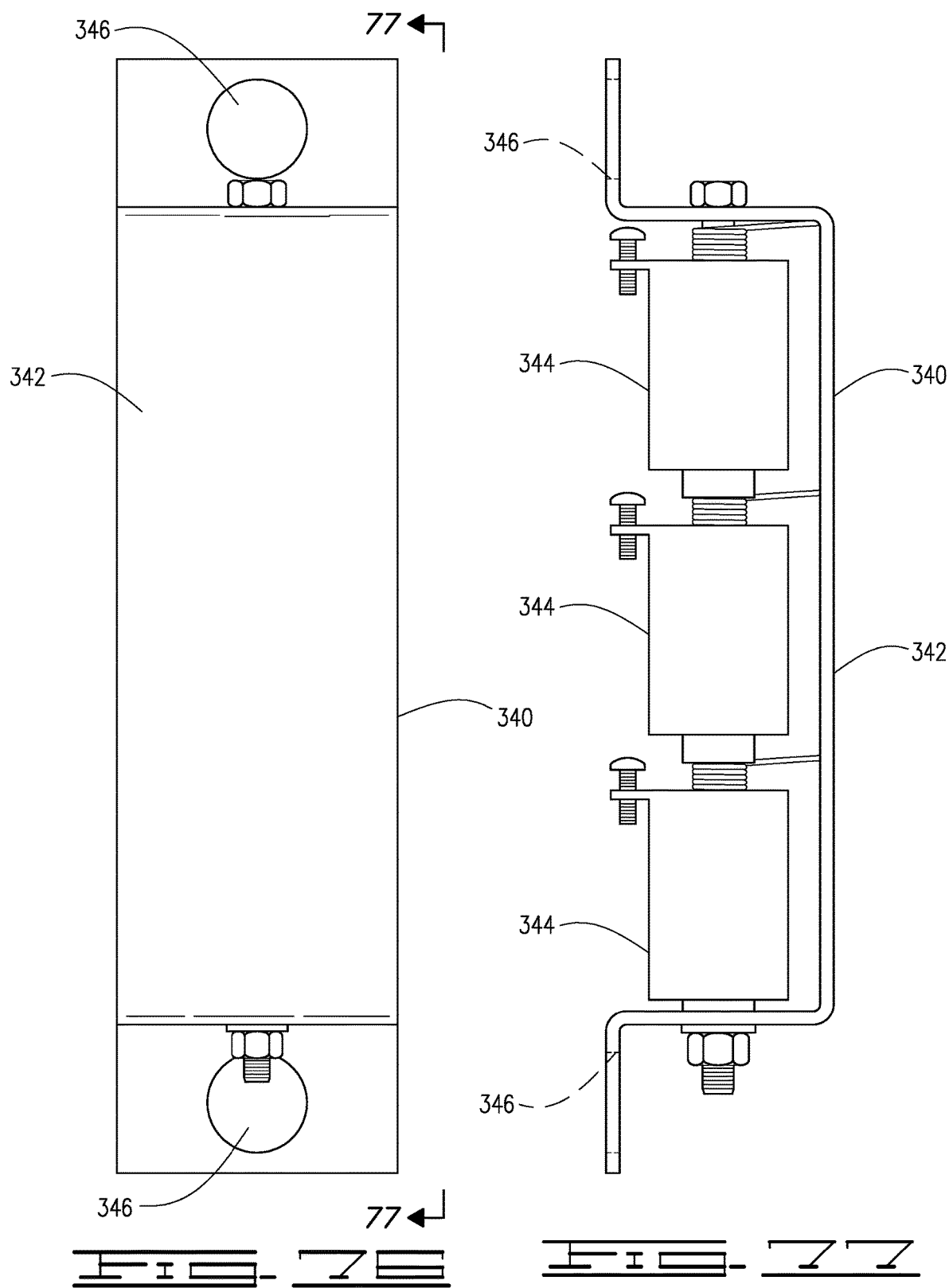

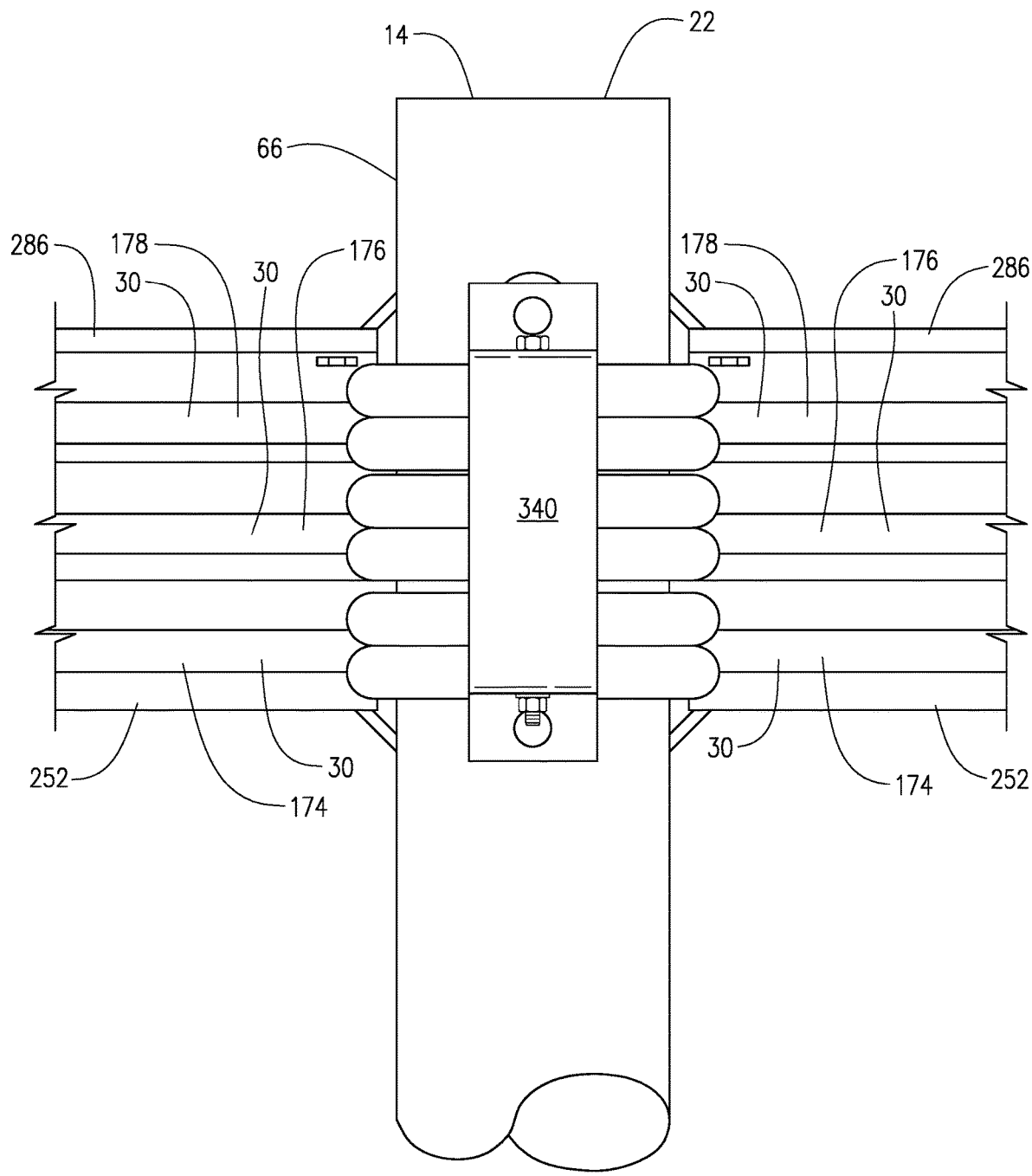
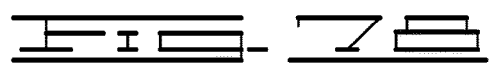

HANGER WITH POSITIONING TAB AND OPPOSED ARMS

SUMMARY OF THE INVENTION

A kit is formed from a plurality of posts and a plurality of elongate and flexible cables. Each cable has a pair of opposed ends. The plurality of posts include two end posts. Each end post is formed from an elongate tubular first column and an elongate tubular second column. The first column has a base. The second column is supported by the first column and extends in parallel relationship to the first column.

A barrier is formed from a footing system, a post system and at least one elongate and flexible cable. The footing system is embedded in a terrain and include a pair of spaced first and second end footings. One or more intermediate footings are arranged between the end footings. The post system is formed from a plurality of posts, and is supported by the footing system.

The post system includes an intermediate post system supported by the intermediate footings, and a first end post assembly supported by the first end footing. The first end post assembly includes a first column supported by the first end footing, and a second column offset from the first column and situated within the footprint of the first end footing. Each cable is wrapped at least partially around each post of the intermediate post system and at least partially around each column of the first end post assembly.

A kit is formed from one or more elongate and flexible cables, a plurality of rigid spikes, a plurality of posts, and a plurality of clamps. Each cable has a pair of opposed ends. Each spike is embeddable longitudinally within a cable at or adjacent one of its ends. Each clamp is configured to press at least one of the cables against a post.

A hanger is formed from a body, a positioning tab and a pair of opposed arms. The body has a rear edge that interconnects opposed side edges. The positioning tab projects from adjacent the rear edge of the body. An arcuate opening is formed in the positioning tab. The opposed arms extend from the opposed side edges of the body. Each arm has a free end that supports a flat cover attachment site.

BRIEF DESCRIPTION OF THE DRAWINGS

FIG. 6 is a front elevation view of an end post installed in a footing. The terrain and footing are shown in cross-section.

FIG. 7 is a perspective view of an intermediate post.

FIG. 8 is a top plan view of the intermediate post shown in FIG. 7.

FIG. 9 is a front elevation view of an intermediate post installed in a footing. The terrain and footing are shown in cross-section.

FIG. 10 is a top plan view of another embodiment of a barrier, having multiple intermediate posts.

FIG. 11 is a front elevation view of a U-bolt.

FIG. 14 is a bottom plan view of the clamp shown in FIG. 12, taken along line 14-14.

FIG. 15 is an enlarged view of a portion of the clamp shown in FIG. 14.

FIG. 16 is a perspective view of a first contact element.

FIG. 17 is a front elevation view of the first contact element shown in FIG. 16.

FIG. 24 is a perspective view of a clip.

FIG. 25 is a front elevation view of the clip shown in FIG. 24.

FIG. 26 is a top plan view of the clip shown in FIG. 25, taken along line 26-26.

FIG. 27 is a side elevation view of the clip shown in FIG. 25, taken along line 27-27.

FIG. 28 is a perspective view of a spike.

FIG. 29 is a front elevation view of the spike shown in FIG. 28.

FIG. 30 is a side elevation view of the spike shown in FIG. 29, taken along line 30-30.

FIG. 31 is a front elevation view of the end portion of a cable within which a spike has been embedded. The spike is shown with dashed lines.

FIG. 32 is an end view of the cable shown in FIG. 31.

FIG. 39 is a top plan view of the upper rail hanger shown in FIG. 38, taken along line 39-39.

FIG. 44 is a side elevation view of the post cover shown in FIG. 42, taken along line 44-44.

FIG. 48 is a perspective view of an upper cable cover.

FIG. 49 is a front elevation view of end portions of the upper cable cover shown in FIG. 48. The upper cable cover is shown fragmentarily.

FIGS. 52-54, 57 and 59-70 show the upper portion of an end post during successive stages of assembly of a barrier.

FIG. 52 is a front elevation view showing a lower rail hanger installed on an end post.

FIG. 53 is a side elevation view showing a first cable wrapped around the end post of the assembly shown in FIG. 52.

FIG. 54 is a side elevation view showing a clamp installed on the second column of the end post of the assembly shown in FIG. 53. The clamp overlies the wrapped first cable.

FIG. 57 is a side elevation view showing a clip installed on the first cable of the assembly shown in FIG. 54.

FIG. 59 is a side elevation view showing the first cable cover installed on the end post of the assembly shown in FIG. 57.

FIG. 60 is a front elevation view of the assembly shown in FIG. 59, taken along line 60-60.

FIG. 61 is a side elevation view showing a second cable wrapped around the end post of the assembly shown in FIG. 59. The clamp is not shown.

FIG. 62 is a side elevation view showing a second cable wrapped around the end post of the assembly shown in FIG. 61. A clip has been installed on the second cable, and the clamp is shown.

FIG. 63 is a front elevation view of the assembly shown in FIG. 62, taken along line 64-64.

FIG. 64 is a side elevation view showing a third cable wrapped around the end post of the assembly shown in FIG. 62. The clamp is not shown.

FIG. 65 is a side elevation view showing a clip and U-bolt installed on the assembly shown in FIG. 64. The clamp is shown.

FIG. 66 is a front elevation view of the assembly of FIG. 65, taken along line 66-66.

FIG. 67 is a front elevation view showing the upper cable cover installed on the end post of the assembly shown in FIG. 66.

FIG. 68 is a side elevation view of the assembly of FIG. 67, taken along line 68-68.

FIG. 69 is a front elevation view showing an upper rail hanger installed on the end post of the assembly of FIG. 67.

FIG. 70 is a front elevation view showing an end post cover installed on the end post of the assembly shown in FIG. 69.

FIGS. 71-75, 78 and 79 show the upper portion of an intermediate post during successive stages of assembly of a barrier.

FIG. 71 is a front elevation view showing a lower rail hanger installed on an intermediate post, and a first cable wrapped around that intermediate post.

FIG. 72 is a front elevation view showing the lower cable cover installed on the intermediate post of the assembly shown in FIG. 71.

FIG. 73 is a front elevation view showing the second and third cables wrapped around the intermediate post of the assembly shown in FIG. 72.

FIG. 74 is a front elevation view showing the upper cable cover, an upper rail hanger and a U-bolt installed on the intermediate post of the assembly of FIG. 73.

FIG. 75 is a front elevation view showing a post cover installed on the intermediate post of the assembly shown in FIG. 74.

FIG. 76 is a top plan view of a cable tensioner.

FIG. 77 is a side elevation view of the cable tensioner shown in FIG. 76, taken along line 77-77.

FIG. 78 is a rear elevation view of the assembly shown in FIG. 75.

FIG. 79 is a side elevation view of the assembly shown in FIG. 75, taken along line 79-79.

DETAILED DESCRIPTION

Figure 1:
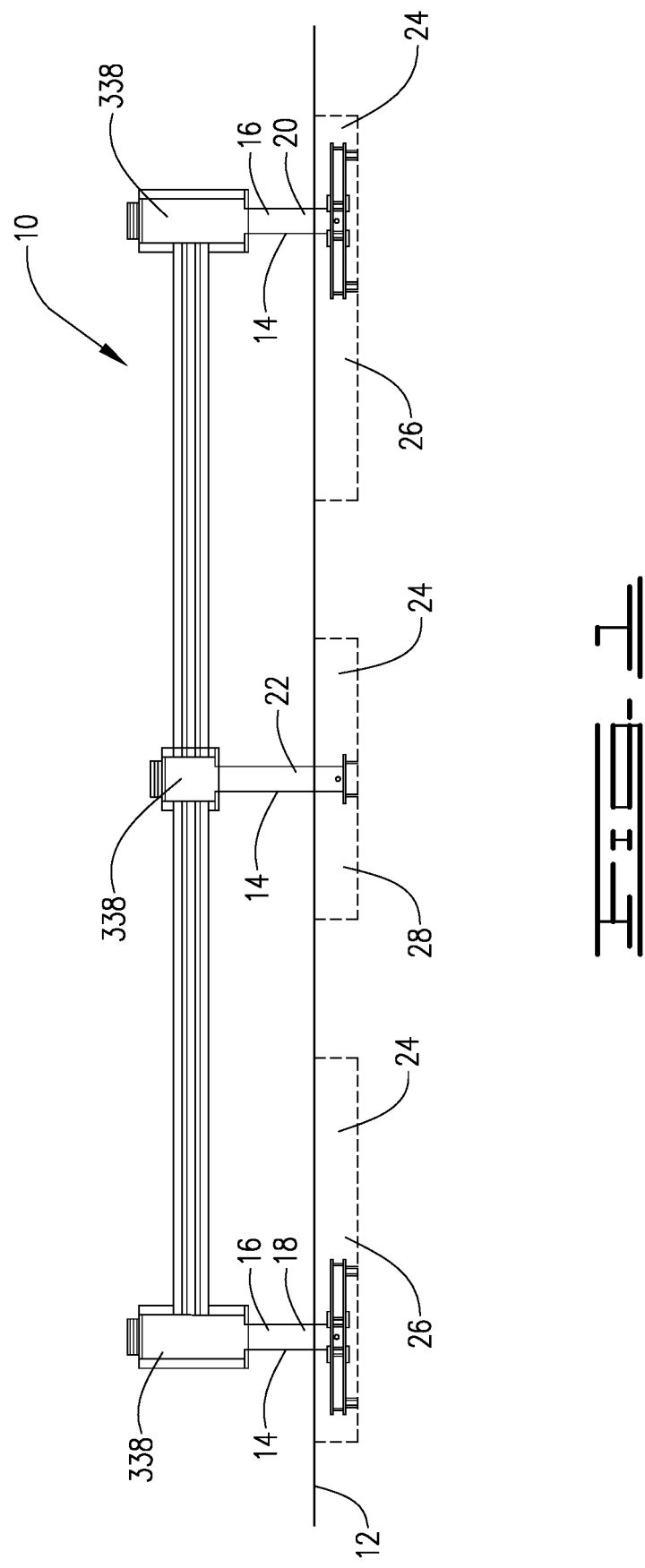
FIG. 1 is a front elevation view of a barrier having a single intermediate post. The terrain and footings are shown in cross-section.
Figure 2:
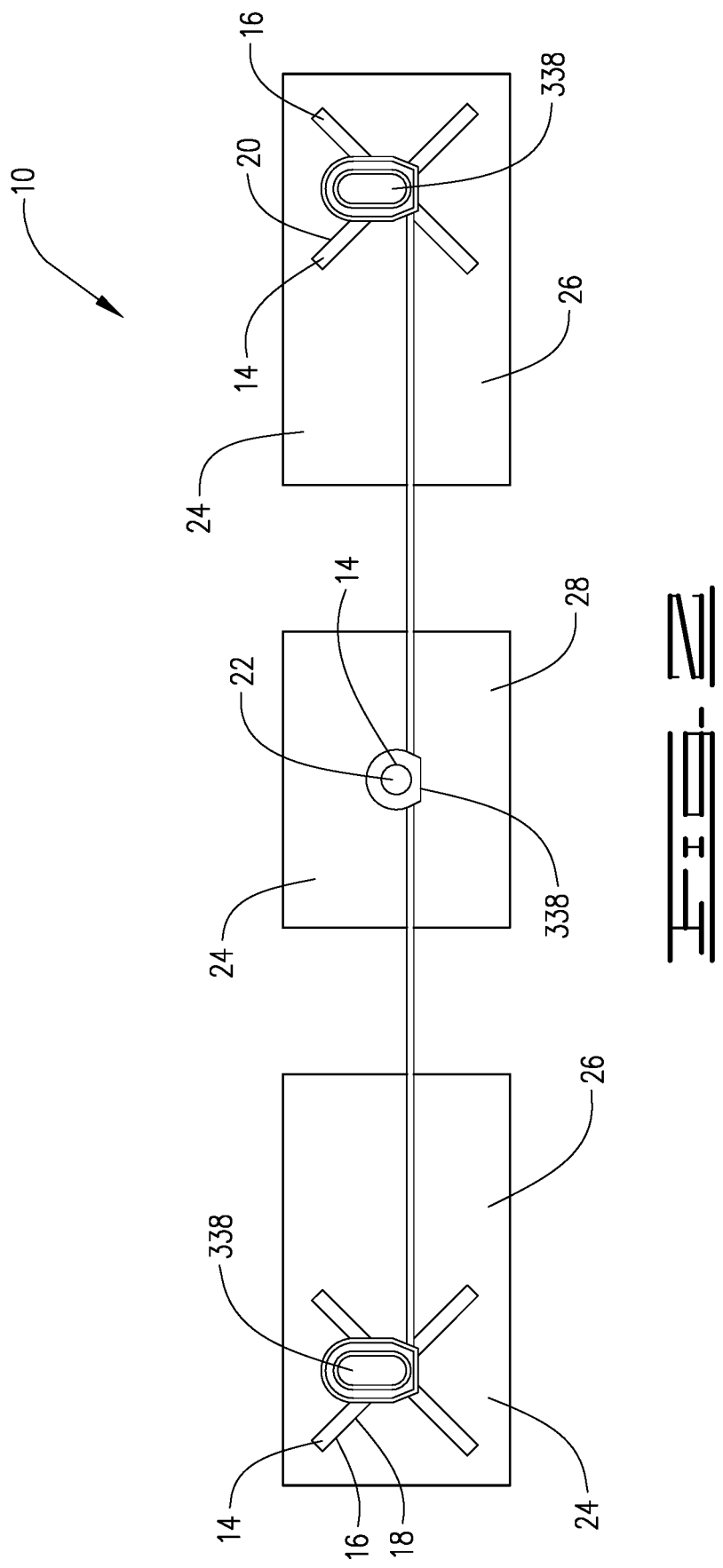
FIG. 2 is a top plan view of the barrier shown in FIG. 1.

A barrier 10, shown in FIGS. 1 and 2, is formed on a terrain 12. The barrier 10 comprises a plurality of posts 14, including two end posts 16. The end posts 16 include a first end post 18 and a second end post 20. The posts 14 further comprise at least one intermediate post 22 that is situated between the end posts 16. As shown in FIG. 2, each post 14 is installed in a footing 24 embedded within the terrain 12. Each footing 24 is preferably formed from a ballast material, such as steel-reinforced concrete. A preferred form of footing 24 is a shallow mount footing, with a depth of fifteen inches. In one embodiment, the separation distance between adjacent posts 14 is sixteen feet.

The end posts 16 are embedded within enlarged footings 26, preferably in a one-to-one relationship. Most or all of the intermediate posts 22 are embedded within standard footings 28, again preferably in a one-to-one relationship. Each enlarged and standard footing 26 and 28 has the shape of a rectangular prism. Enlarged footings 26 have the same width and depth as standard footings 28, but have a greater length in the dimension along which the barrier 10 extends. In one embodiment, each enlarged footing 26 has a length of twelve feet and a width of six feet, while each standard footing 28 has a length of eight feet and a width of six feet.

In some embodiments, intermediate posts situated at corner of the barrier 10, may be embedded in a corner footing (not shown) having a size and shape different from that of either of the footings 26 and 28. For example, the corner footing may take the shape of an "L," rather than the shape of a rectangle, when viewed from above.

One or more elongate and flexible cables 30, best shown in FIGS. 31, 32, 53, 55, 63 and 65, are also included in the barrier 10. Each cable 30 has opposed ends 32 and is secured adjacent each end 32 to an end post 16. Between the end posts 16, each cable 30 extends adjacent each intermediate post 22. Each cable 30 is wrapped at least partially around each end post 16, adjacent its respective ends 32. Each cable 30 is also wrapped at least partially around at least one of the intermediate posts 22, and more preferably around each intermediate post 22 forming the barrier 10. Most preferably, each cable 30 is wrapped at least partially around each post 14 forming the barrier 10.

Figure 3:
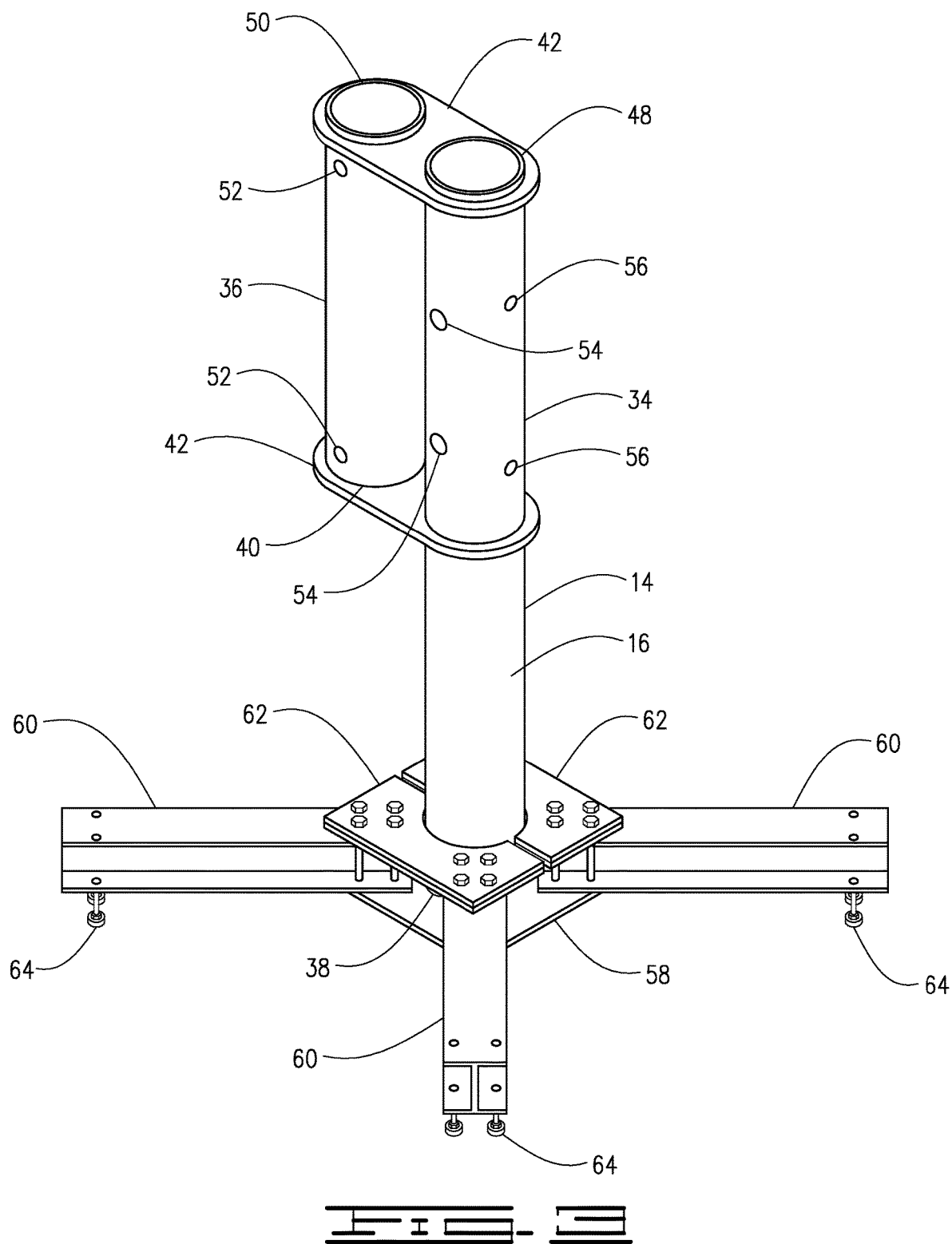
FIG. 3 is a perspective view of an end post.
Figure 4H:
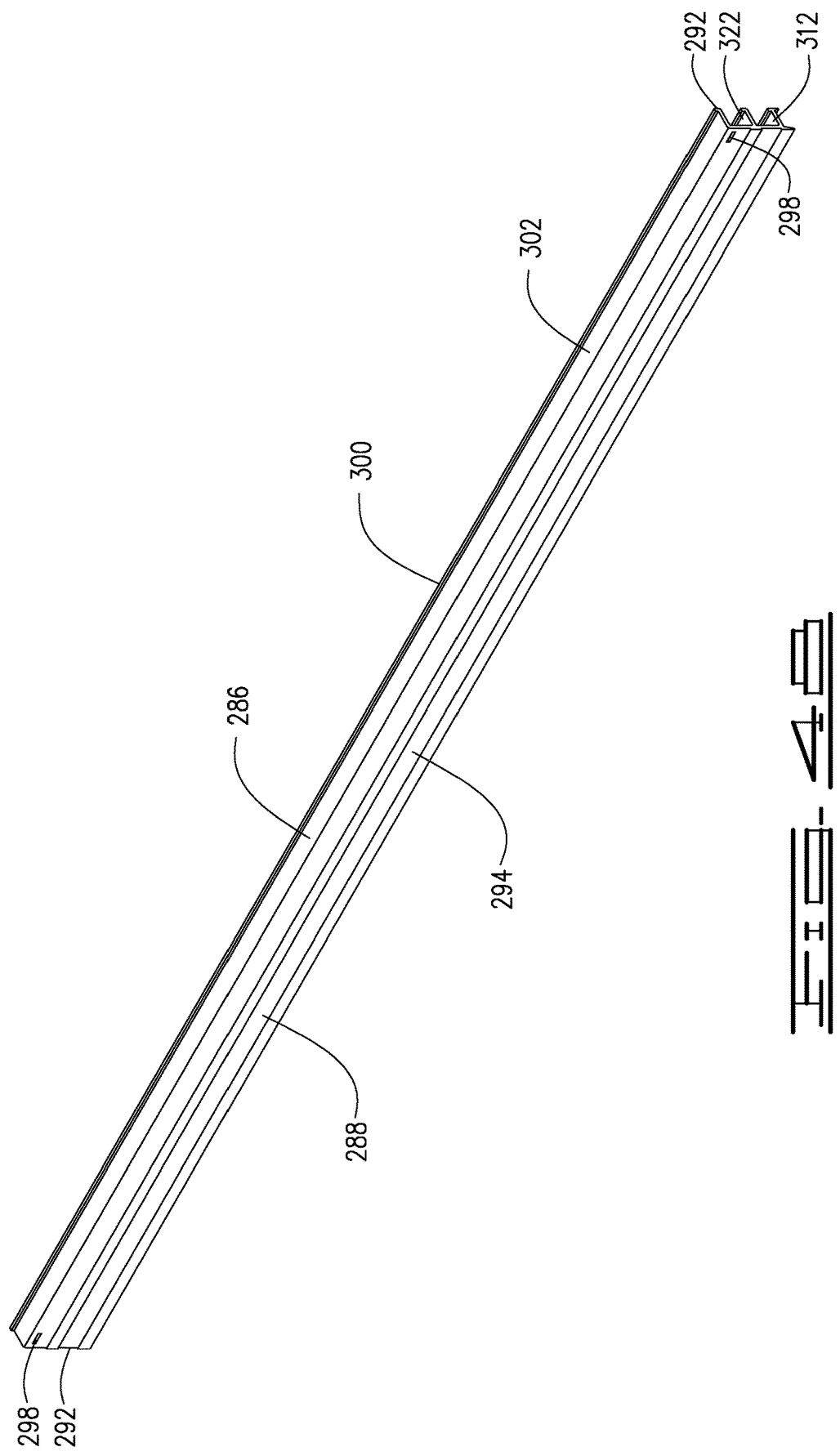
FIG. 4 is a top plan view of the end post shown in FIG. 3.

An end post 16 is shown in FIGS. 3, 4 and 6. Each end post 16 is formed from a pair of elongate, tubular and laterally offset columns, namely first column 34 and second column 36. The first column 34 has a base 38, and the second column 36 has a base 40. Each of the columns 34 and 36 preferably comprises an open-ended elongate tubular member, and more preferably comprises a hollow cylinder.

Preferably, each of the columns 34 and 36 comprises a length of pipe formed from a strong and durable material, such as steel. Each of the columns 34 and 36 preferably has the same diameter, such as a nominal diameter of 8 inches.

Preferably, the first column 34 has a heavier-duty construction than the second column 36. In one embodiment, the first column 34 is formed from XXH ASTM A106 grade B steel pipe. The first column 34 has an outside diameter of 8.63 inches, an inside diameter of 6.88 inches, and a length of 74.69 inches. The second column 36, which preferably has a lesser length than the first column 34, is formed from pipe of lesser wall thickness than the first column 34. In one embodiment, the second column 36 is formed from schedule 40 steel pipe. The second column 36 has an outside diameter of 8.63 inches, an inside diameter of 7.98 inches, and a length of 38.38 inches.

Figure 5:
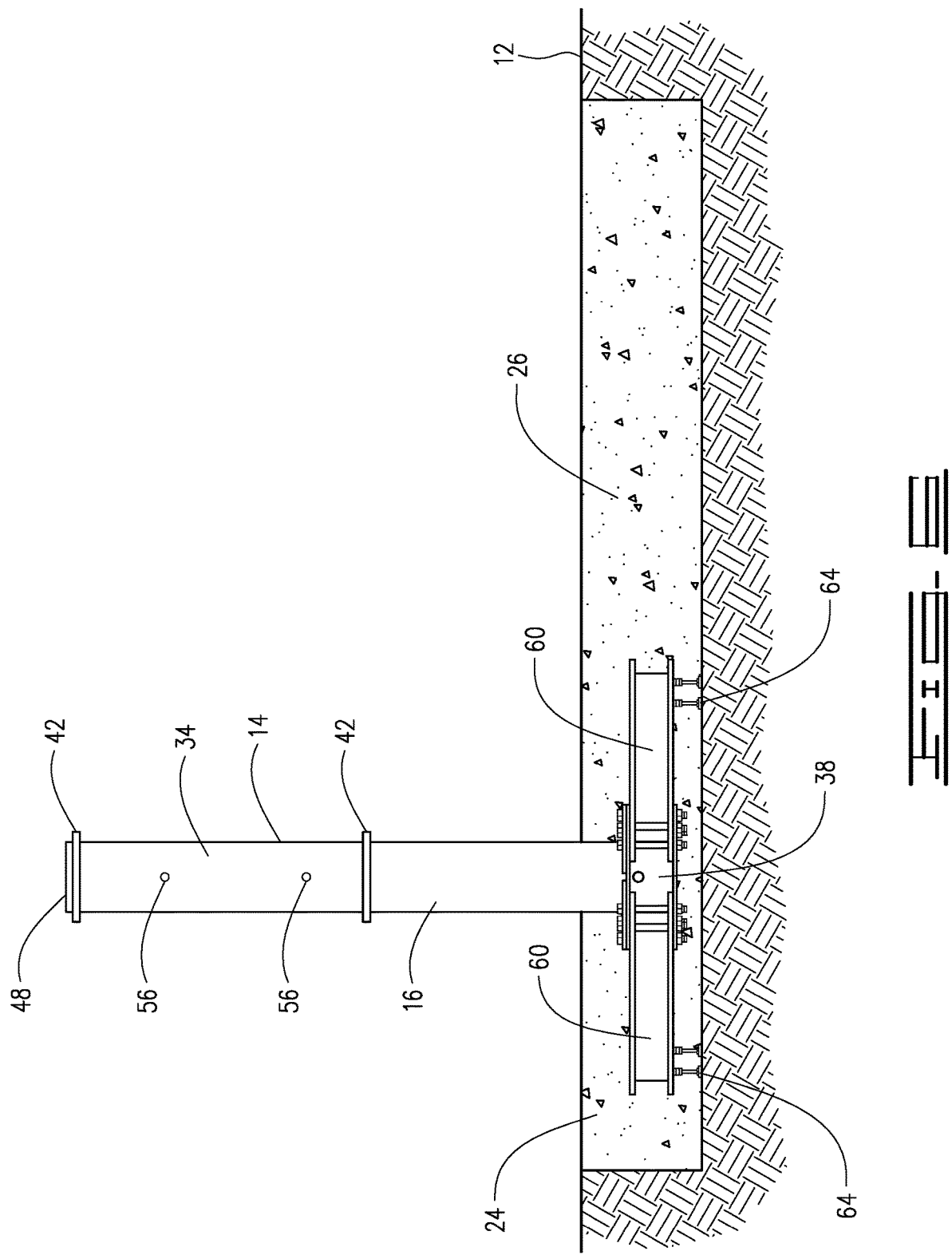
FIG. 5 is a top plan view of a bracket.
Figure 12:
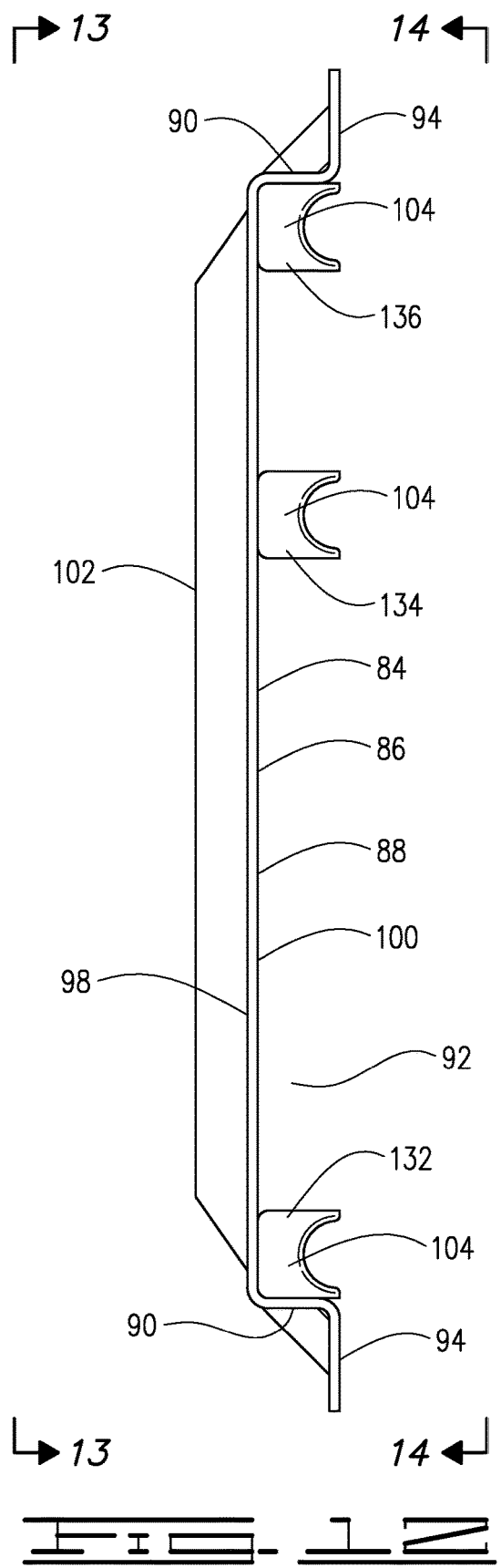
FIG. 12 is a front elevation view of a clamp.
Figure 13:
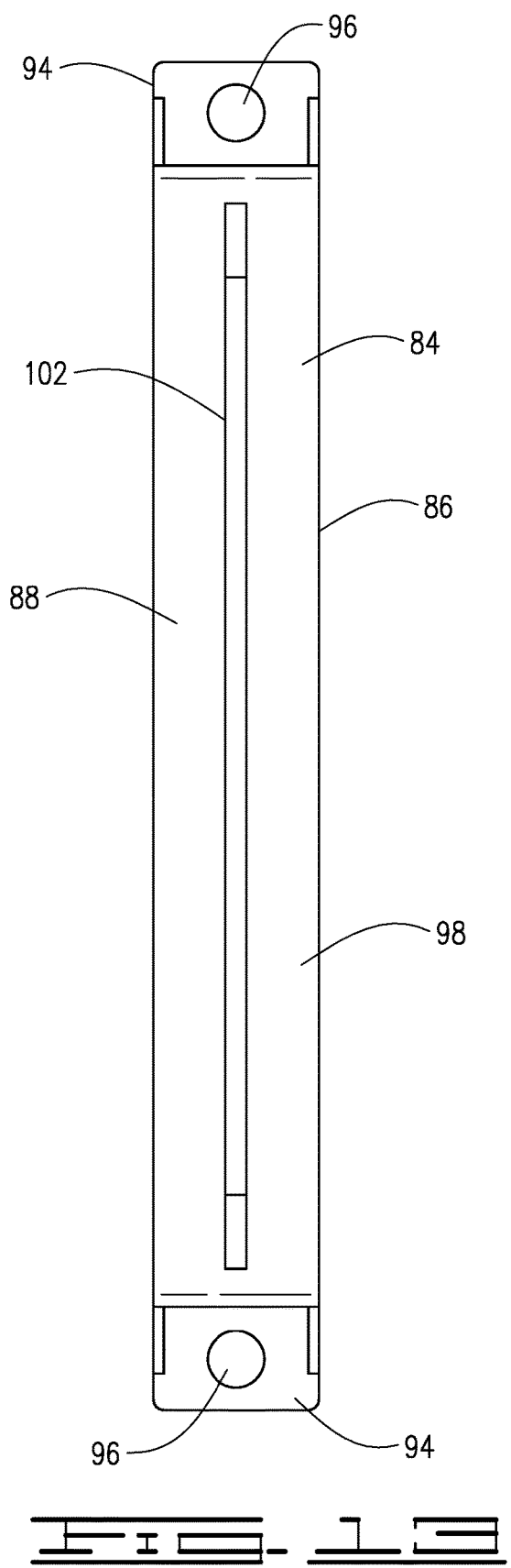
FIG. 13 is a top plan view of the clamp shown in FIG. 12, taken along line 13-13.
Figure 18:
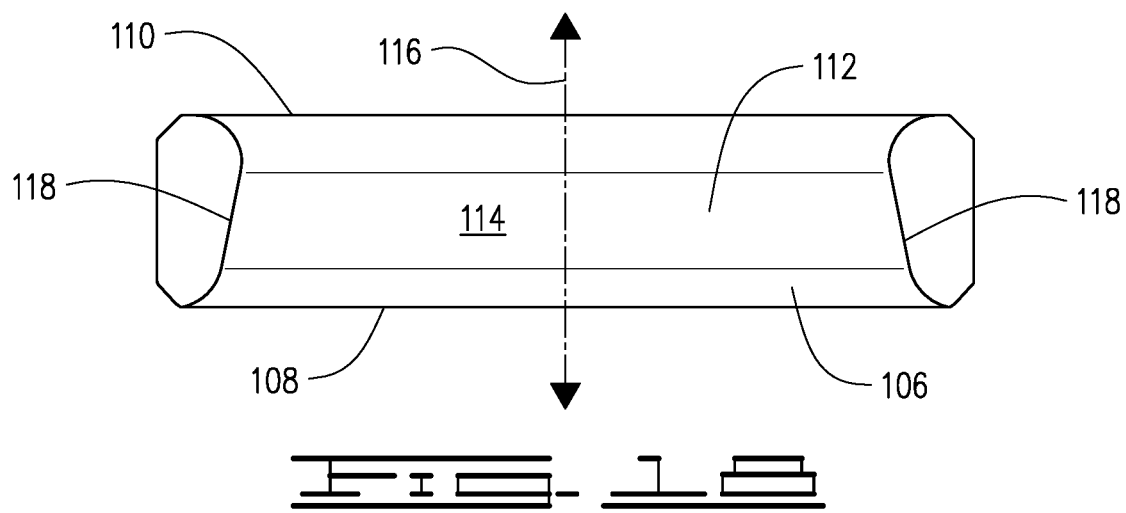
FIG. 18 is a top plan view of the first contact element shown in FIG. 17, taken along line 18-18.
Figure 19:
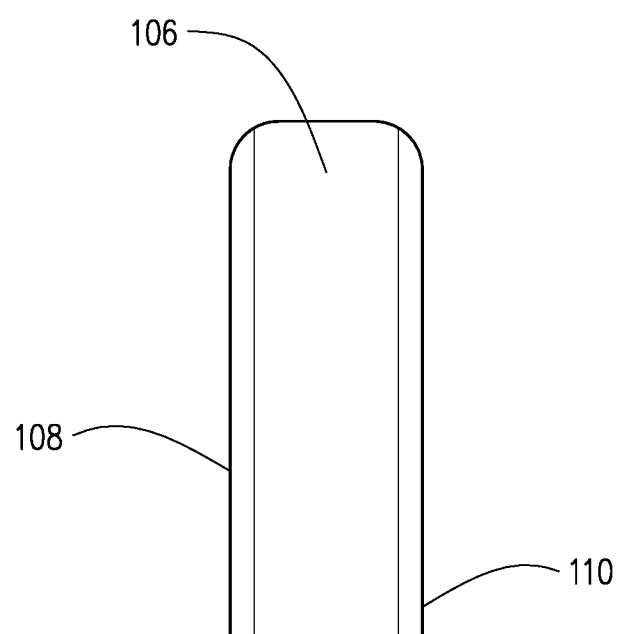
FIG. 19 is a side elevation view of the first contact element shown in FIG. 17, taken along line 19-19.
Figure 20:
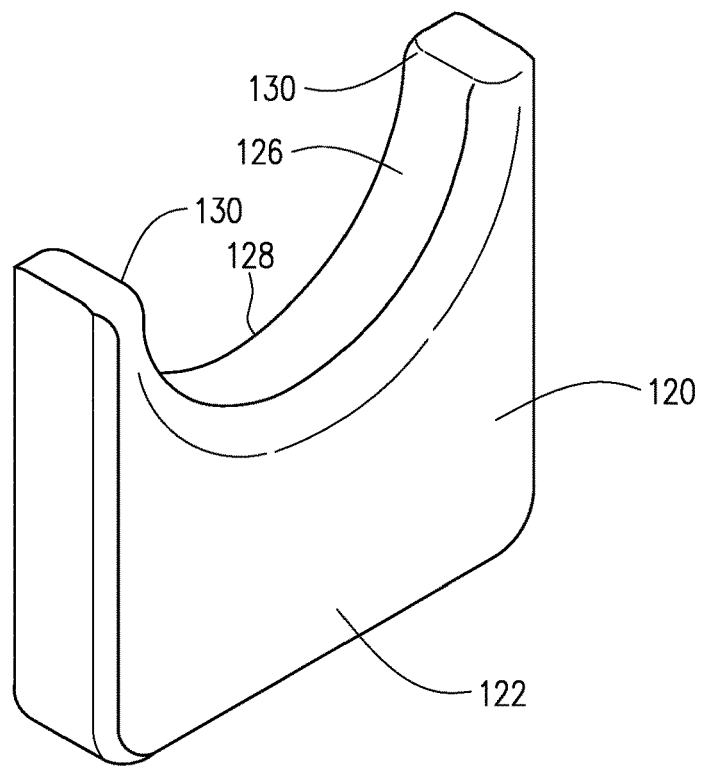
FIG. 20 is a perspective view of a second contact element.
Figure 21:
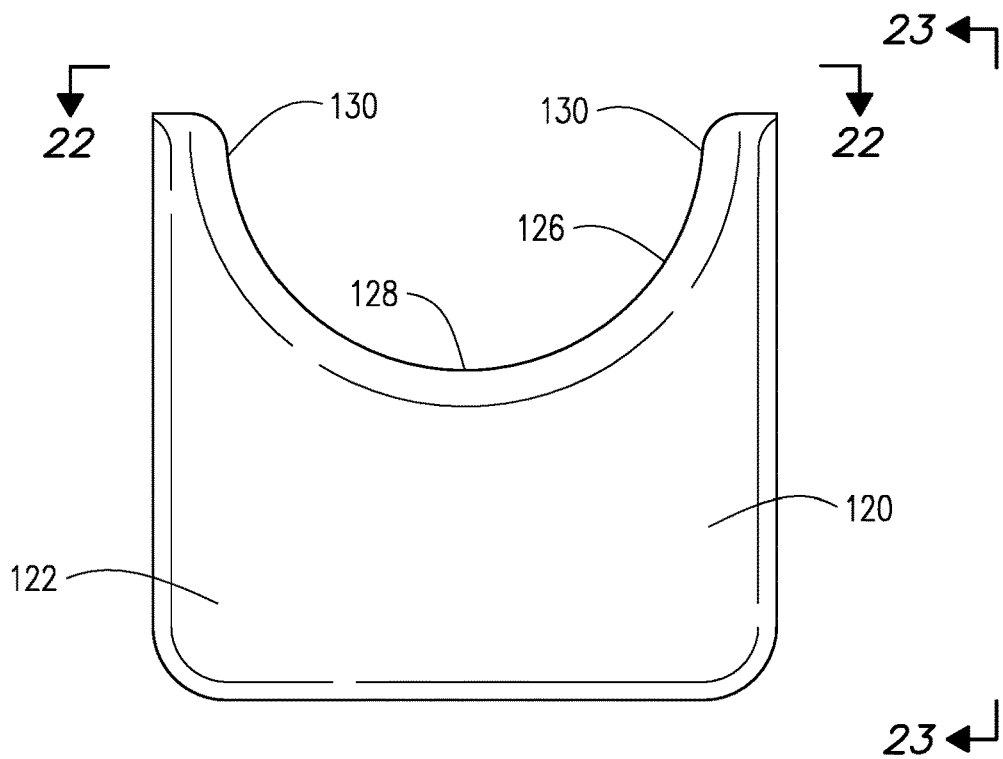
FIG. 21 is a front elevation view of the second contact element shown in FIG. 20.
Figure 22:
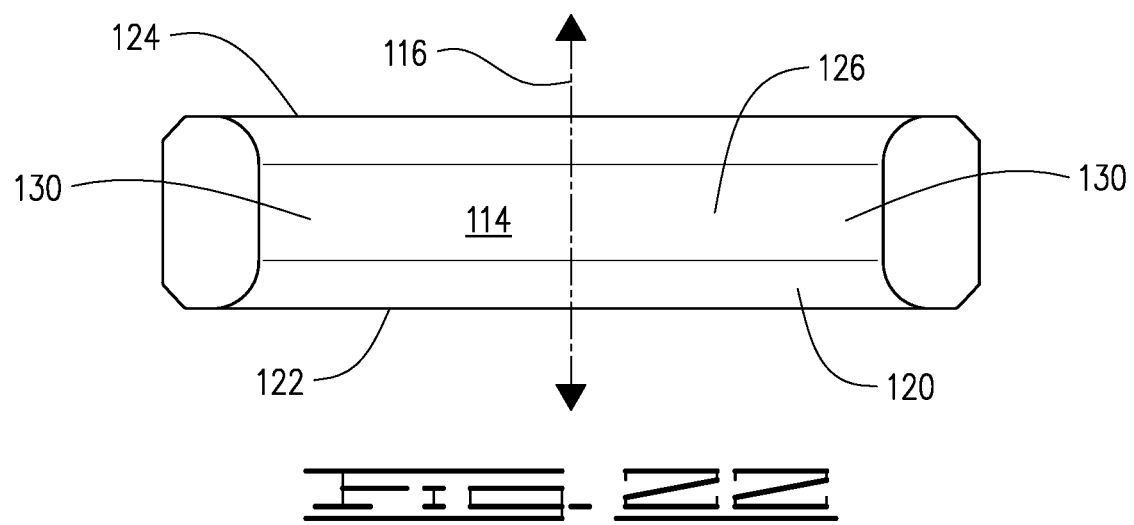
FIG. 22 is a top plan view of the second contact element shown in FIG. 21, taken along line 22-22.
Figure 23:
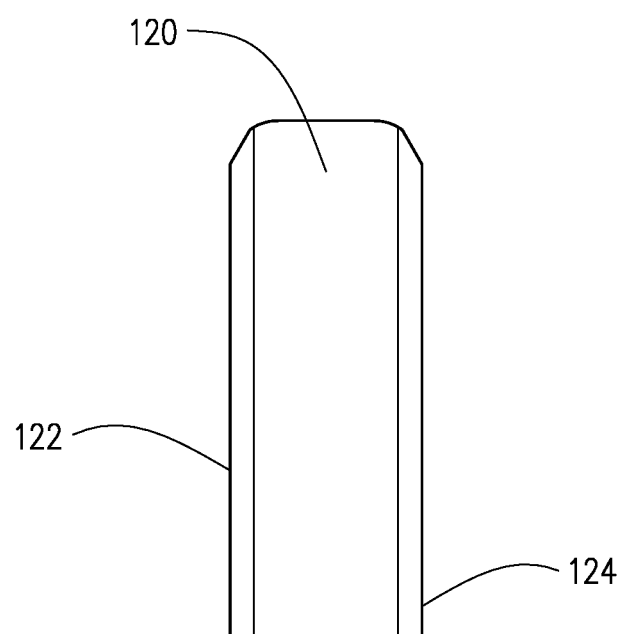
FIG. 23 is a side elevation view of the second contact element shown in FIG. 21, taken along line 23-23.
Figure 33:
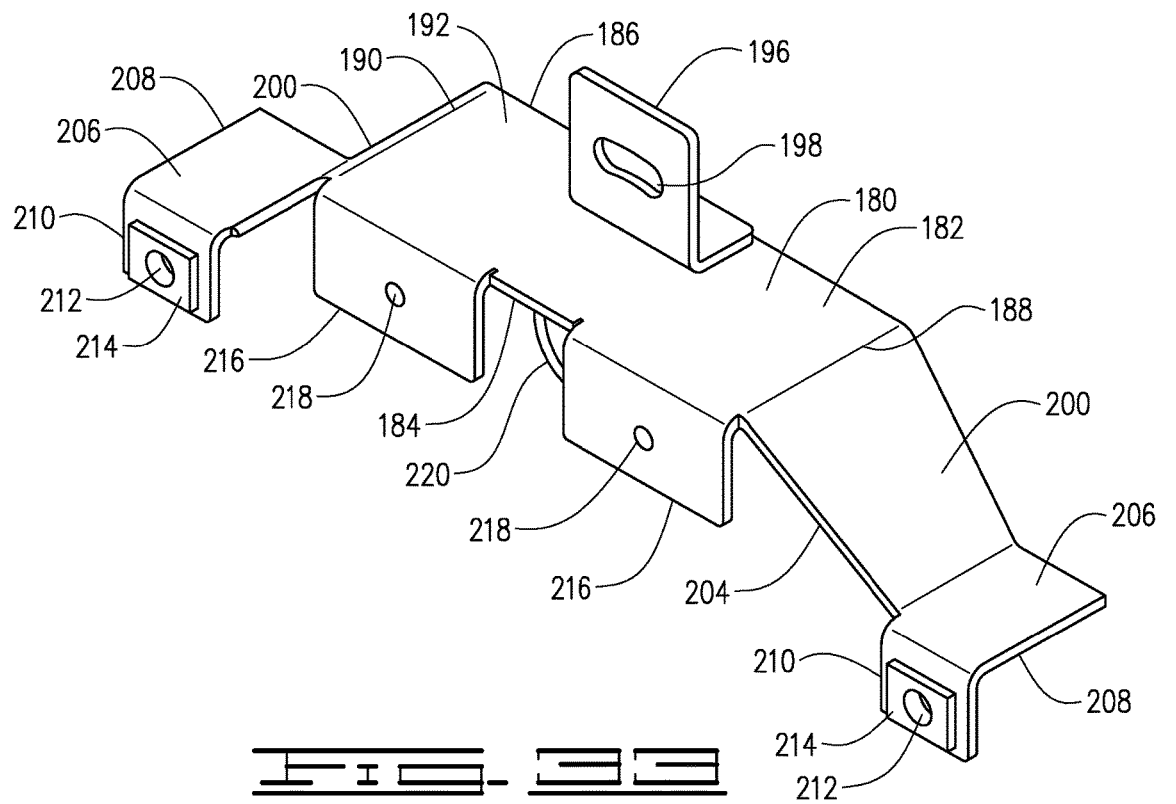
FIG. 33 is a perspective view of a lower rail hanger.
Figure 34:
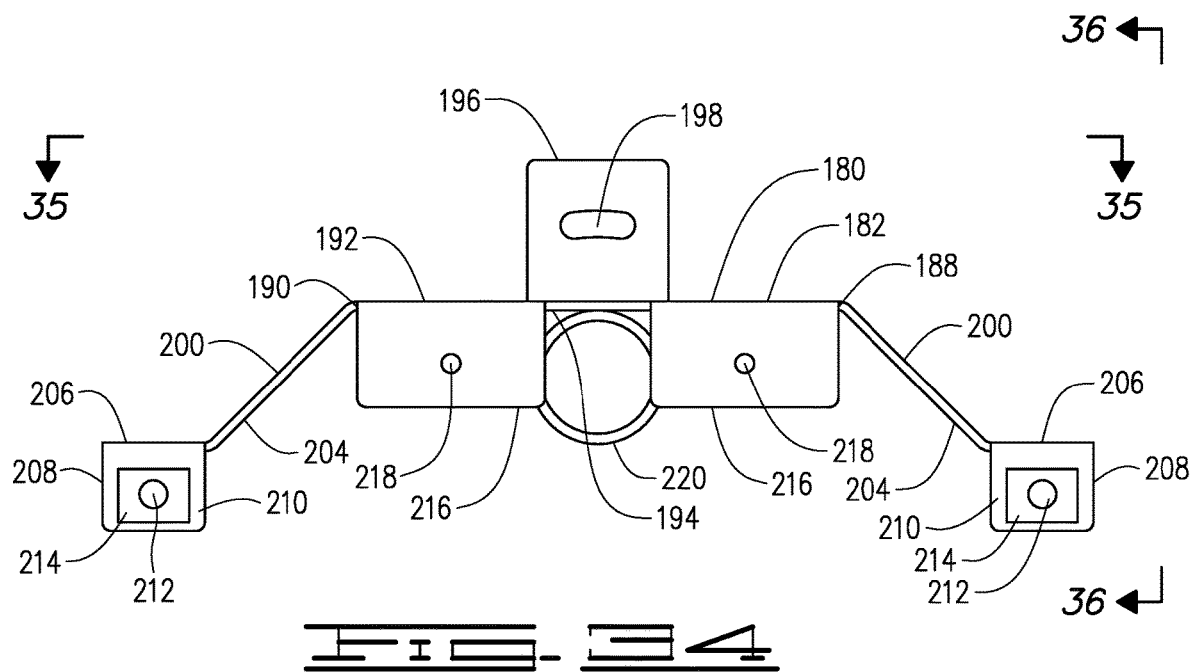
FIG. 34 is a front elevation view of the lower rail hanger shown in FIG. 33.
Figure 35:
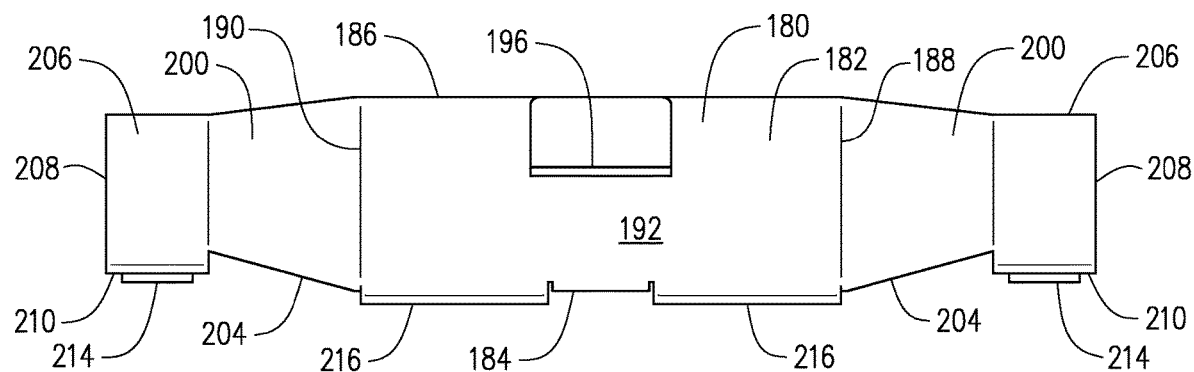
FIG. 35 is a top plan view of the lower rail hanger shown in FIG. 34, taken along line 35-35
Figure 36:
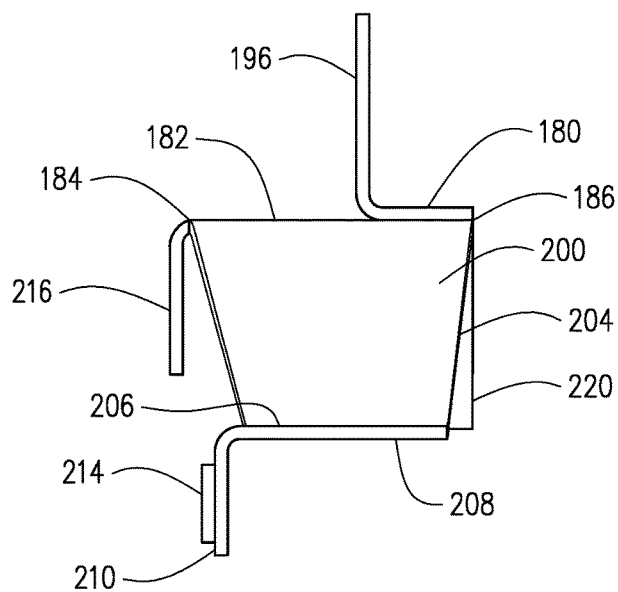
FIG. 36 is a side elevation view of the lower rail hanger shown in FIG. 34, taken along line 36-36.
Figure 37:
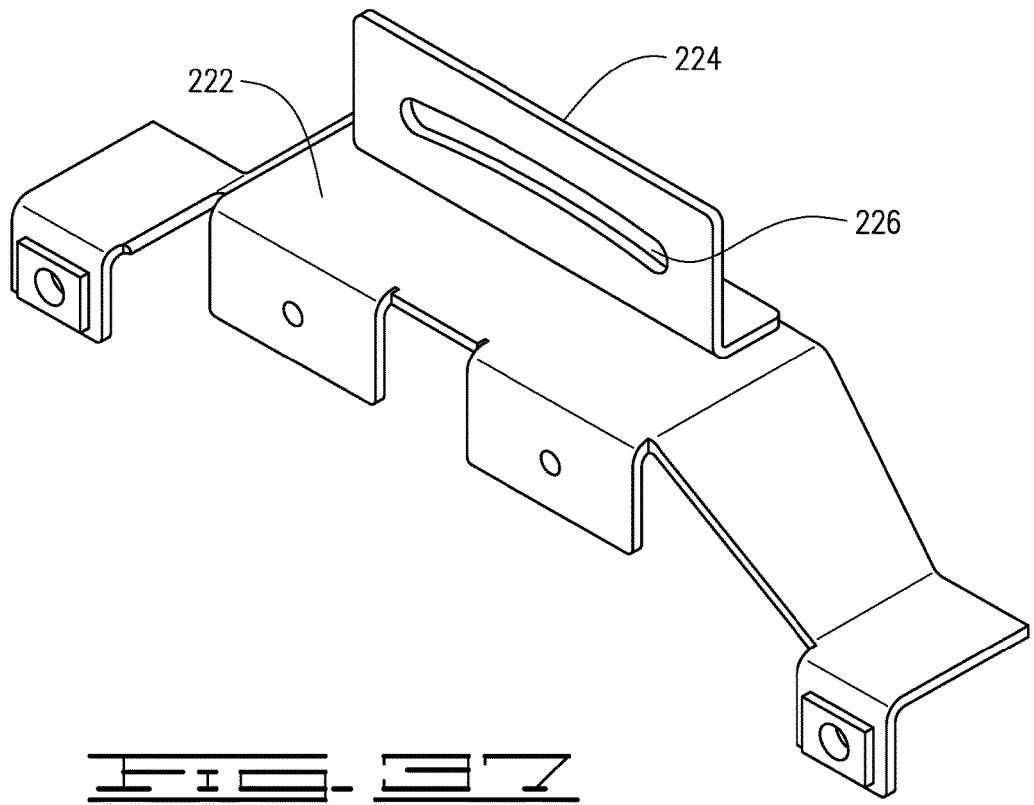
FIG. 37 is a perspective view of an upper rail hanger.
Figure 38:
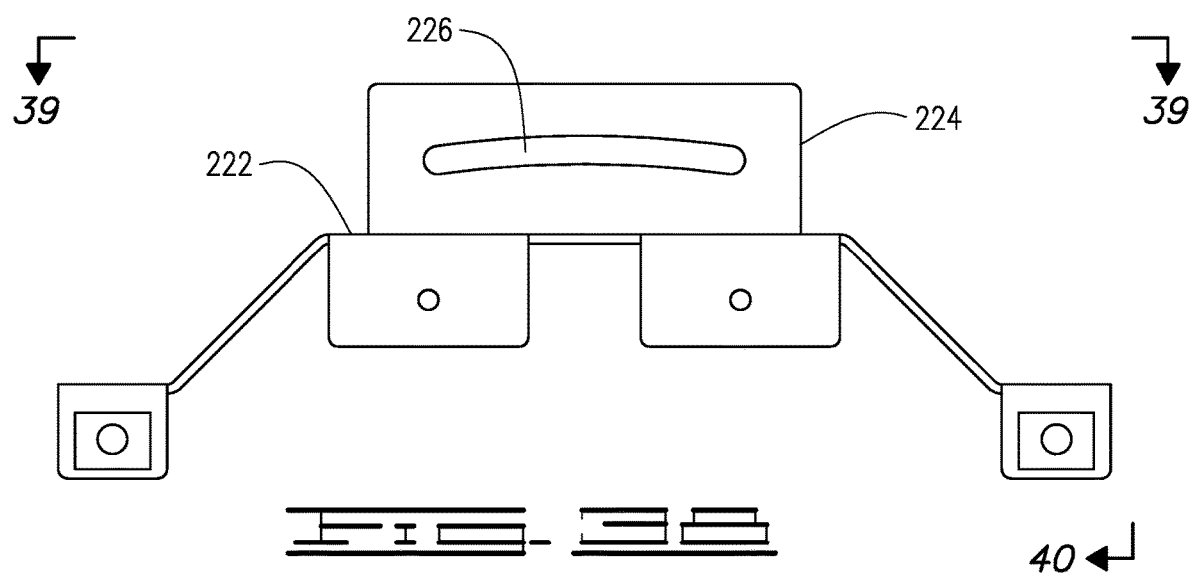
FIG. 38 is a front elevation view of the upper rail hanger shown in FIG. 37.
Figure 33:
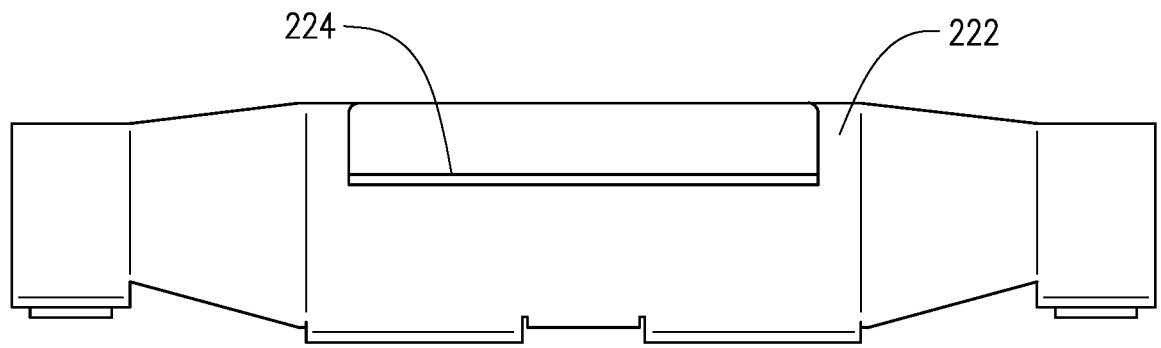
Figure 40:
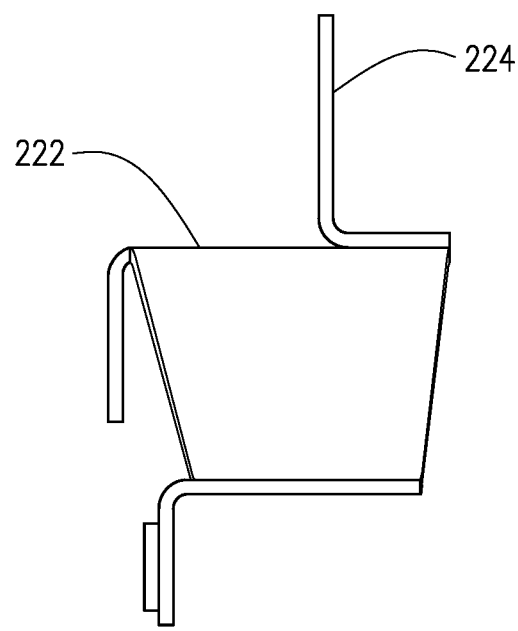
FIG. 40 is a side elevation view of the upper rail hanger shown in FIG. 38, taken along line 40-40.
Figure 41:
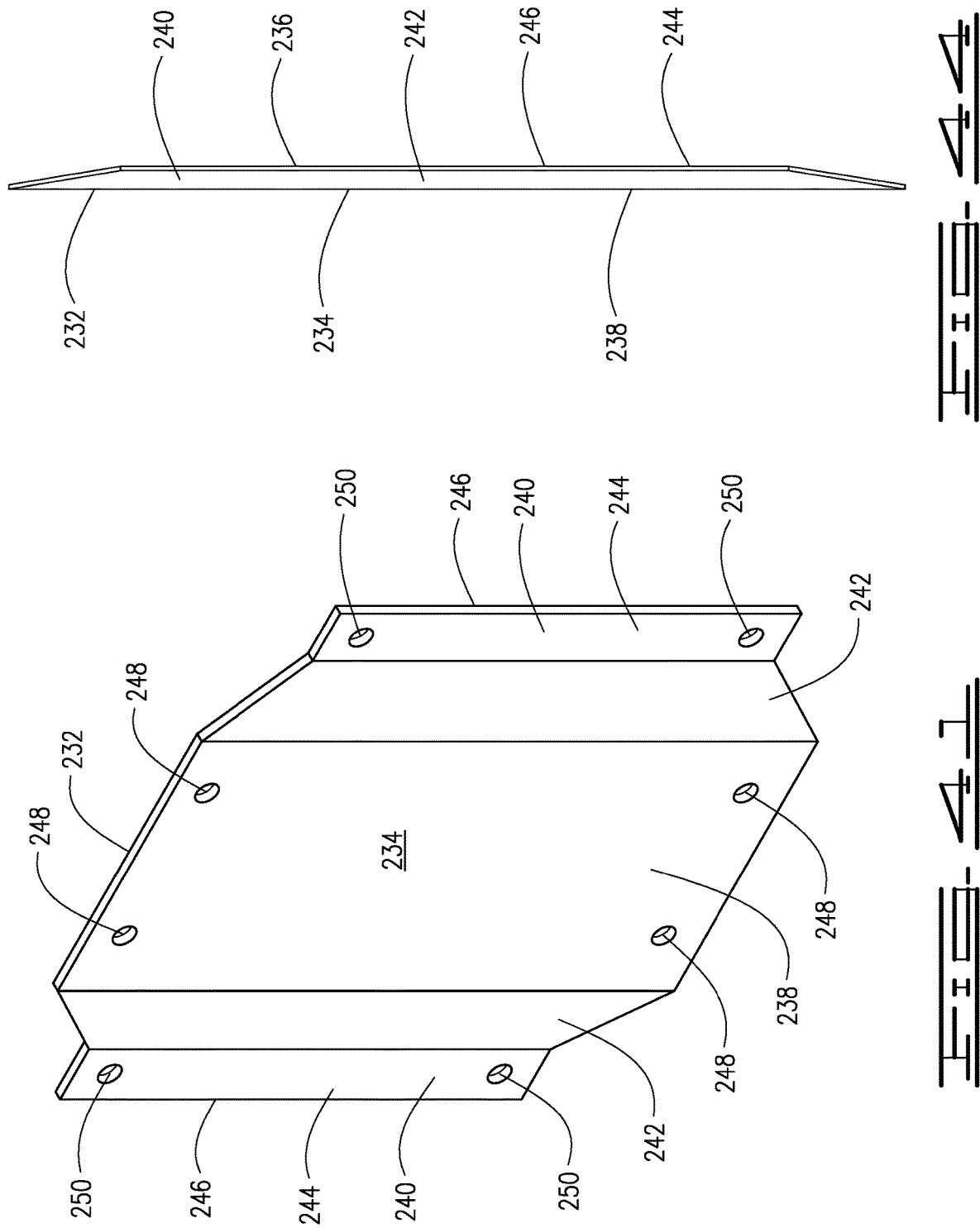
FIG. 41 is a perspective view of a post cover.
Figure 42:
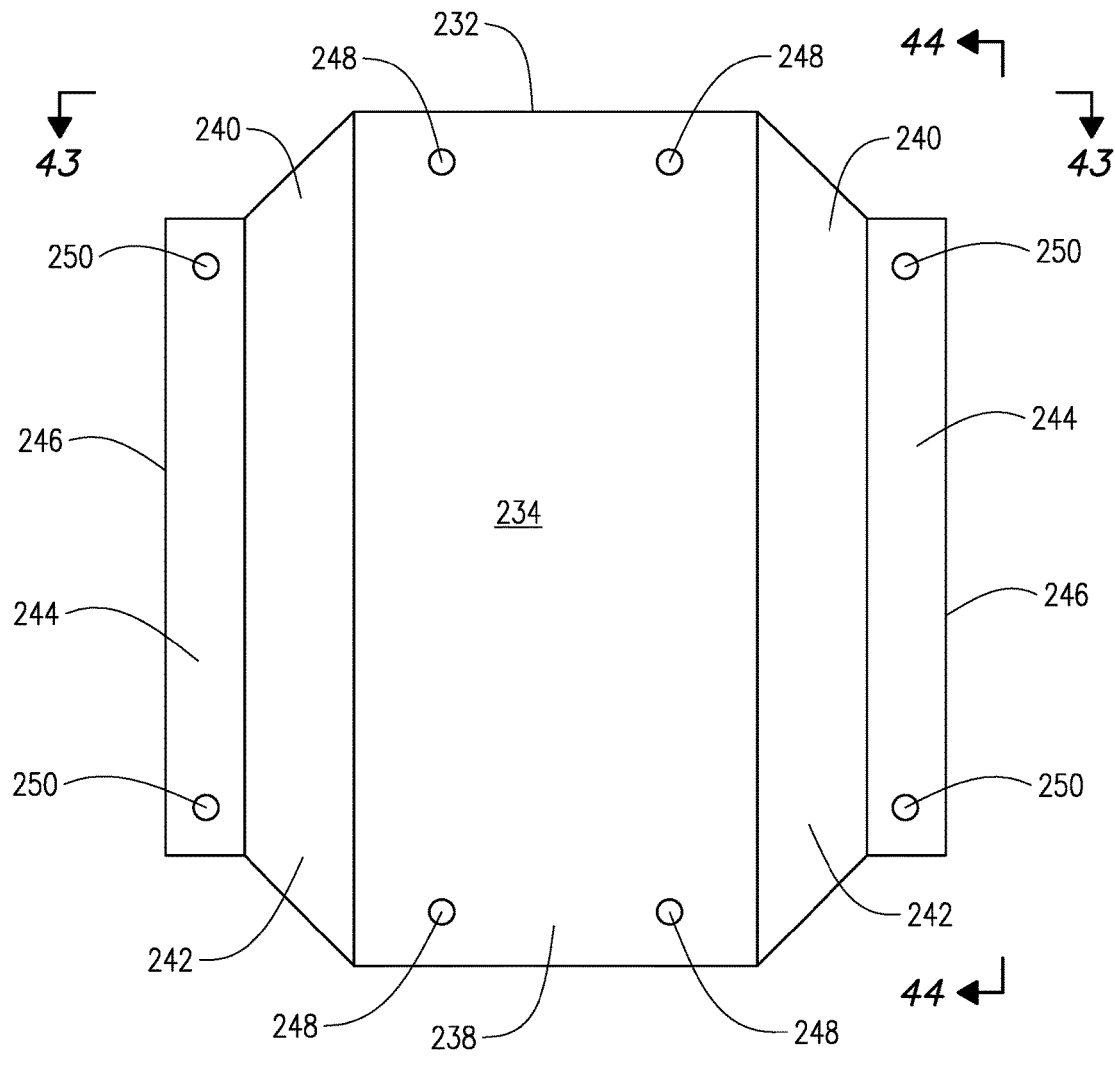
FIG. 42 is a front elevation view of the post cover shown in FIG. 41.
Figure 43:
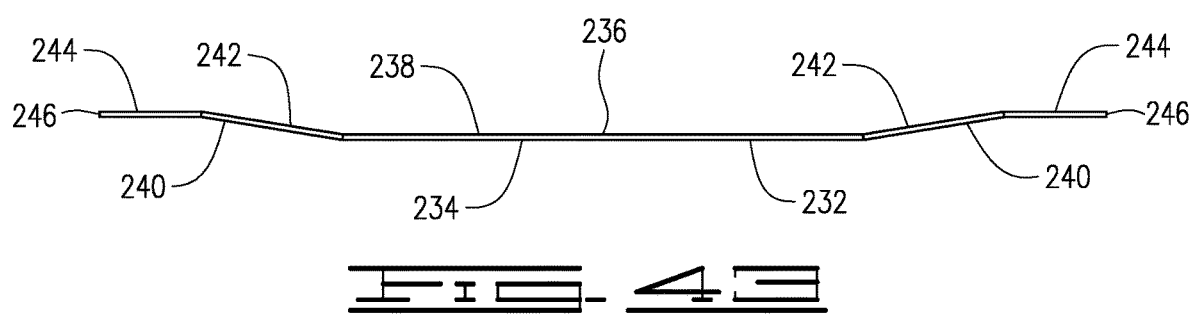
FIG. 43 is a top plan view of the post cover shown in FIG. 42, taken along line 43-43.

The first and second columns 34 and 36 are rigidly interconnected, and maintained in parallel and laterally offset relationship, by a pair of braces 42. The braces 42, one of which is shown in FIG. 5, are preferably identical in size, shape and structure. Each brace 42 comprises a flat member formed from a strong and durable material, such as steel.

Each brace 42 is characterized by a first opening 44 and a laterally offset second opening 46. The first opening 44 is sized to closely, but clearingly, receive the first column 34, while the second opening 46 is sized to closely, but clearingly, receive the second column 36. The openings 44 and 46 are preferably circular in shape. In one embodiment, each brace 42 is formed from ASTM A36 steel, with a thickness of 0.75 inches. Each of the openings 44 and 46 has a diameter of 8.75 inches. The separation distance between the respective centers of the openings 44 and 46 is 11.88 inches.

The first column 34 is received through the first opening 44 of each brace 42, while the second column 36 is received through the second opening 46 of each brace 42. Each brace 42 is permanently secured to both the first and second columns 34 and 36, preferably by welding. Welds between the brace 42 and each column are formed around the periphery of the openings 44 and 46. Once installed, the braces 42 should be disposed in parallel relationship.

When the columns 34 and 36 are installed within the braces 42, the upper end 48 of the first column 34 is preferably longitudinally aligned with the upper end 50 of the second column 36. In one embodiment, the upper brace 42 is positioned 0.81 inches below the upper end of each column. The upper and lower braces 42 are longitudinally separated by a distance of 35.25 inches. The separation distance between the centers of the adjacent columns 34 and 36 is 11.88 inches.

Two longitudinally-spaced front clamp openings 52 are formed in a side wall of the second column 36. The openings 52 are situated along a line that extends parallel to the longitudinal axis of the second column 36. Two more longitudinally-spaced rear clamp openings (not shown) are formed in another or the same side wall. Each rear clamp opening is aligned with a corresponding one of the front clamp openings 52. Preferably each pair of front and rear clamp openings is situated on a line that traverses the second column 36 at an area of maximum cross-sectional dimension. When the second column 36 is cylindrical, each front clamp opening 52 is diametrically opposed to its corresponding rear clamp opening. In one embodiment, the separation distance of the front clamp openings 52 is 30.13 inches.

Two longitudinally-spaced front U-bolt openings 54 are formed in a side wall of the first column 34. The openings 54 are situated along a line that extends parallel to the longitudinal axis of the first column 34. Two more longitudinally-spaced rear U-bolt openings (not shown) are formed in another or the same side wall. Each rear U-bolt opening is aligned with a corresponding one of the front U-bolt openings 54. Preferably each pair of front and rear U-bolt openings is situated on a line that traverses the first column 34 at an area of maximum cross-sectional dimension. When the first column 34 is cylindrical, each front U-bolt opening 54 is diametrically opposed to its corresponding rear U-bolt opening. In one embodiment, the separation distance of the front U-bolt openings 54 is 13.05

Two longitudinally-spaced and internally threaded standoffs 56 are installed on a portion of the first column 34 most distant from the second column 36. Preferably, the standoffs are offset from the front U-bolt openings 54 by an angle of 90 degrees, measured with reference to the longitudinal axis of the second column 36. In one embodiment, the standoff 56 has a hexagonal cross-sectional profile, a length of one inch and a maximum side-to-side dimension of 0.33 inches. The separation distance between the standoffs 56 is 17.44 inches.

A lower base plate 58, shown in FIG. 3, preferably comprises a flat member having a longitudinal footprint that can fully contain the longitudinal footprint of the first column 34. Preferably, the lower base plate 58 is shaped as a square or circle. The lower base plate 58 should be formed from a strong and durable material, such as steel.

A plurality of openings (not shown) are formed around the periphery of the lower base plate 58. A larger opening, having a maximum cross-sectional dimension smaller than the maximum cross-sectional dimension of the first column 34, is formed at the center of the lower base plate 58. The central opening permits drainage from the first column 34 after its assembly with the lower base plate 58.

The lower base plate 58 is attached to the base 38 of the first column 34, preferably by welding. When attached, the lower base plate 58 should extend orthogonally to the longitudinal axis of the first column 34. The longitudinal footprint of the first column 34 is fully contained within the longitudinal footprint of the lower base plate 58.

In the embodiment shown in the Figures, the lower base plate 58 is square in shape, with a side length of 18 inches. A total of sixteen peripheral openings are formed in the lower base plate 58, such that four openings are situated adjacent each of the four corners. The lower base plate 58 has a thickness of 0.5 inches. The central opening has a diameter of 4 inches. The lower base plate 58 is formed from ASTM A36 steel.

The end post 16 further comprises a plurality of elongate foot elements 60 that project radially from the first column 34 adjacent its base 38. The foot elements 60 enlarge the footprint of the end post 16, thereby enhancing its resistance to being pulled from its footing 28. The foot elements 60, which are preferably identical, should be formed from a strong and durable material, such as steel. Each foot element 60 has a rectilinear longitudinal axis and a uniform cross-sectional shape.

Each foot element 60 preferably comprises an elongate I-beam formed from a pair of flat, spaced and parallel flanges. The flanges are centrally joined by an orthogonal and flat web. Adjacent one end of the foot element 60, a plurality of openings are formed in each flange, in a number equal to the number of peripheral openings at a corner of the lower base plate 58. Each opening in each flange overlies a corresponding opening formed in the other flange. These openings register with the plural openings formed at a corner of the lower base plate 58.

Preferably the central angle formed by each adjacent pair of foot elements 60, measured about the longitudinal axis of the first column 34, is uniform. In the embodiment shown in the Figures, the foot elements 60 are four in number, with an angular separation of ninety degrees between each adjacent pair of foot elements 60.

In one embodiment, each foot element 60 has a length of 30 inches, a flange width of 5.15 inches, and a height of 5.05 inches. The web has a thickness of 0.27 inches, while each flange has a thickness of 0.45 inches. An array of four openings are formed in each flange adjacent one end of the foot element 60. In each flange, two openings are formed on each side of the web. The foot element 60 is formed from ASTM A992 steel.

Each end post 16 further comprises a plurality of upper base plates 62. The upper base plates 62 are preferably formed from the same material as the lower base plate 58. Each upper base plate 62 has a generally rectangular shape, with a size that matches that produced by bisecting a single lower base plate 58 at the midpoints of two opposed sides. A semicircular recess is formed within one of the two major sides of each upper base plate 62. Sets of peripheral openings that register with the openings in the foot element 60 and lower base plate 58 are formed in the two corners opposite the recess-containing edge of the upper base plate 62.

A pair of upper base plates 62 are assembled by bringing them together, in coplanar relationship, until they surround the first column 34. The recess of each upper base plate 62 surrounds one-half of the periphery of the first column 34. The recesses of the upper base plates 62, when assembled, should be sized to closely but clearingly receive the first column 34 therein. Each of the assembled upper base plates 62 is oriented orthogonally to the longitudinal axis of the first column 34.

If more than a single pair of upper base plates 62 is provided, each pair is assembled as described, and the respective pairs are stacked such that their respective longitudinal footprints are aligned. Sets of peripheral openings formed in each upper base plate 62 should be aligned with the sets of peripheral openings formed in other upper base plates 62. Preferably, the junction between each assembled pair of base plates is angularly offset from the junction of the next adjacent assembled pair of base plates. The angle of offset is 90 degrees about the first column 34.

In one embodiment, each upper base plate 62 has a major side length of 18.0 inches, a minor side length of 8.63 inches, and a thickness of 0.5 inches. The semicircular recess is centered on one of the major sides, and has a diameter of 9.38 inches. Four upper base plates 62 are provided, arranged in two stacked pairs.

Individually adjustable risers 64 are preferably installed in openings formed in the lower flange at the exposed end of each foot element 60. The risers 64 are positioned on the opposite side of the foot element 60 from the lower base plate 58. The risers 64 permit small adjustments to the height and attitude of the foot elements 60, and thus the first column 34. Such adjustments may be required to establish the desired above-ground height and attitude for each end post 16.

The foot elements 60 are sandwiched between the lower base plate 58 and the upper base plate 62. Fasteners, such as nut and bolt assemblies, are used to join these components, and to maintain orientation of the foot elements 60. Specifically, a bolt is inserted through each aligned set of peripheral openings in each of the lower base plate 58, foot element 60 and upper base plate 62, and actuated by installing a nut.

To form the end post 16, the first column 34, second column 36 and braces 42 are first assembled, and the lower base plate 58 installed at the base 38 of the first column 34. The foot elements 60 are next positioned atop the lower base plate 58, and the upper base plates 62 positioned atop the foot elements 60. These sandwiched components are then assembled with fasteners.

Once assembled, each end post 16 is embedded in a vertically upright position within an enlarged footing 26, as shown in FIG. 6. Preferably, the end post 16 is first positioned within a hole within the terrain 12. The hole is next filled with a ballast material, such as concrete. The ballast material surrounds the first column 34 adjacent its base 38, and sets to form the footing 26. The base 38 is situated below the level of the terrain 12. As shown in the Figure, the base 40 of second column 36 is longitudinally offset from the base 38. The base 40 is situated above the footing 26 and above the level of the terrain 12, but within the footprint of the footing 26.

The first end post 18 and second end post 20 are preferably characterized by identical size, shape and construction. The only difference between the end posts 18 and 20 is that one should be formed as a mirror image of the other.

An intermediate post 22 is shown in FIGS. 7-9. Each intermediate post 22 is formed from a tubular column 66 and a base plate 68. The column 66 preferably comprises an open-ended elongate tubular member, and more preferably comprises a hollow cylinder. Preferably, the column 66 comprises a length of pipe formed from a strong and durable material, such as steel. In one embodiment, the column 66 is formed from schedule 40 steel pipe. The column 66 has an outside diameter of 8.63 inches, an inside diameter of 7.98 inches, and a length of 67.52 inches.

Two longitudinally-spaced front U-bolt openings 76 are formed in a side wall of the column 66. The openings 76 are situated along a line that extends parallel to the longitudinal axis of the column 66. Two more longitudinally-spaced rear U-bolt openings (not shown) are formed in another or the same side wall. Each rear U-bolt opening is aligned with a corresponding one of the front U-bolt openings 76. Preferably each pair of front and rear U-bolt openings is situated on a line that traverses the column 66 at an area of maximum cross-sectional dimension. When the column 66 is cylindrical, each front U-bolt opening 76 is diametrically opposed to its corresponding rear U-bolt opening. In one embodiment, the separation distance of the front U-bolt openings 76 is 13.05 inches.

Two longitudinally-spaced and internally threaded standoffs 78 are installed on the column 66. The standoffs 78 are aligned with the front U-bolt openings, such that both of the openings 76 are centrally disposed therebetween. In one embodiment, each standoff 78 has a hexagonal cross-sectional profile, a length of one inch and a maximum side-to-side dimension of 0.33 inches.

A base plate 68, shown in FIGS. 7 and 8, preferably comprises a flat member having a longitudinal footprint that can fully contain the longitudinal footprint of the column 66. Preferably, the base plate 68 is shaped as a square or circle. The base plate 68 should be formed from a strong and durable material, such as steel.

A plurality of openings are formed around the periphery of the base plate 68, preferably with at least one opening situated adjacent each corner. A larger opening, having a maximum cross-sectional dimension smaller than the maximum cross-sectional dimension of the column 66, is formed at the center of the base plate 68. The central opening permits drainage from the column 66 after its assembly with the base plate 68.

The base plate 68 is attached to the base of the column 66, preferably by welding. When attached, the base plate 68 should extend orthogonally to the longitudinal axis of column 66. The longitudinal footprint of the column 66 should be fully contained within the longitudinal footprint of the base plate 68. Individually-adjustable risers 80 are installed in the peripheral openings, and positioned on the opposite side of the base plate 68 from the column 66. The risers 80 permit small adjustments to the height and attitude of the base plate 68, and thus the column 66. Such adjustments may be required to establish the desired above-ground height and attitude for the intermediate post 22.

In the embodiment shown in the Figures, the base plate 68 is square in shape, with a side length of 14 inches. Four peripheral openings are formed in the base plate 68, with one adjacent each of the four corners. The base plate 68 has a thickness of 0.25 inches, and the central opening has a diameter of 4 inches. The base plate 68 is formed from ASTM A36 steel.

The intermediate post 22 is embedded in a vertically upright position within a standard footing 28, as shown in FIG. 9. Preferably, the intermediate post 22 is first positioned within a hole within the terrain 12. The hole is next filled with a ballast material, such as concrete. The ballast material surrounds the column 66 adjacent its base, and sets to form the footing 28.

In the embodiment shown in FIGS. 1 and 2, the barrier 10 comprises a single intermediate post 22. In other embodiments, however, a barrier may comprise a plurality of identical intermediate posts, preferably of identical size, shape and construction. For example, the barrier 70 shown in FIG. 10 includes fourteen intermediate posts 72 situated between a pair of end posts 74. The separation distance between adjacent intermediate posts 72 is sixteen feet. The barrier 70 is otherwise identical to the barrier 10. In general, the number of intermediate posts is limited only by the length of the cable or cables forming the barrier.

When an intermediate post is to be situated at a corner of a barrier, its structure may vary from that described with reference to the intermediate posts 22 and 72. For example, such a cornering post (not shown) may include more than one pair of upper and lower standoffs. In one embodiment, two pairs of longitudinally aligned upper and lower standoffs are provided for a cornering post. Preferably, the pairs are situated at the same height on the post, with one pair angularly offset from the other. One preferred angle of offset is ninety degrees.

A cornering post may also include features that make it stronger and more resistant to impact than an intermediate post 22 or 72. For example, a cornering post may have a heavier-duty construction than the intermediate post 22 or 72, such as the same construction as the column 34 of the end post 16. Similarly, a cornering post may include foot elements at its base, like the foot elements 60 attached to the lower end of the first column 34.

In another embodiment, not shown in the Figures, the posts that form the barrier are longer than the posts 14, and embedded in footings that are more massive and extend deeper than the footings 24. For example, footings may be formed in a hole having a depth of four or five feet. In such an embodiment, foot elements and other reinforcing structure may be omitted from the posts.

The barrier 10 further comprises a plurality of U-bolts 82, one of which is shown in FIG. 11. The U-bolts 82 are preferably of identical size, shape and construction, and are formed from a strong and durable material, such as steel. The number of U-bolts 82 preferably equals the number of posts 14 in the barrier 10.

Each U-bolt 82 is a U-shaped member formed from a rectilinear base having opposed ends. A pair of spaced, rectilinear, coplanar and parallel legs join the base at its opposite ends. The legs extend in the same direction from, and in orthogonal relationship to, the base. The legs are preferably of equal length and each is externally threaded at its free end. Preferably, the legs and base of each U-bolt are formed as a single piece.

Each leg of the U-bolt 82 is cross-sectionally sized to be closely but clearingly received within the front U-bolt openings 54 and 76, and the corresponding rear U-bolt openings. Likewise, the spacing of the U-bolt legs is chosen to match the separation distance between the front U-bolt openings 54, between the front U-bolt openings 76, and between the corresponding rear U-bolt openings. The length of each leg is sufficient to permit the leg, once inserted into an opening 54 or 76, to traverse its associated column and exit through the corresponding rear U-bolt opening.

In one embodiment, the U-bolt 82 is formed from a rod of ASTM A193 grade B7 steel. The rod has a diameter of one inch. Each leg has a length of 12 inches. The leg-to-leg separation distance, measured between their respective centers, is 13.05 inches. Each leg is provided with 2 inches of threading at its free end.

The barrier 10 further comprises a plurality of clamps 84, shown in FIGS. 12-15. Preferably, one clamp 84 is provided for each end post 16. Each clamp 84 is configured to press at least one cable 30 against an end post 16, and more particularly against the second column 36 of an end post 16. The clamps 84 are preferably identical in size, shape and construction, and are formed from a strong and durable material, such as steel. The only difference between the clamps respectively installed the end posts 18 and 20 is that one should be formed as a mirror image of the other.

Each clamp 84 is characterized by a generally C-shaped body 86 that is preferably formed from a single piece of material and bent into the required shape. Comprising the body 86 is a flat and elongate base 88, preferably rectangular in shape. The body 86 further comprises a pair of spaced, rectilinear, flat and parallel legs 90, which join the base 88 at its opposite ends. The legs 90 are preferably of equal length and of rectangular shape. The legs 90 extend in the same direction from, and in orthogonal relationship to, the base 88. The base 88 and legs 90 cooperate to form boundaries of a cable recess 92.

Further comprising the body 86 is a pair of rectangular attachment tabs 94. Each attachment tab 94 joins a respective leg 90, at the end thereof opposite the base 88. Each attachment tab 94 extends away from the base 88, in orthogonal relationship to its joined leg 90. The two attachment tabs 94 are coplanar, and extend parallel to the base 88. A fastener opening 96 is formed in each attachment tab 94. The separation distance between the fastener openings 96 in the clamp 84 preferably matches the separation distance between the front clamp openings 52 in the second column 36.

The base 88 has an upper side 98 and an opposed lower side 100. A strengthening rib 102 is formed on the upper side 98. One or more spaced and aligned restraining elements 104 are formed on the lower side 100 of the clamp 84. Preferably, the number of restraining elements 104 equals the number of cables 30 in the barrier 10. Each restraining element 104 functions to press a corresponding cable against the end post 16. The restraining elements 104 are preferably identical in size, shape and construction.

Each restraining element 104 comprises a first contact element 106, shown in FIGS. 16-19. The first contact element 106 is a block-shaped member having flat, opposed and parallel first and second ends 108 and 110. Extending between and interconnecting the ends 108 and 110 is an external face 112 within which a concave indentation 114 is formed. The indentation 114 extends along and curves around an axis 116 that intersects the planes containing the ends 108 and 110. The indentation 114 preferably has the cross-sectional shape of a crescent, and more preferably the cross-sectional shape of a semicircle. The indentation 114 has opposed side wall sections 118 that converge in the direction of the second end 110 and toward the axis 116, as shown in FIG. 15. Preferably, the indentation 114 traverses the entire face 112 between the first and second ends 108 and 110.

Each restraining element 104 preferably further comprises a second contact element 120, shown in FIGS. 20-23. The second contact element 120 is a block-shaped member sized and shaped similarly to the first contact element 106. The second contact element 120 has flat, opposed and parallel first and second ends 122 and 124. Extending between and interconnecting the ends 122 and 124 is an external face 126 within which a concave indentation 128 is formed.

The first end 122 of the second contact element 120 is situated adjacent the second end 110 of the first contact element 106 such that their respective indentations 114 and 128 are axially aligned along the axis 116, as shown in FIG. 15. Thus, the indentation 128 extends along and curves around the axis 116, which intersects the planes containing the ends 122 and 124. The indentation 128 preferably has the cross-sectional shape of a crescent, and more preferably the cross-sectional shape of a semicircle. The indentation 128 has opposed side wall sections 130 that extend parallel to the axis 116. Preferably, the indentation 128 traverses the entire face 126 between the first and second ends 122 and 124.

In the embodiment shown in the Figures, the first and second contact elements 106 and 120 have been shown as distinct members. Alternately, the first and second contact elements of a restraining element may be formed as a unitary member.

Preferably, the restraining elements 104 of the clamp 84 comprise a first restraining element 132, a second restraining element 134, and a third restraining element 136. The first and third restraining elements 132 and 136 respectively engage different legs 90 of the clamp 84. The second restraining element 134 is positioned between the first and third restraining elements 132 and 136, in spaced relationship to both.

In one embodiment, the body 86 of the clamp 84 is made from ASTM A36 steel. The body 86 is formed from a strip of material having a width of 4.00 inches and a thickness of 0.25 inches. The base 88 has a length of 27.09 inches, each leg 90 has a length of 2.00 inches, and each attachment tab 94 has a length of 2.75 inches. The minimum separation distance between the second and third restraining elements 134 and 136 is 4.88 inches.

The contact elements 106 and 120 of each restraining element 104 are likewise formed from ASTM A36 steel. Each contact element 106 and 120 is formed from a block of material having the general shape of a rectangular prism, with a major side of 2.13 inches, a minor side of 2.00 inches, and a thickness of 0.50 inches. The minimum radius of the indentation 114 is 0.81 inches, and the angle between the converging side wall sections 118 and the axis 116 is 12 degrees. The radius of the indentation 128 is 0.81 inches throughout.

The clamps 84 that are attached to the first end post 18 and second end post 20 are preferably characterized by identical size, shape and construction. The only difference between these clamps is that one should be formed as a mirror image of the other.

The barrier 10 further comprises a plurality of clips 138, one of which is shown in FIGS. 24-27. Preferably, the number of clips 138 is twice the number of cables 30, with one clip 138 attached adjacent each end 32 of each cable 30. The clips 138 are preferably identical in size, shape and construction, and are formed from a strong and durable material, such as steel.

The clip 138 comprises a cradle 140 traversed by a centrally disposed groove 142, which is preferably corrugated. Surrounding the groove 142 are a plurality of upward-extending lugs 144. The cradle 140 includes a pair of wings 146 situated on opposite sides of the groove 142. A leg opening 148 penetrates each wing 146. The opposed legs 152 of a U-shaped shackle 150 are received through the leg openings 148. Each leg 152 of the shackle 150 is releasably secured to the cradle 140 by a nut 154. The assembled shackle 150 and cradle 140 define boundaries of an opening 156 through which a cable may pass. If needed to make the opening 156 closely fit a single cable, one or more washers 158 may be installed on each leg 152 of the shackle 150, and interposed between the cradle 140 and the nut 154.

The clip 138 may be installed by positioning a cable 30 within the groove 142 and extending it through the cradle 140. The legs 152 of the shackle 150 are inserted through the leg openings 146, and any needed washers 158 installed on the legs 152. Nuts 154 are installed on each leg 152 and tightened against the cradle 140. The cable 30 extends through the opening 156, and is firmly gripped between the shackle 150 and the cradle 140.

A clip 138 suitable for forming the barrier 10 is the Crosby G-450 forged wire rope clip, manufactured by The Crosby Group LLC, of Tulsa, Oklahoma. In one embodiment, the clip 138 is sized to fit a wire rope size of 1.75 inches. The general structure of an acceptable clip is described and shown in U.S. Pat. No. 833,840.

The barrier 10 further comprises a plurality of rigid spikes 160, one of which is shown in FIGS. 28-30. Preferably, the number of spikes 160 is twice the number of cables 30 forming the barrier 10. One spike 160 is embedded into each end 32 of each cable 30. The spikes 160 are preferably identical in size, shape and construction, and are formed from a strong and durable material, such as steel.

The spike 160 is symmetric about its longitudinal axis, such that any cross-section has a circular shape. The spike 160 extends between opposed first and second ends 162 and 164, and includes a first enlarged section 166 and a spaced-apart second enlarged section 168. The second enlarged section 168 terminates at the second end 164. Preferably the second enlarged section 168 has a greater diameter than the first enlarged section 166. An elongate constriction 170 is formed between the enlarged sections 166 and 168. The constriction 170 has a lesser diameter than either of the enlarged sections 166 and 168. On the opposite side of the first enlarged section 166 from the constriction 170, a tapered point 172 is formed. The point 172 terminates at the first end 162.

In one embodiment, each spike 160 is formed from AISI 4140 steel. The spike 160 has a length of 6.00 inches. The first enlarged section 166 has a length of 0.75 inches and a diameter of 0.63 inches. The second enlarged section 168 has a length of 0.50 inches and a diameter of 0.75 inches. The constriction 170 has a length of 1.67 inches and a diameter of 0.25 inches. The point 172 has a length of 1.50 inches and a minimum diameter of 0.06 inches, at the first end 162.

As shown in FIGS. 31 and 32, a spike 160 is longitudinally embedded within each cable 30 at or adjacent each of its ends 32. Preferably, the spike 160 is driven into the end 32. The point 172 is the first portion of the spike 160 to enter the cable 30. The spike 160 continues to be driven until its second end 164 is flush with the end 32.

Figure 73:
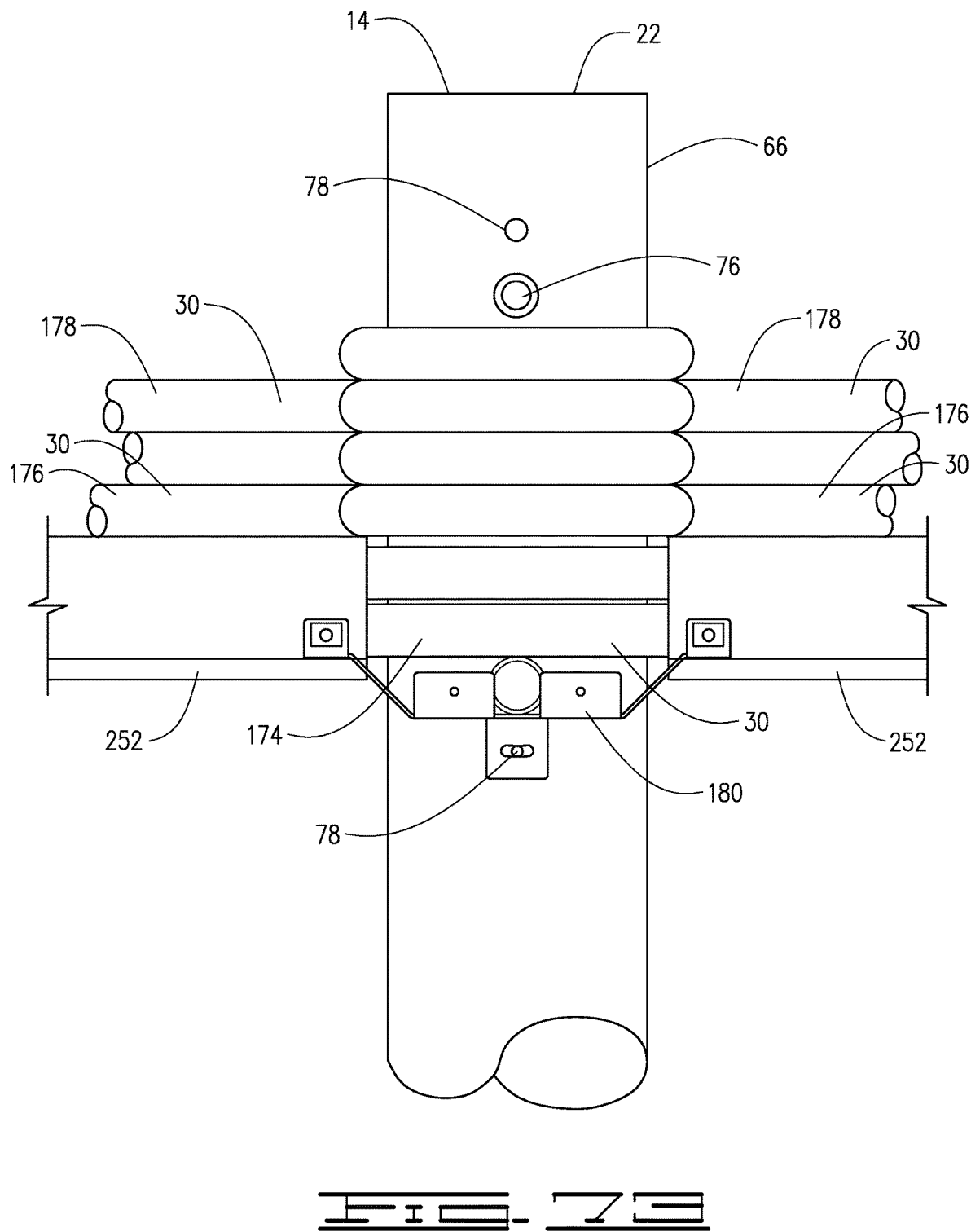

The one or more cables 30 included in the barrier 10 enhance its resistance to penetration by a moving vehicle. Preferably, the barrier 10 comprises a plurality of cables 30. As illustrated in FIGS. 64 and 73, three such cables are provided in the embodiment shown in the Figures: a first cable 174, a second cable 176, and a third cable 178. Each cable 30 is preferably a unitary member having a length sufficient to traverse the distance between the end posts 16, and to form the necessary windings around the posts 14, as described hereafter. One exemplary length for a cable 30 is 1,700 feet. A preferred diameter for each cable 30 is 1.625 inches.

The cables 30 are preferably formed from non-metallic fibers, such as polyester. One preferred cable is made from Yalevet, a parallel core cable material formed from polyethylene terephthalate filament and manufactured by Yale Cordage, Inc. of Saco, Maine. A non-metallic cable is of lighter weight, and easier to handle than a corresponding metallic cable. Cables formed from non-metallic fibers also have greater elasticity than corresponding metallic cables. A non-metallic cable can thus better absorb the energy of a vehicular collision without rupture, thereby enhancing the resistance of a barrier to penetration.

The barrier 10 preferably further comprises a plurality of lower hangers 180, one of which is shown in FIGS. 33-36. The number of lower hangers 180 is preferably equal to the number of posts 14 forming the barrier 10. The lower hangers 180 are preferably identical in size, shape and construction, and are formed from a strong and durable material, such as steel.

Comprising each lower hanger 180 is a body 182 that is preferably flat and rectangular in shape. The body 182 includes opposed front and rear edges 184 and 186, which interconnect spaced first and second side edges 188 and 190. Preferably, the front and rear edges 184 and 186 are the major edges of the body 182, and the first and second side edges 188 and 190 are its minor edges. The body 182 also features an upper side 192 and a lower side 194.

A positioning tab 196 projects from a central portion of the body 182 intermediate the side edges 188 and 190. The tab 196 is positioned adjacent the rear edge 186, but in spaced relationship thereto, and extends adjacent the upper side 192. Preferably the positioning tab 196 is flat, and extends in parallel relationship to the rear edge 186, and in orthogonal relationship to the body 182. In the embodiment shown in the Figures, the positioning tab 196 comprises one leg of an L-shaped member that is welded or otherwise attached to the body 182 at its other leg. In other embodiments, the body 182 and tab 196 may be formed as a single piece. An arcuate opening 198 is formed in the tab 196, in spaced relationship to the edges of the tab 196. The opening 198 follows a concave path that opens toward the upper side 192 of the body 182.

An elongate arm 200 projects from the first side edge 188, and an opposed and identical arm 200 projects from the second side edge 190. The opposed arms 200 extend adjacent the lower side 194 of the body 182. Preferably, the arms 200 and the body 182 are formed as a single piece.

Each arm 200 comprises a flat medial section 204 that joins the body 182 at one of its side edges 188 and 190. Each medial section 204 forms an angle of 45 degrees relative to the body 182, and is preferably trapezoidal in shape. Opposite the side edge, the medial section 204 joins a flat terminal section 206 having a free end 208. Each terminal section 206 is preferably rectangular in shape, and extends in parallel relationship to the body 182.

A cover attachment site 210 is supported by each arm 200 adjacent its free end 208. Preferably, the cover attachment site 210 depends from an edge of the terminal section 206 and is situated adjacent the front edge 184 of the body 182. The cover attachment site 210 is preferably a flat member of rectangular shape having a fastener opening 212 formed therein. The cover attachment site 210 preferably extends in orthogonal relationship to the body 182. A plane containing the two fastener openings 212 preferably extends parallel to a plane containing the body 182.

A flat spacer 214 may be attached to the front side of the cover attachment site 210, preferably by welding. The spacer 214 has a more compact profile than that of the cover attachment site 210, and includes a fastener opening that registers with the opening 212.

Two spaced mounting tabs 216 depend from the front edge 184 of the body 182, and extend adjacent its lower side 194. Preferably, each mounting tab 216 is flat and rectangular in shape, and extends in orthogonal relationship to the body 182. Each mounting tab 216 has a fastener opening 218 formed therein.

An open-ended tubular member 220, preferably cylindrical in shape, is supported by the lower side 194 of the body 182. Preferably, the tubular member 220 is permanently secured to the lower side 194, such as by welding. The tubular member 220 is fully contained within the footprint of the body 182. The longitudinal axis of the tubular member 220 extends parallel to the side edges 188 and 190. The center of the tubular member 220 coincides with the center of curvature of the arcuate opening 198.

Preferably, the body 182, arms 200, cover attachment sites 210 and mounting tabs 216 of the lower hanger 180 are formed as a single piece. That piece is bent to form the different portions of the lower hanger 180 described above. In one embodiment, the body 182 has a length of 6.28 inches and a width of 2.94 inches. Each terminal section 206 has a length of 1.45 inches and a width of 2.50 inches. The body 182 and the arms 200 have a thickness of 0.13 inches. The end-to-end length of the lower hanger 180 is 14.00 inches.

In the same embodiment, the positioning tab 196 has a width of 2.00 inches, a height of 2.00 inches, and a thickness of 0.13 inches. The arcuate opening 198 has a radius of 2.81 inches and subtends a central angle of 14 degrees. Each cover attachment site 210 has a width of 1.45 inches, a height of 1.25 inches, and a thickness of 0.13 inches. Each mounting tab 216 has a width of 2.65 inches, a height of 1.50 inches, and a thickness of 0.13 inches. Each spacer 214 has a major side of 1.00 inches, a minor side of 0.75 inches and a thickness of 0.13 inches. The tubular member 220 has a length of 1.75 inches, a diameter of 1.90 inches and a wall thickness of 0.15 inches.

The barrier 10 preferably further comprises a plurality of upper hangers 222, one of which is shown in FIGS. 37-40. The number of upper hangers 222 is preferably equal to the number of posts 14 forming the barrier 10. The upper hangers 222 are preferably identical in size, shape and construction, and are formed from a strong and durable material, such as steel.

The upper hanger 222 and its components are identical to the lower hanger 180 and its components, except in two regards. First, the upper hanger 222 preferably does not include a tubular member corresponding to the tubular member 220 of the lower hanger 180. Second, the positioning tab 224 has a greater width, and its arcuate opening 226 has a greater length, than the corresponding features of the positioning tab 196 of the lower hanger 180. The opening 226 follows a concave path that opens toward the upper side of the body of the upper hanger 222.

When the upper and lower hangers 180 and 222 are installed on the same post 14, each of the openings 198 and 226 have a common center of curvature, at the center of tubular member 220. This coincidence allows the upper and lower hangers 180 and 222 to be rotated as a unit relative to the post 14. Such rotation may be required to conform the slope of the lower and upper cable covers, to be described hereafter, to the slope of the terrain 12.

In the same embodiment described with reference to the lower hanger 180, the width of the positioning tab 224 in the upper hanger 222 is 5.75 inches. The arcuate opening 226 has a radius of 14.00 inches and subtends a central angle of 16 degrees. Other dimensions and angles in the upper hanger 222 are identical to those described with reference to the lower hanger 180.

The barrier 10 preferably further comprises a plurality of post covers 232, one of which is shown in FIGS. 41-44. Each post cover 232 interconnects an adjacent pair of upper and lower hangers 180 and 222 on a post 14, and covers the space between those hangers. The number of post covers 232 is preferably equal to the number of posts 14 forming the barrier 10. The post covers 232 are preferably identical in size, shape and construction, and are formed from a strong and durable material, such as steel.

The post cover 232 is preferably formed from a single thin and flat sheet of material that is bent or folded into the required shape. The post cover 232 features a convex front side 234 and a concave rear side 236. Forming each post cover 232 are a central section 238 that is flanked on each side by a wing section 240. Each wing section 240 preferably comprises a connecting section 242 that joins a side of the central section 238, and a terminal section 244 that joins a side of the connecting section 242. The terminal section 244 includes a free end 246.

The two terminal sections 244 of the post cover 232 are preferably situated within a single plane. The plane containing the central section 238 and the plane containing the terminal sections 244 are spaced and preferably parallel. The boundary at which the connecting section 242 joins the central section 238, and the boundary at which the terminal section 244 joins the connecting section 242, are preferably rectilinear and parallel.

The central section 238 preferably has a rectangular shape and is provided with a fastener opening 248 adjacent each corner thereof. The terminal section 244 is likewise preferably rectangular and provided with a fastener opening 250 adjacent each of its two minor sides. Each terminal section 244 has a lesser top-to-bottom height than that of the central section 238. The shape of each connecting section 242 is preferably trapezoidal.

In one embodiment, the post cover 232 has an end-to-end width, from one free end 246 to the other, of 14.05 inches. The central section 238 has a width of 7.26 inches and a height of 15.39 inches. Each terminal section 244 has a width of 1.42 inches and a height of 11.47 inches. On the rear side 236, the connecting section 242 and central section 238 form an included angle of 171 degrees. Each of the sections 238, 242 and 244 has a thickness of 0.07 inches.

Figure 45:
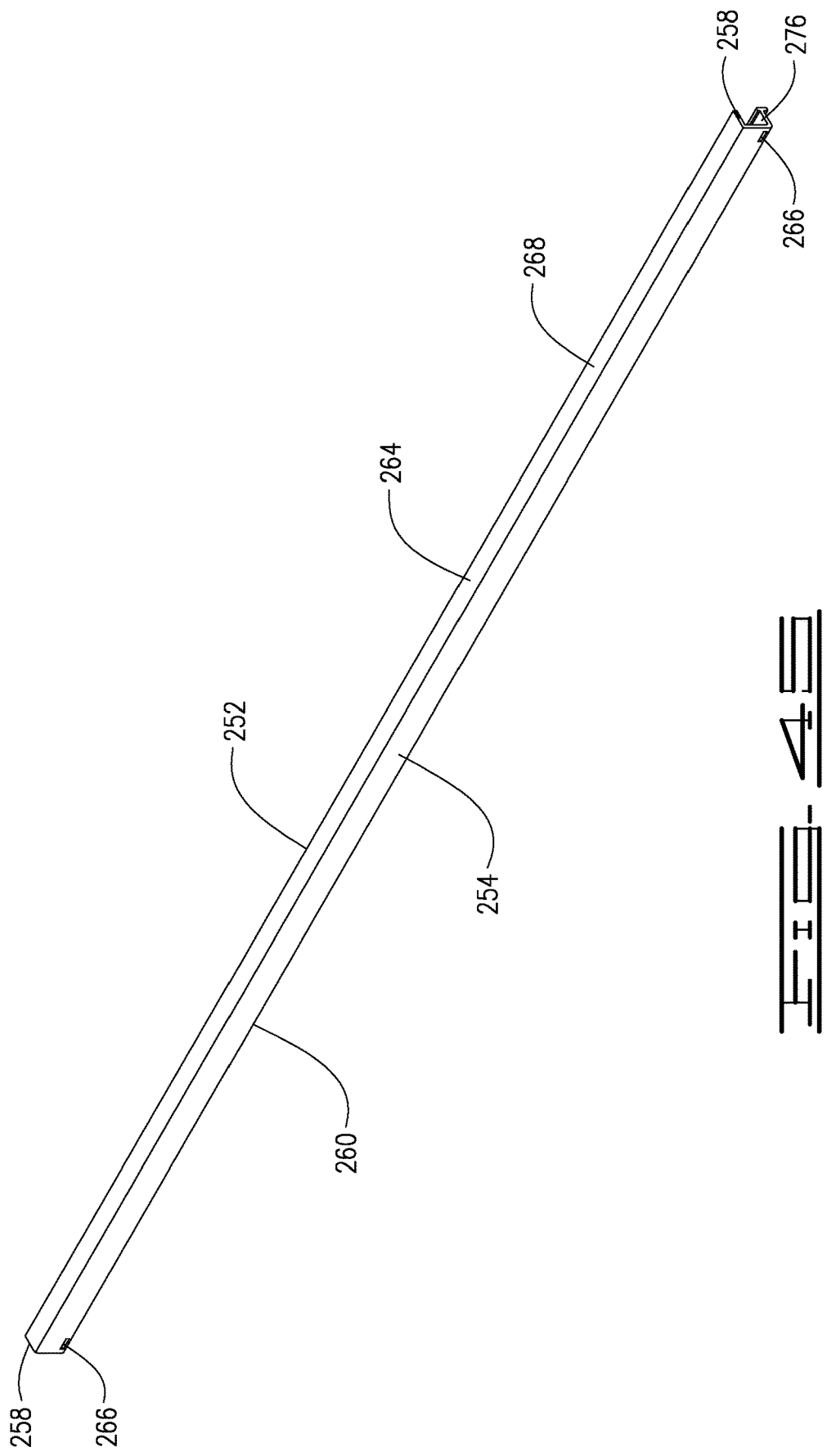
FIG. 45 is a perspective view of a lower cable cover.
Figure 46:
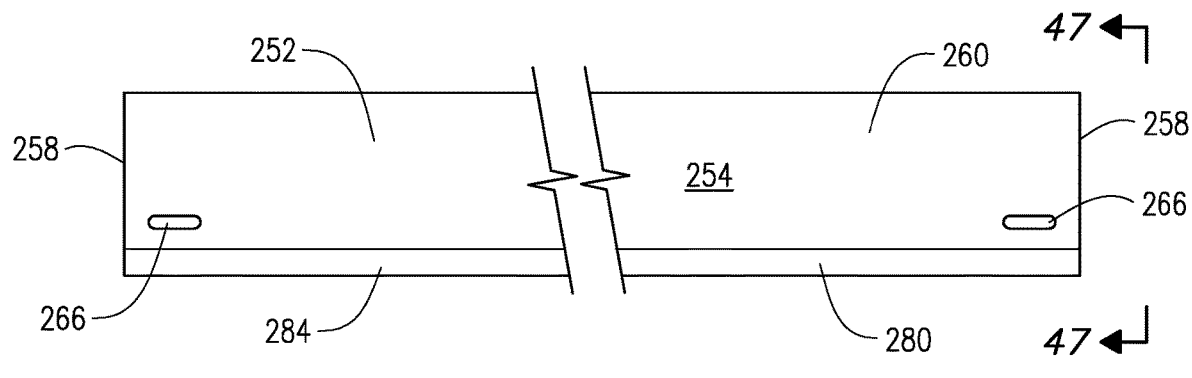
FIG. 46 is a front elevation view of end portions of the lower cable cover shown in FIG. 45. The lower cable cover is shown fragmentarily.
Figure 47:
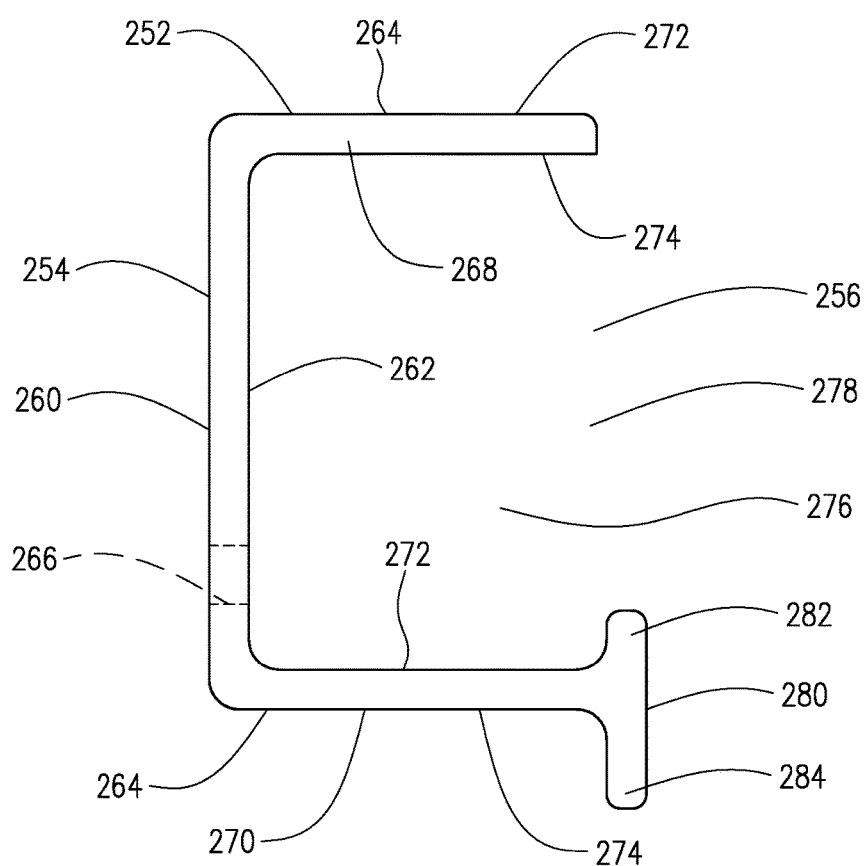
FIG. 47 is an end elevation view of the lower cable cover shown in FIG. 46, taken along line 47-47.

The barrier 10 preferably further comprises a plurality of elongate lower cable covers 252, shown in FIGS. 45-47. Each lower cable cover 252 interconnects an adjacent pair of posts 14, and partially encloses the first cable 174 extending between those posts 14. The number of lower cable covers 252 is preferably equal to the number of posts 14 forming the barrier 10, less one. The lower cable covers 252 are preferably identical in size, shape and construction, and are formed from a strong and durable material, such as steel or aluminum. A relatively lightweight material, such as aluminum or an aluminum alloy, is most preferred.

The lower cable cover 252 has a front side 254 and an opposed rear side 256, and extends longitudinally between two opposed ends 258. The rear side 256 is substantially open. The length of the lower cable cover 252 should be slightly less than the separation distance of the posts 14 forming the barrier 10. Thus, when the interpost separation distance is sixteen feet, the length of the lower cable cover 252 is 182 inches.

The lower cable cover 252 has a generally C-shaped cross-section and features a front flat front panel 260 having a front side and an opposed rear side 262. The front side of the front panel 260 coincides with the front side 254. The front panel 260 is preferably rectangular in shape. A fastener opening 266 is formed adjacent each end 258 of the front panel 260.

Two flat and parallel side panels 264 extend from the rear side 262 of the front panel 260. The side panels 264 comprise an upper side panel 268 and a lower side panel 270. Each side panel 264 extends within a plane that is preferably orthogonal to a plane within which the front panel 260 extends. Preferably, each side panel 264 is rectangular in shape.

Each of the side panels 264 has an upper side 272 and a lower side 274. The upper side 272 of the lower side panel 270, the rear side 262 of the front panel 260, and the lower side 274 of the upper side panel 268 cooperate to define an elongate and hollow first bay 276. The first cable 174 may extend within the first bay 276, which has a C-shaped cross-section and is open at the rear side 256 of the lower cable cover 252. This opening 278 permits installation of the first cable 174 within the first bay 276.

Adjacent the rear side 256 of the lower cable cover 252, an elongate lower rear rib 280 is formed on the lower side panel 270. A plane extending through the lower rear rib 280 is parallel to a plane extending through the front panel 260. The lower rear rib 280 has an upper portion 282 that extends above and adjacent the upper side 272, and toward the upper side panel 268. The upper portion 282 of the lower rear rib 280 assists in retaining the first cable 174 within the first bay 276. A lower portion 284 of the lower rear rib 280 extends in the opposite direction from the upper portion 282, below and adjacent the lower side 274.

Preferably, the lower cable cover 252 is formed as a single piece, most preferably by extrusion. In one embodiment, the lower cable cover 252 is formed from 6063-T5 aluminum alloy. The front panel 260, side panels 264 and lower rear rib 280 have a length of 182 inches and a thickness of 0.25 inches. The front panel 260 has a width of 3.75 inches. The lower side panel 270 has a width of 2.50 inches, and the upper side panel 268 has a width of 2.44 inches. The upper portion 282 of the lower rear rib 280 has a width of 0.38 inches, and the lower portion 284 of the lower rear rib 280 has a width of 0.63 inches.

Figure 50:
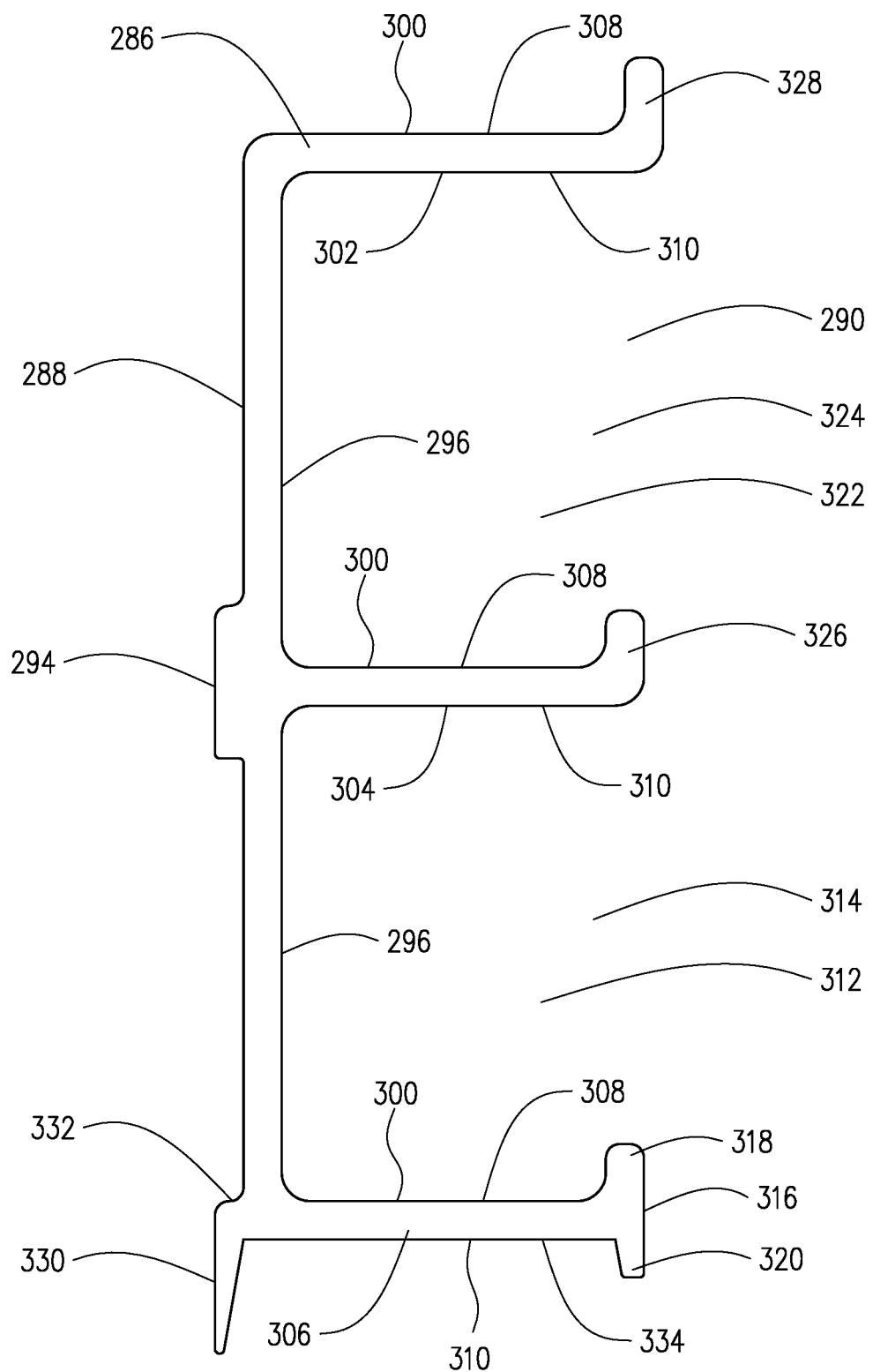
FIG. 50 is an end elevation view of the upper cable cover shown in FIG. 49, taken along line 50-50.

The barrier 10 preferably further comprises a plurality of elongate upper cable covers 286, shown in FIGS. 48-50. Each upper cable cover 286 interconnects an adjacent pair of posts 14, and partially encloses the second and third cables 176 and 178 extending between those posts 14. The number of upper cable covers 286 is preferably equal to the number of posts 14 forming the barrier 10, less one. The upper cable covers 286 are preferably identical in size, shape and construction, and are formed from a strong and durable material, such as steel or aluminum. A relatively lightweight material, such as aluminum or an aluminum alloy, is most preferred.

The upper cable cover 286 has a front side 288 and an opposed rear side 290, and extends longitudinally between two opposed ends 292. The rear side 290 is substantially open. The length of the upper cable cover 286 should be slightly less than the separation distance of the posts 14 forming the barrier 10. Thus, when the interpost separation distance is sixteen feet, the length of the upper cable cover 286 is 182 inches.

The upper cable cover 286 has a generally E-shaped cross-section and features a flat front panel 294 having a front side and an opposed rear side 296. The front side of the front panel 294 coincides with the front side 288. The front panel 294 is preferably rectangular in shape. A fastener opening 298 is formed adjacent each end 292 of the front panel 294.

Three equally-spaced flat and parallel side panels 300 extend from the rear side 296 of the front panel 294. The side panels 300 comprise an upper side panel 302, a middle side panel 304, and a lower side panel 306. As to each side panel 300, a plane extending through that side panel 300 is orthogonal to a plane extending through the front panel 294. Preferably, each side panel 300 is rectangular in shape.

Each of the side panels 300 has an upper side 308 and a lower side 310. The upper side 308 of the lower side panel 306, the rear side 296 of the front panel 294 and the lower side 310 of the middle side panel 304 cooperate to define an elongate and hollow second bay 312. The second cable 176 may extend within the second bay 312, which has a C-shaped cross-section and is open at the rear side 290 of the upper cable cover 286. This elongate opening 314 at the rear side 290 permits installation of the second cable 176 within the second bay 312.

Adjacent the rear side 290 of the upper cable cover 286, an elongate lower rear rib 316 is formed on the lower side panel 306. A plane extending through the lower rear rib 316 is parallel to a plane extending through the front panel 294. The lower rear rib 316 has an upper portion 318 that extends above and adjacent the upper side 308, and toward the middle side panel 304. The upper portion 318 of the lower rear rib 316 assists in retaining the second cable 176 within the second bay 312. A lower portion 320 of the lower rear rib 316 extends in the opposite direction from the upper portion 318, below and adjacent the lower side 310.

The upper side 308 of the middle side panel 304, the rear side 296 of the front panel 294, and the lower side 310 of the upper side panel 302 cooperate to define an elongate and hollow third bay 322. The third cable 178 may extend within the third bay 322, which has a C-shaped cross-section and is open at the rear side 290 of the upper cable cover 286. This elongate opening 324 at the rear side 290 permits installation of the third cable 178 within the third bay 322. Preferably, the third bay 322 has the same size and shape as the second bay 312, and extends parallel to the second bay 312. More preferably, the size and shape of the bays 276, 312 and 322 are identical.

Adjacent the rear side 290 of the upper cable cover 286, an elongate middle rear rib 326 is formed on the upper side 308 of the middle side panel 304. A plane extending through the middle rear rib 326 is parallel to a plane extending through the front panel 294. The middle rear rib 326 extends above and adjacent the upper side 308, and toward the upper side panel 302. The middle rear rib 326 assists in retaining the third cable 178 within the third bay 322.

Also adjacent the rear side 290 of the upper cable cover 286, an upper rear rib 328 is formed on the upper side 308 of the upper side panel 302. The upper rear rib 328 extends above and adjacent the upper side 308. A plane extending through the upper rear rib 328 is parallel to a plane extending through the front panel 294.

Adjacent the front side 288 of the upper cable cover 286, a lower front rib 330 is formed at the base 332 of the front panel 294. The lower front rib 330 extends below and adjacent the lower side 310 of the lower side panel 306. A plane extending through the lower front rib 330 is parallel to a plane extending through the front panel 294. The lower front rib 330, the lower side 310 of the lower side panel 306 and the lower portion 320 of the lower rear rib 316 cooperate to define an open-ended tray 334 within which the lower cable cover 252 may be received.

Preferably, the upper cable cover 286 is formed as a single piece, most preferably by extrusion. In one embodiment, the upper cable cover 286 is formed from 6063-T5 aluminum alloy. The front panel 294, side panels 300 and ribs 316, 326, 328 and 330 have a length of 182 inches and a thickness of 0.25 inches. The front panel 294 has a width of 7.25 inches, and each of the side panels 300 has a width of 2.50 inches. The upper portion 318 of the lower rear rib 316 has a width of 0.38 inches, and the lower portion 320 of the lower rear rib 316 has a width of 0.25 inches. The middle rear rib 326 has a width of 0.38 inches, and the upper rear rib 328 has a width of 0.50 inches. The lower front rib 330 has a width of 0.75 inches. The separation distance between the lower front rib 330 and the lower portion 320 of the lower rear rib 316 is 2.424 inches.

Figure 51:
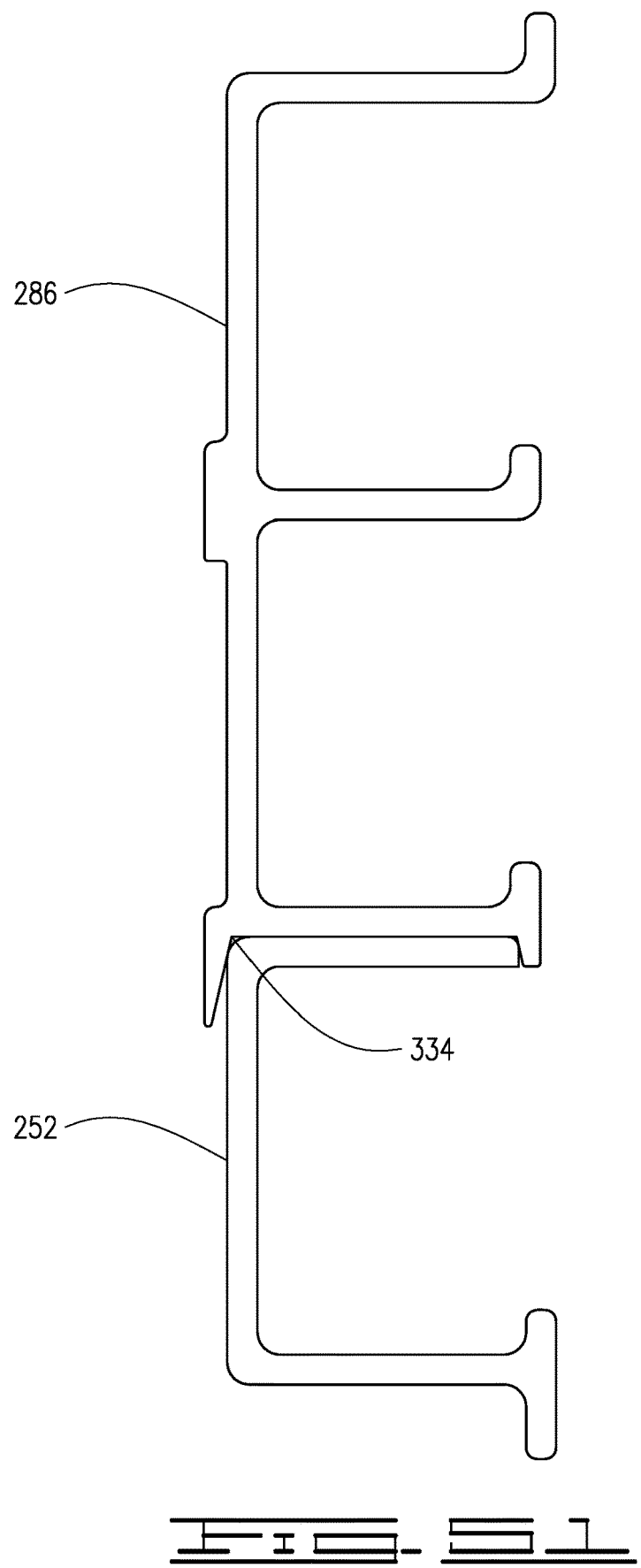
FIG. 51 is an end elevation view, similar to FIGS. 47 and 50, showing the lower and upper cable covers in an assembled configuration.

FIG. 51 shows the lower cable cover 252 and the upper cable cover 286 in an assembled configuration. The upper cable cover 286 has been stacked atop the lower cable cover 252. The stack is stable because the upper side panel 268 of the lower cable cover 252 has been received within the tray 334 formed on the underside of the upper cable cover 286.

Each of the cable covers 252 and 286 may be provided with a different number of bays than those provided in the embodiments shown in the Figures. Alternately, the cable covers 252 and 286 may be formed as a single unitary member having a configuration similar to that shown in FIG. 51.

Before the barrier 10 is assembled, the components used to form it are preferably treated to enhance their resistance to corrosion. Alternately, if a component is formed from more than one part, its parts may be so treated before assembly. Components so treated include the posts 14, U-bolts 82, clamps 84, spikes 160, hangers 180 and 222, post covers 232 and cable covers 252 and 286. The treatment may comprise polyester powder coating, zinc plating or hot-dip galvanizing.

Assembly of the barrier 10 begins by embedding the posts 14 that will form the barrier 10 within footings 24. Preferably, end posts 16 are embedded within enlarged footings 26, as shown in FIG. 6. Most or all intermediate posts 22 should be embedded within standard footings 28, as shown in FIG. 9. Optionally, intermediate posts 22 formed at corners may be embedded within corner footings (not shown).

Figure 52:
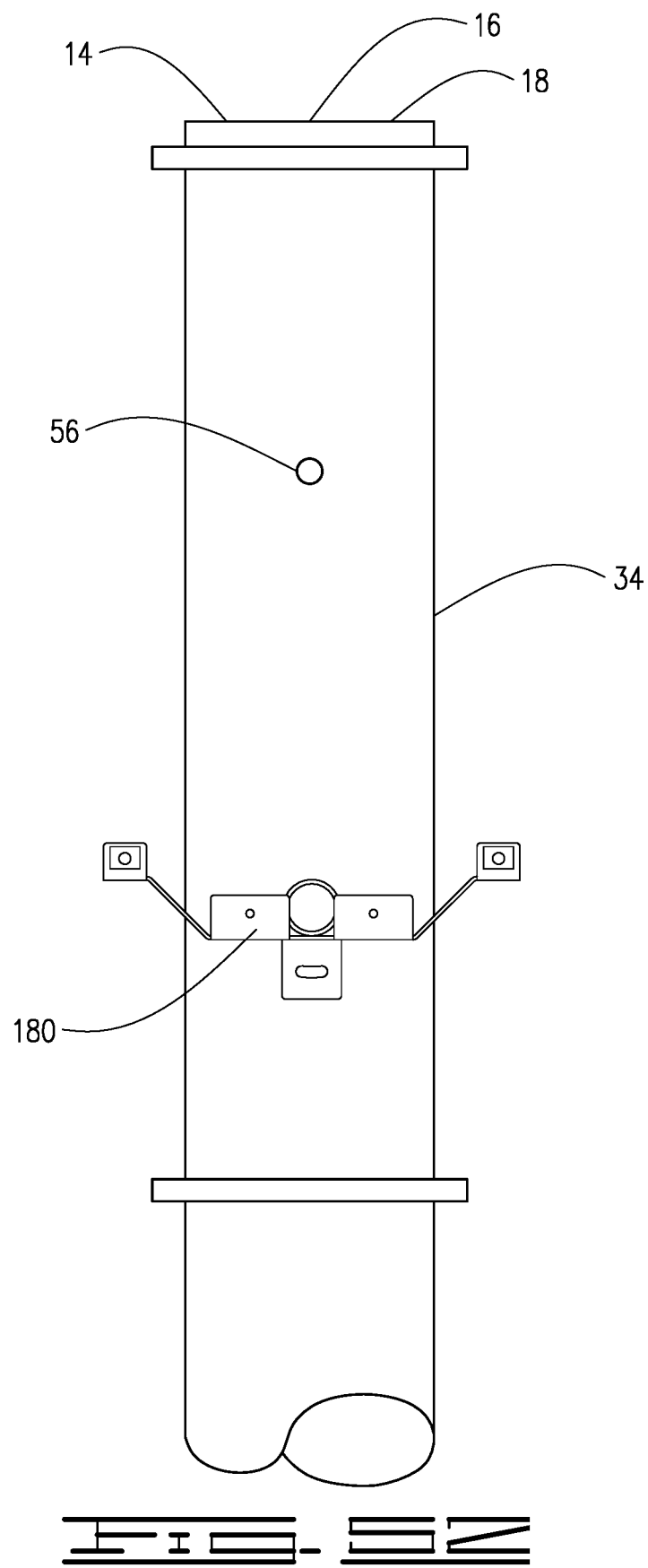

Next, a lower hanger 180 is installed on each post 14 that will form the barrier 10. The lower hanger 180 should be installed on a post 14 before that post 14 is wrapped by any cable 30. At the first end post 18, the lower hanger 180 is inverted, with its body 182 situated below the cover attachment sites 210. The inverted lower hanger 180 is positioned such that its arcuate opening 198 is aligned with the lower standoff 56 of the first column 34, as shown in FIG. 52.

One or more fasteners are used to secure the lower hanger 180 to the underlying first end post 18. In one embodiment, each fastener comprises a bolt and lock washer combination. The lock washer is positioned under the bolt head, and the bolt is inserted through the opening 198 of the lower hanger 180. The bolt is threaded into the standoff 56, such that its head presses the lock washer and lower hanger 180 against the standoff 56.

Before the bolt is tightened, the slope of the lower hanger 180 should be adjusted, if necessary, to conform to the slope of the terrain 12. Such adjustment is carried out by tilting the lower hanger 180 relative to the first end post 18. The arcuate shape of the opening 198 constrains the lower hanger 180 to rotate as it is tilted. The lower hanger 180 rotates about the lower front U-bolt opening 54, which aligns with the tubular member 220. After any required slope adjustment is made, the bolt is tightened against the lower standoff 56.

The installation steps just described are repeated by installing a lower hanger 180 at each additional post 14 that will form the barrier 10. At each intermediate post 22, the inverted lower hanger 180 is positioned such that its arcuate opening 198 is aligned with the lower standoff 78. The lower front U-bolt opening 76 of an intermediate post 22 aligns with the tubular member 220 of its lower hanger 180. When the second end post 20 is reached, a final lower hanger 180 is installed, using the same steps described with reference to the first end post 18.

Figure 53:
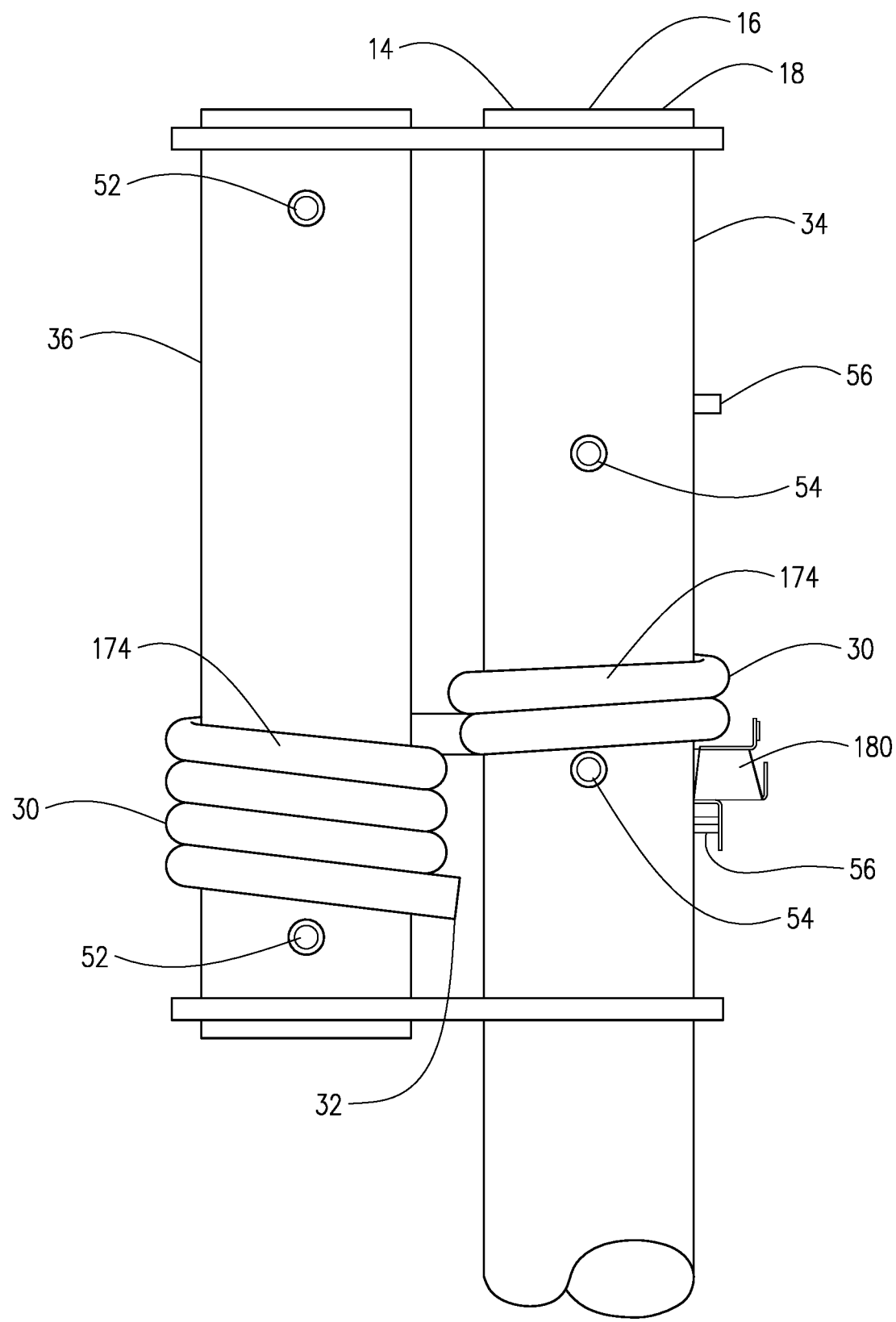

In the next stage of assembly, a first cable 174 is installed on each post 14 that will form the barrier 10. As shown in FIG. 53, the first cable 174 is first wrapped, adjacent one of its ends 32, at least partially around the first end post 18. More preferably, the first cable 174 is wrapped at least partially around each column of the first end post 18.

Preferably, the first cable 174 is wrapped to form one or more windings that surround only the second column 36, and one or more additional windings that surround only the first column 34 of the first end post 18. More preferably, the first cable 174 is wrapped to form more than one winding around each column 34 and 36. In the embodiment shown in the Figures, the first cable 174 is wrapped 3.75 times around only the second column 36, and 1.75 times around only the first column 34.

Wrapping of the first cable 174 begins at the second column 36. Preferably, the spike 160 is driven into the end 32 of the first cable 174 before wrapping begins. Alternately, the spike 160 may be installed after wrapping is complete. After the second column 36 has been wrapped, the first cable 174 is extended to the first column 34, which is likewise wrapped. When wrapped, the outer surface of the first cable 174 should be conformed, to the greatest extent possible, to the outer surface of the underlying column.

Figure 54:
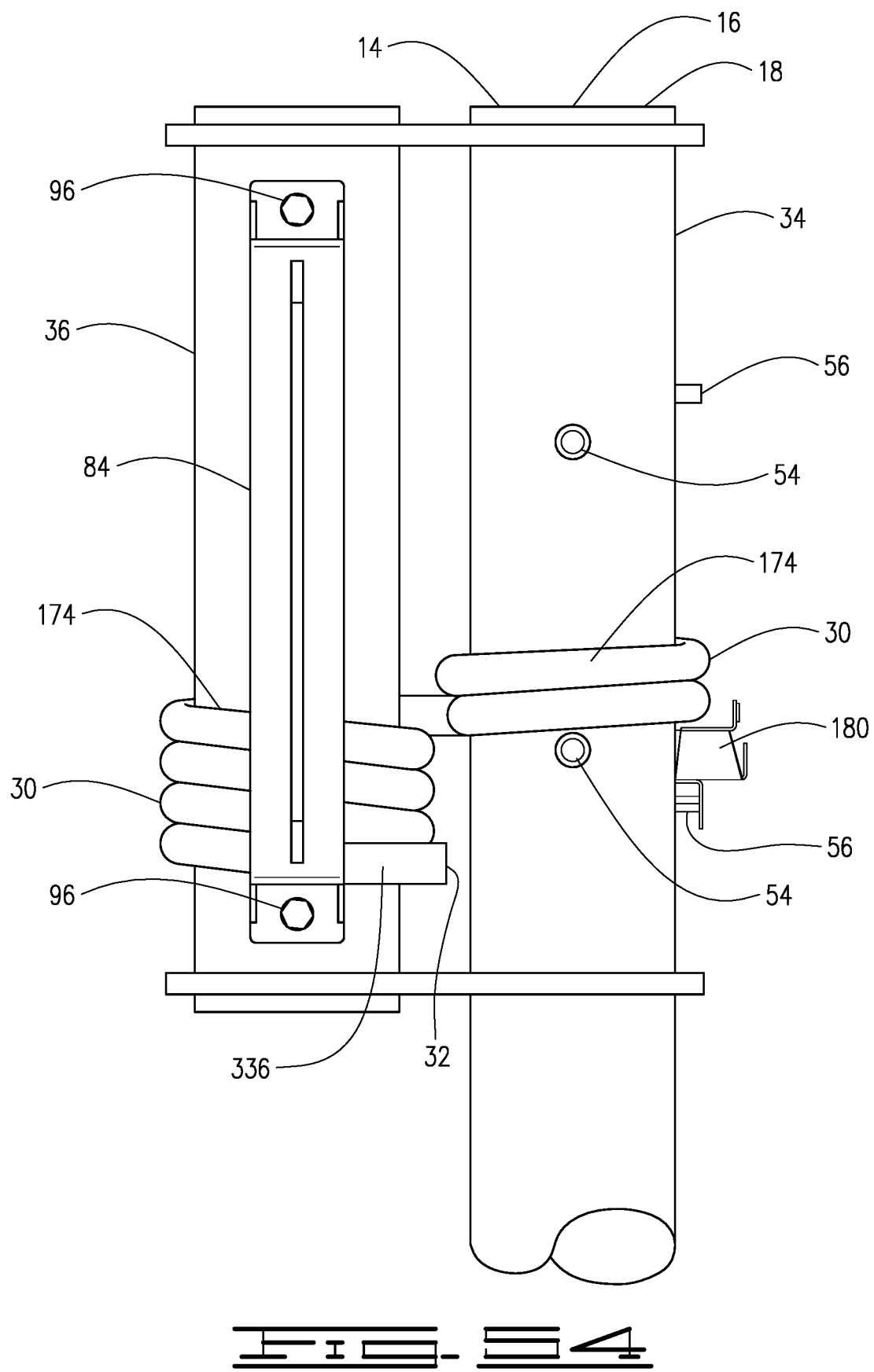

The next stage of assembly is shown in FIG. 54. The clamp 84 is installed on the second column 36 such that the cable recess 92 overlies the wrapped first cable 174. The fastener openings 96 of the clamp 84 are aligned with the front clamp openings 52. Fasteners, such as nut and bolt assemblies, are inserted into the aligned openings and actuated to install the clamp 84.

Figure 55:
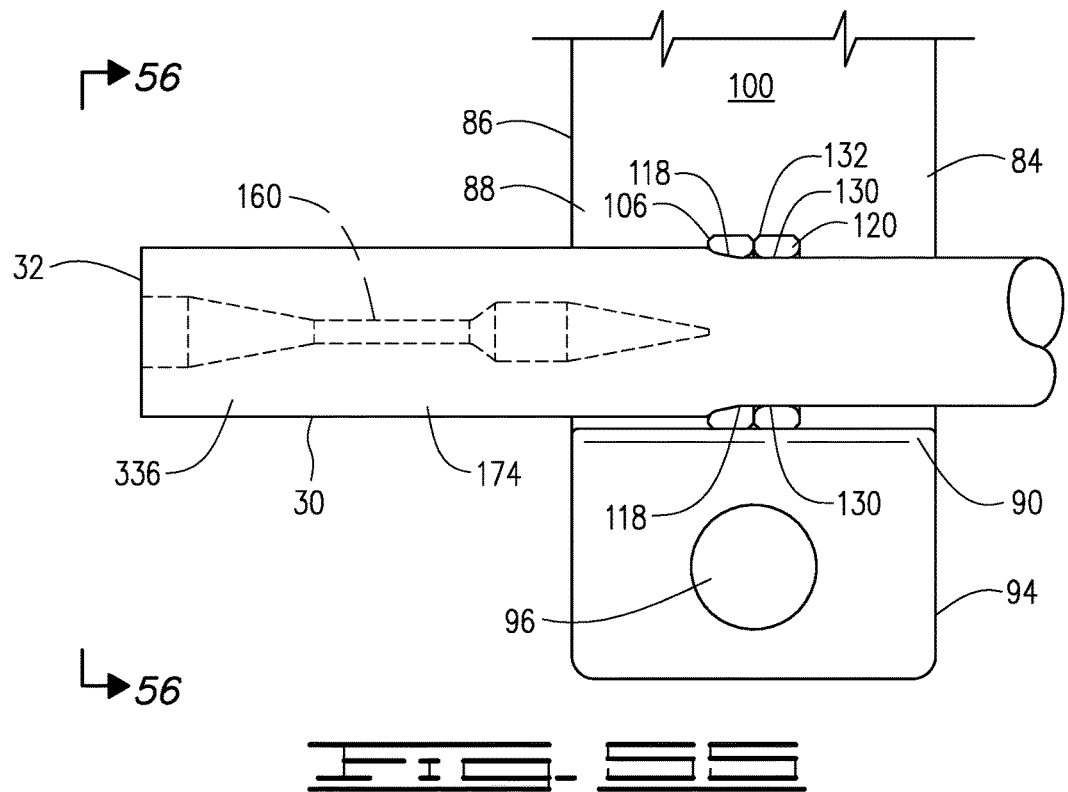
FIG. 55 is a bottom plan view showing portions of the first cable and clamp of the assembly of FIG. 54. The spike embedded within the first cable is shown in dashed lines. The view is taken from the surface of the end post underlying the first clamp and cable.
Figure 56:
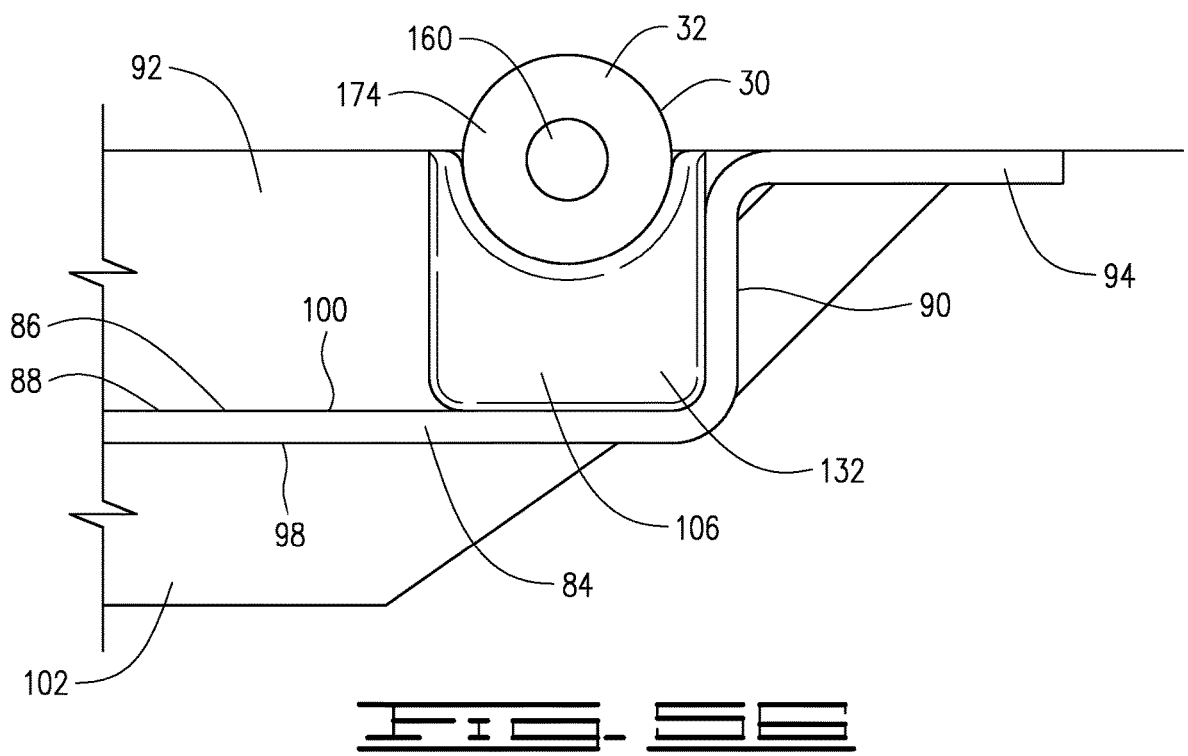
FIG. 56 is an end elevation view of the first cable and clamp shown in FIG. 55, taken along line 56-56.

FIGS. 55 and 56 show the relative positioning of the installed clamp 84 and the first cable 174. Adjacent its end 32, a short segment 336 of the first cable 174 extends beyond the clamp 84. This segment 336 has length sufficient to house the spike 160. The spike 160 causes a radial displacement of the filaments forming the core of the first cable 174. This radial displacement enhances the purchase on the first cable 174 that the clamp 84 can gain at the converging side wall sections 118 of the first contact element 106.

Figure 57:
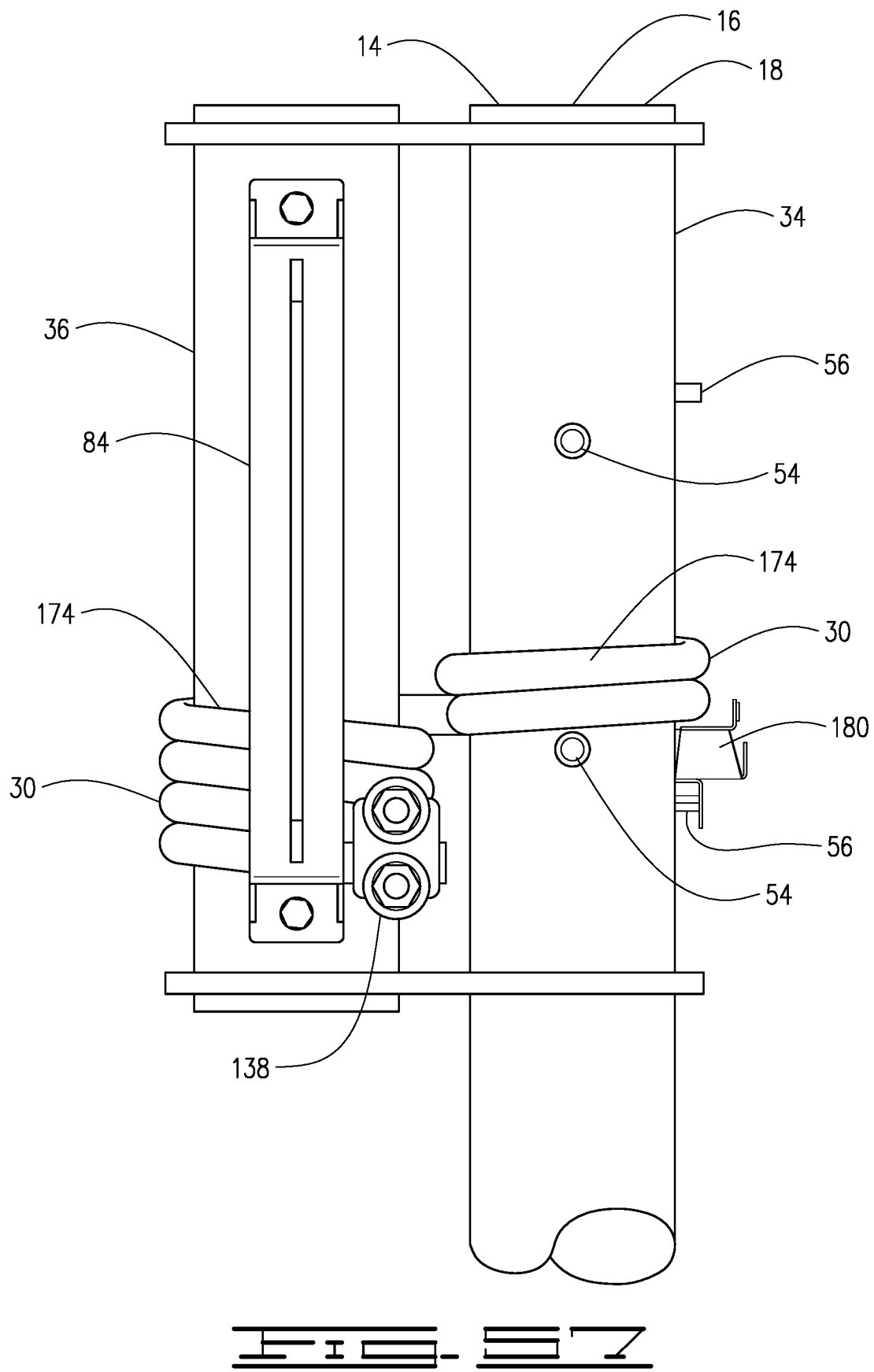
Figure 55:
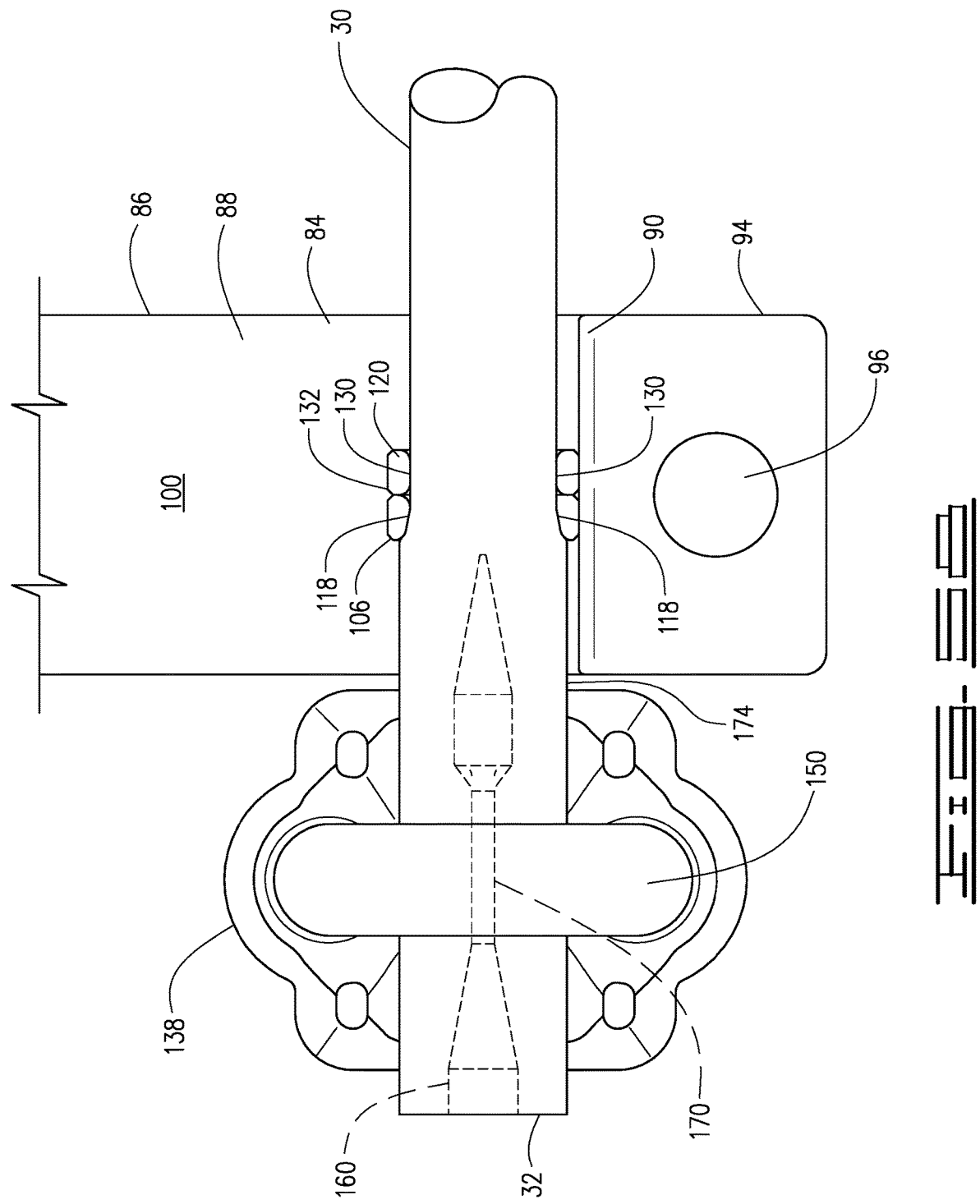
Figure 53:
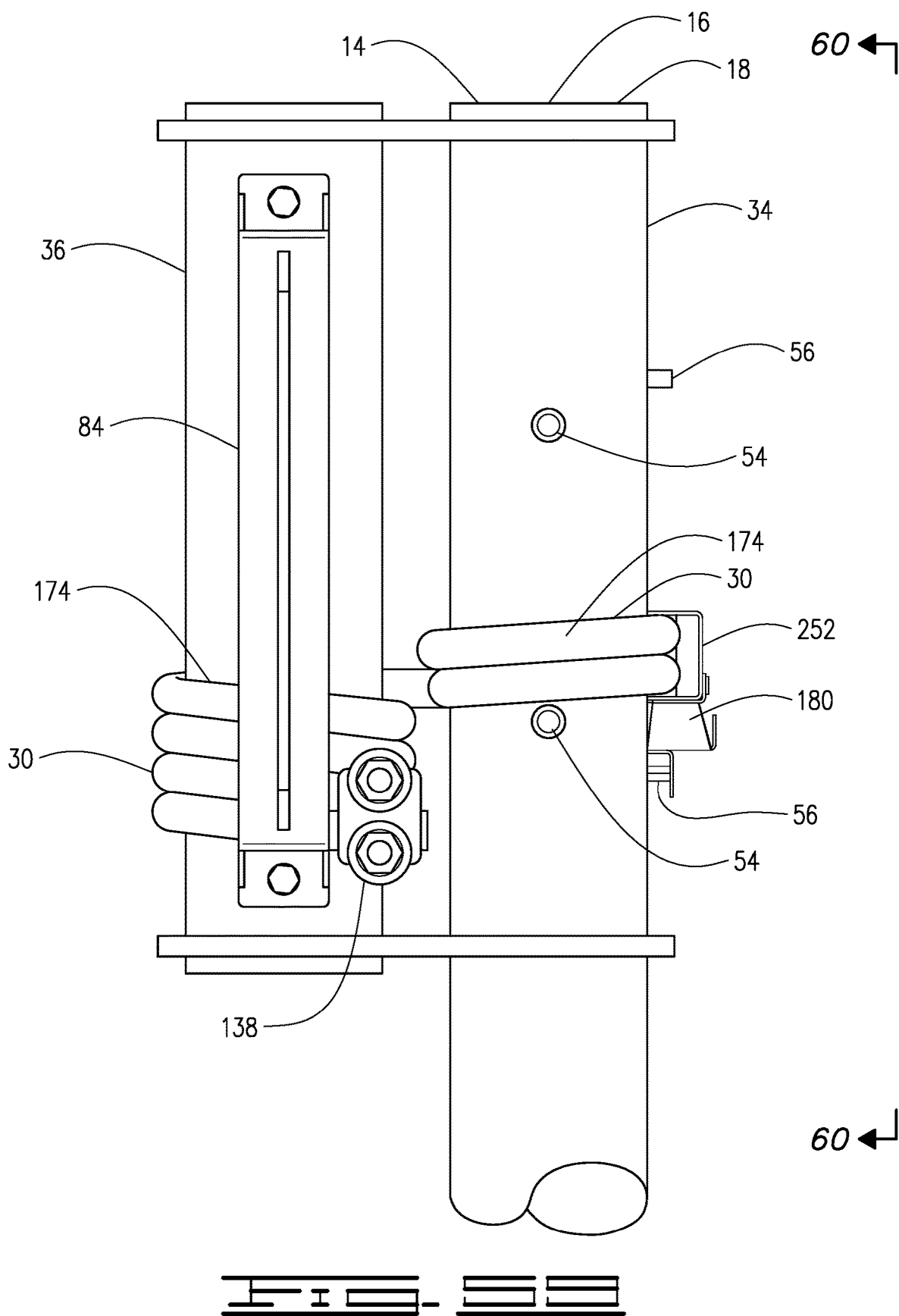
Figure 58:
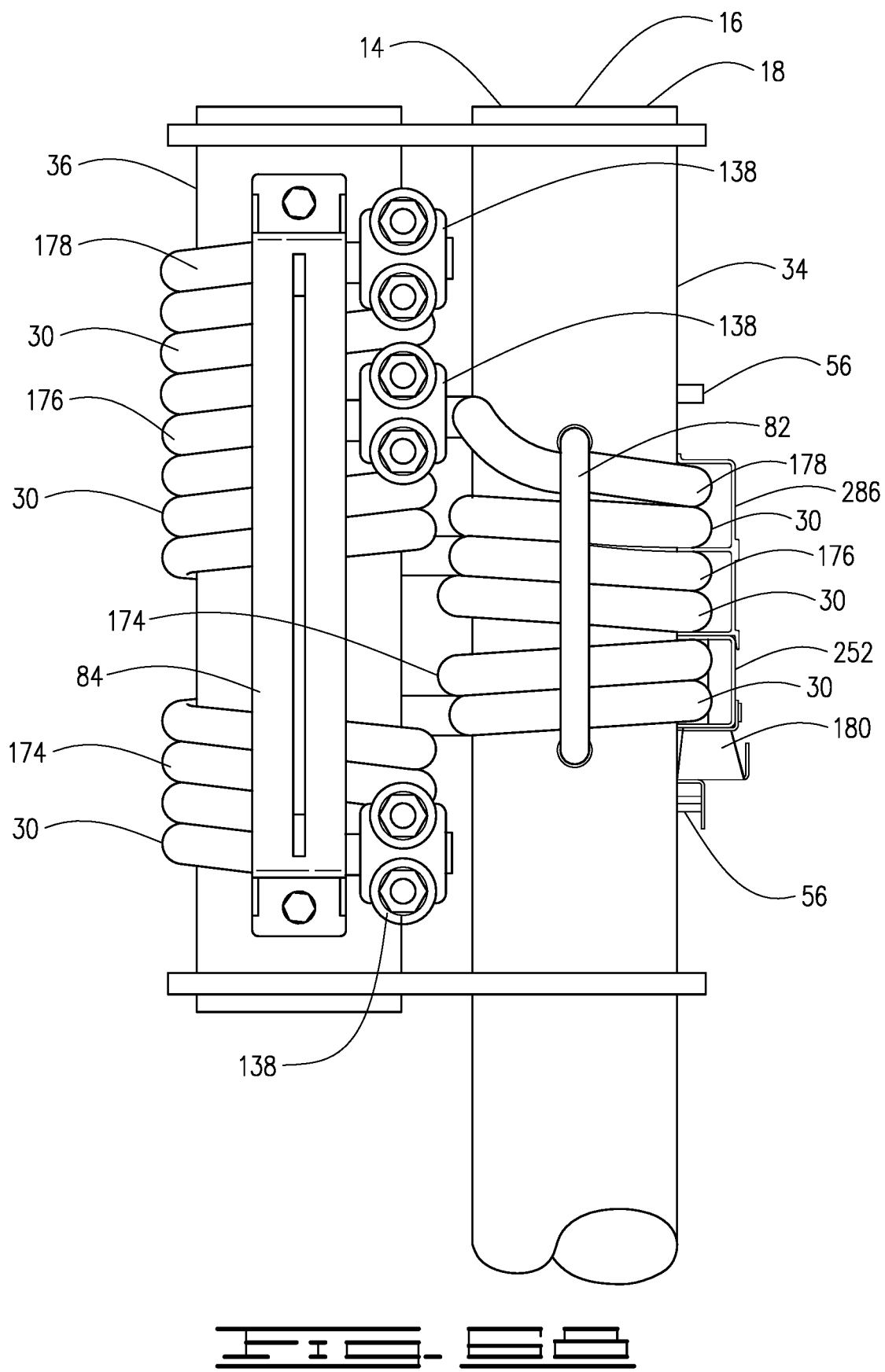
FIG. 58 is a bottom plan view showing portions of the first cable, clamp and clip of the assembly of FIG. 57. The spike embedded within the first cable is shown in dashed lines.

The next stage of assembly is shown in FIGS. 57 and 58. A clip 138 is installed on the first cable 174 between its end 32 and its associated clamp 84. When the clip 138 is installed, its shackle 150 releasably grips the first cable 174. The clip 138 functions to prevent the first cable 174 from being pulled away from the spike 160 after an impact to the barrier 10. Retention of the spike 160 helps the clamp 84 to maintain its grip on the first cable 174 after such an impact.

The first cable 174 and the first restraining element 132 of the clamp 84 are shown in detail in FIG. 58. At least a portion of the spike 160 embedded within the first cable 174 extends between the clamp 84 and the clip 138. The shackle 150 of the clip 138 grips that portion of the first cable 174 that overlies the constriction 170 of its embedded spike 160.

Figure 71:
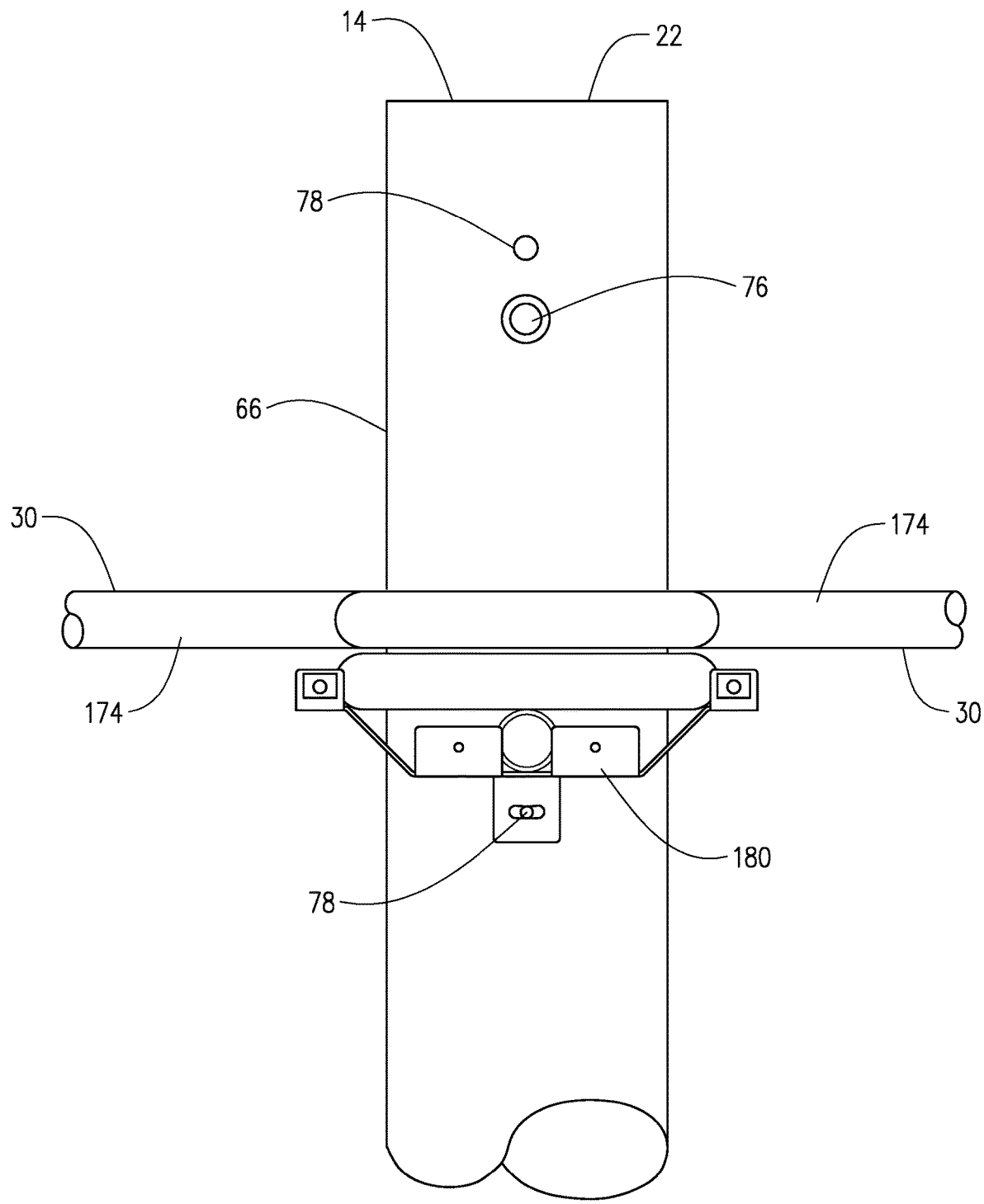

During the next stage of assembly, the first cable 174 is extended from the first end post 18 to the next adjacent intermediate post 22, shown in FIG. 71. A lower hanger 180 has been installed on the intermediate post 22, in the same manner as described with reference to the first end post 18. The extended first cable 174 is wrapped at least partially around the column 66 of the intermediate post 22. More preferably, the first cable 174 is wrapped at least at least once around the column 66. When wrapped, the outer surface of the first cable 174 should be conformed, to the greatest extent possible, to the outer surface of the underlying column 66.

The installation steps just described are repeated with the first cable 174 at each successive intermediate post 22 forming the barrier. When the first cable 174 reaches the second end post 20, the same installation steps described with reference to the first end post 18 are performed.

In the next preferred stage of assembly, a lower cable cover 252 is installed between each adjacent pair of posts 14 that will form the barrier 10. A lower cable cover 252 should not be installed until each post 14 of the adjacent pair has been wrapped by the first cable 174. After a lower cable cover 252 has been installed, that portion of the first cable 174 that extends between the adjacent posts 14 should be positioned within its first bay 276.

Figure 60:
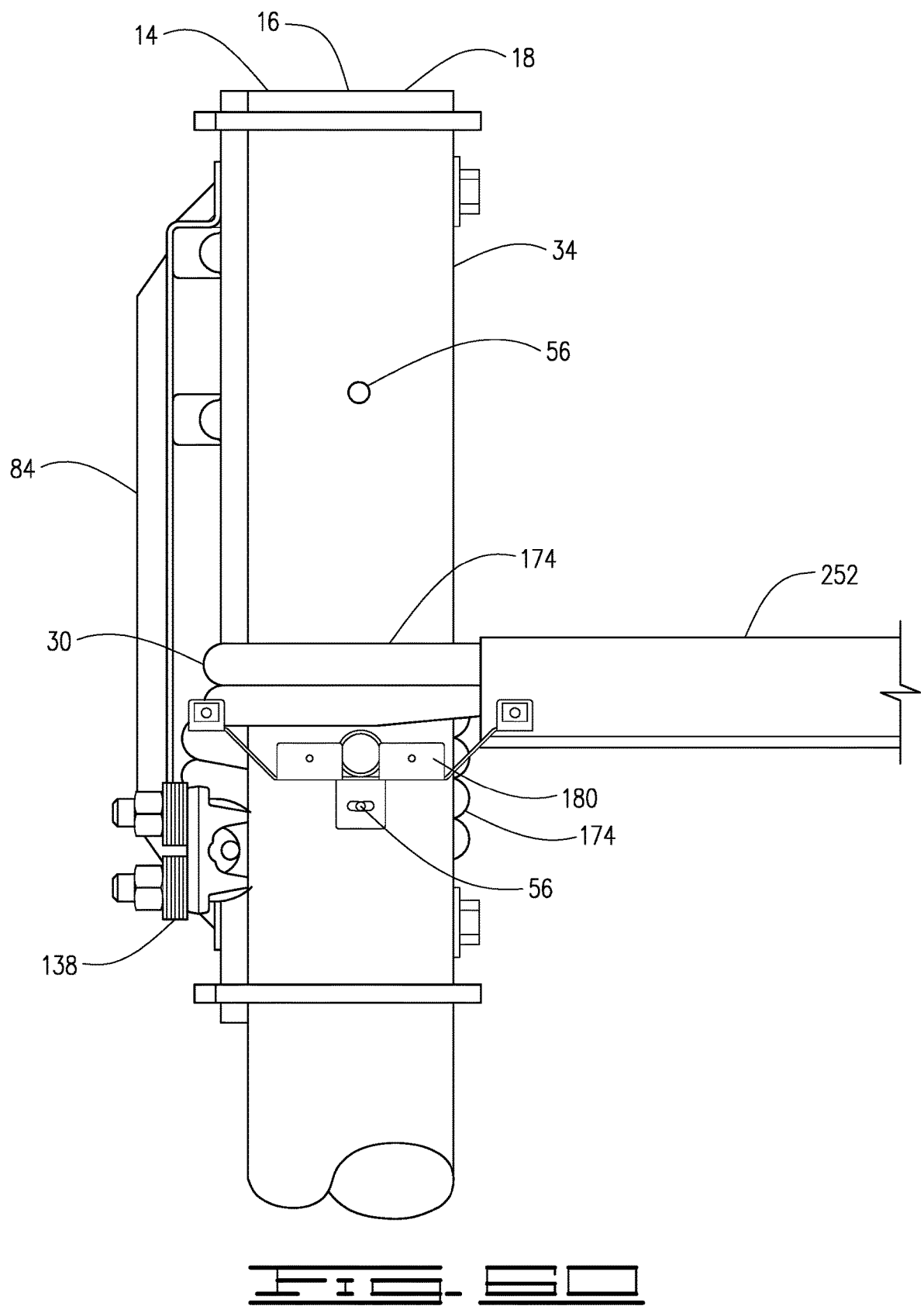
Figure 72:
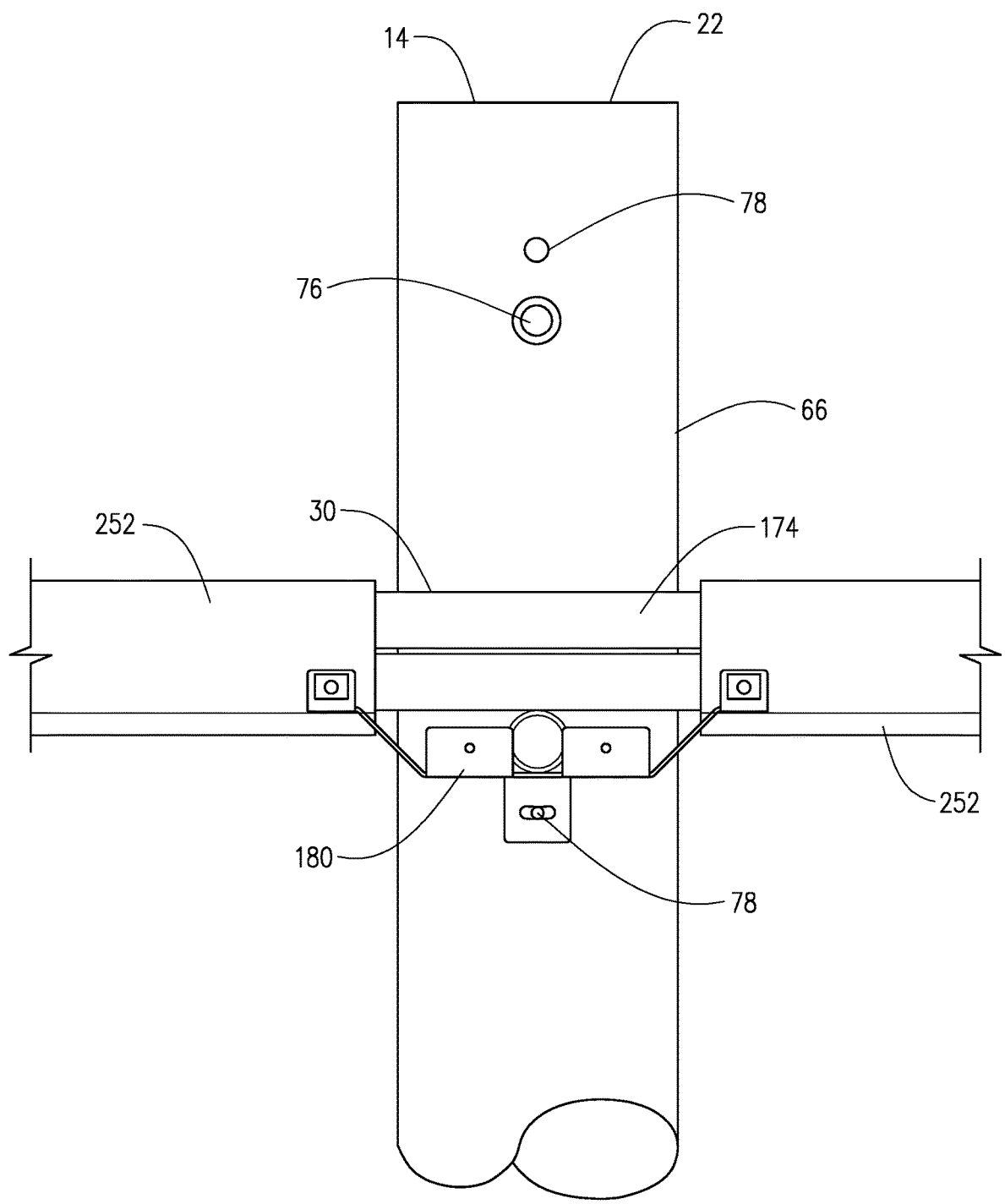

Initially, a lower cable cover 252 is positioned between the first end post 18 and the next adjacent intermediate post 22, as shown in FIGS. 60 and 72. The first cable 174 is inserted through the elongate opening 278 and positioned within the first bay 276. The lower hangers 180 of each post are then secured to respective ends 258 of the lower cable cover 252.

A fastener opening 212 in the cover attachment site 210 of each lower hanger 180 is aligned with a fastener opening 266 in the adjacent end 258 of the lower cable cover 252. A fastener (not shown), such as a thread rolling screw, is inserted through each pair of aligned openings. Because the fastener will be temporarily removed later, it preferably is not tightened at this stage.

The installation steps just described are repeated by installing a lower cable cover 252 between each successive adjacent pair of intermediate posts 22 that will form the barrier 10. When the second end post 20 is reached, a final lower cable cover 252 is installed between the second end post 20 and its adjacent intermediate post 22. Installation of the final lower cable cover 252 follows the same steps as the initial lower cable cover 252 installed at the first end post 18.

Figure 61:
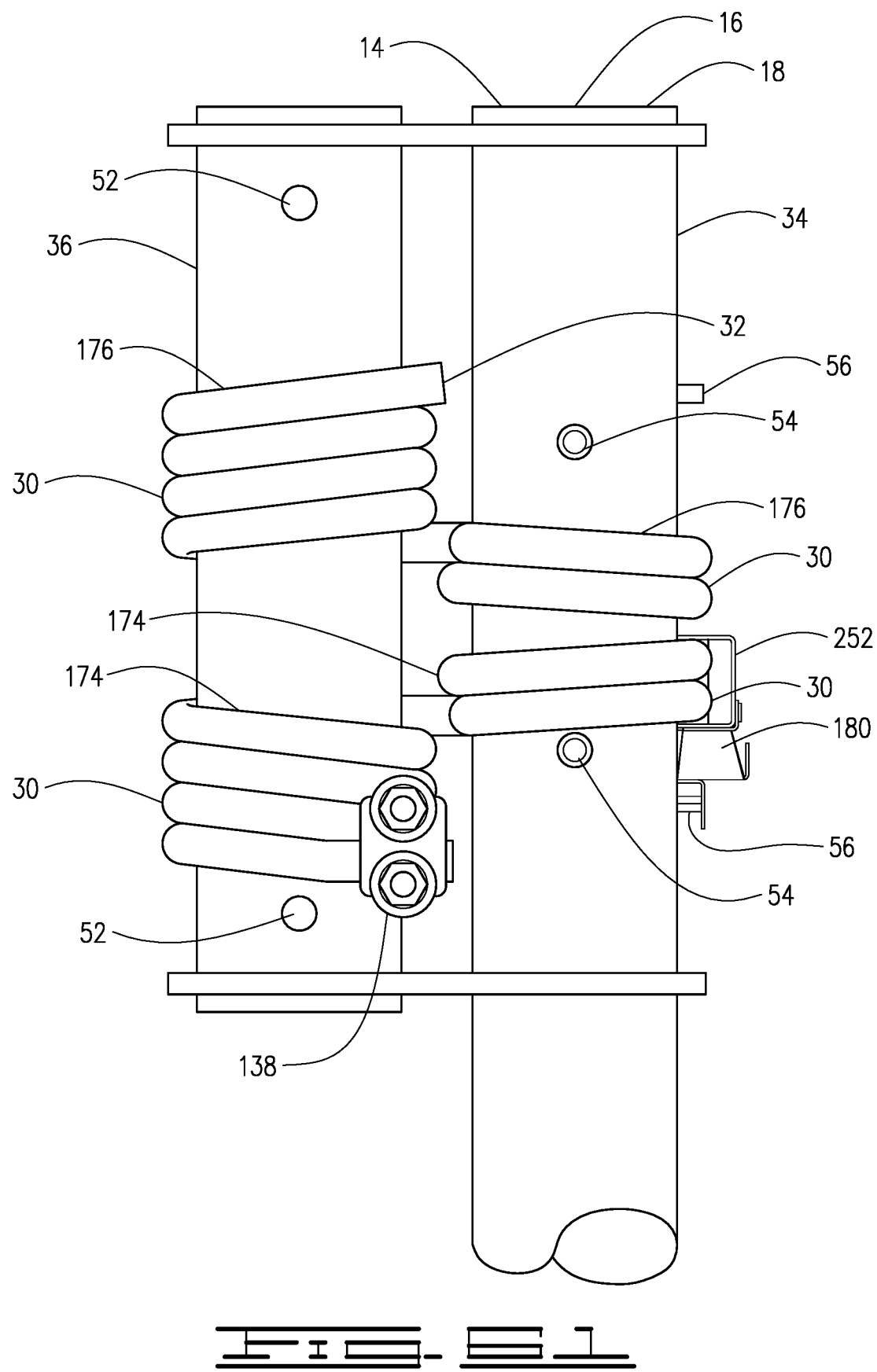
Figure 62:
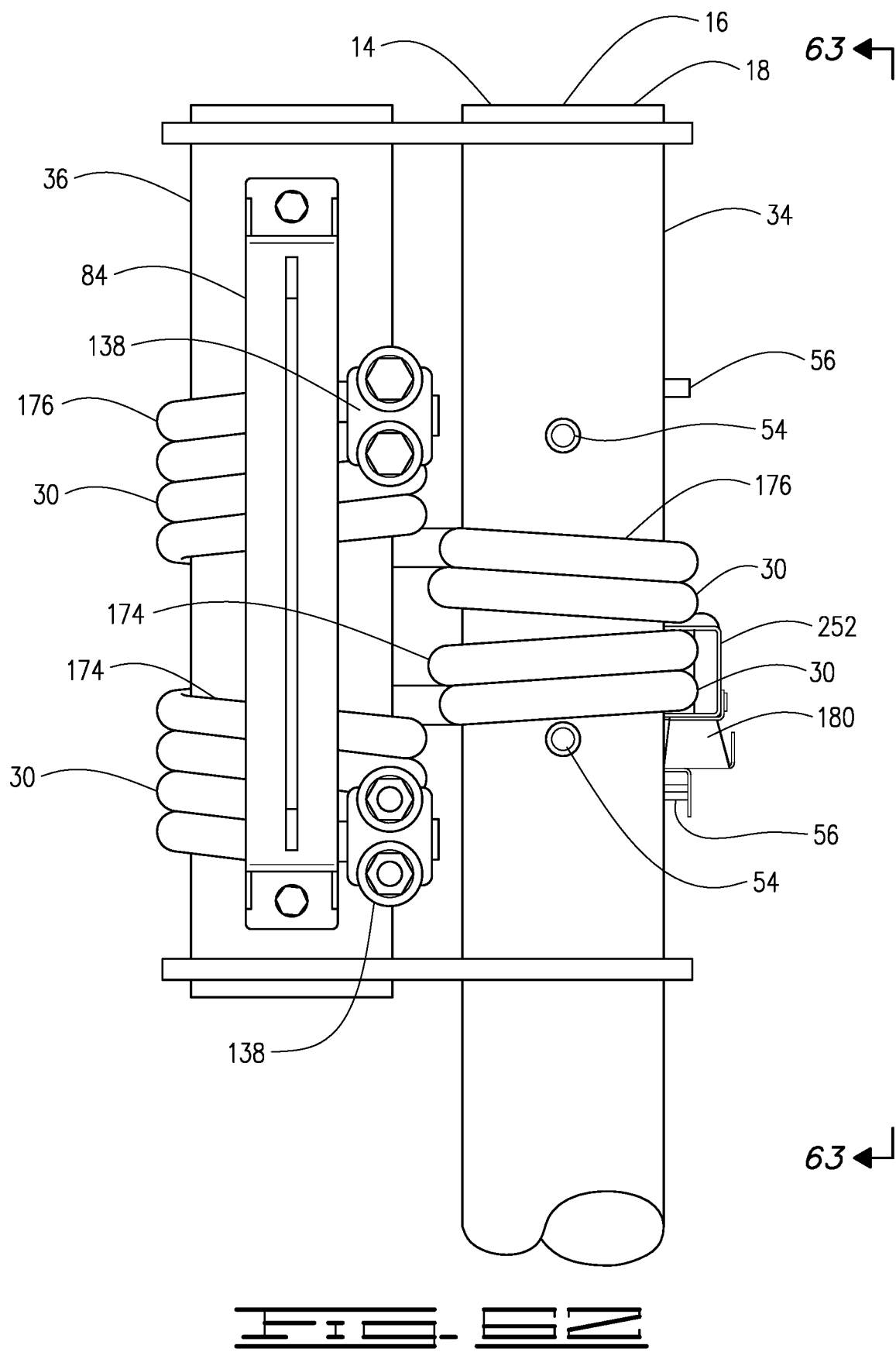
Figure 83:
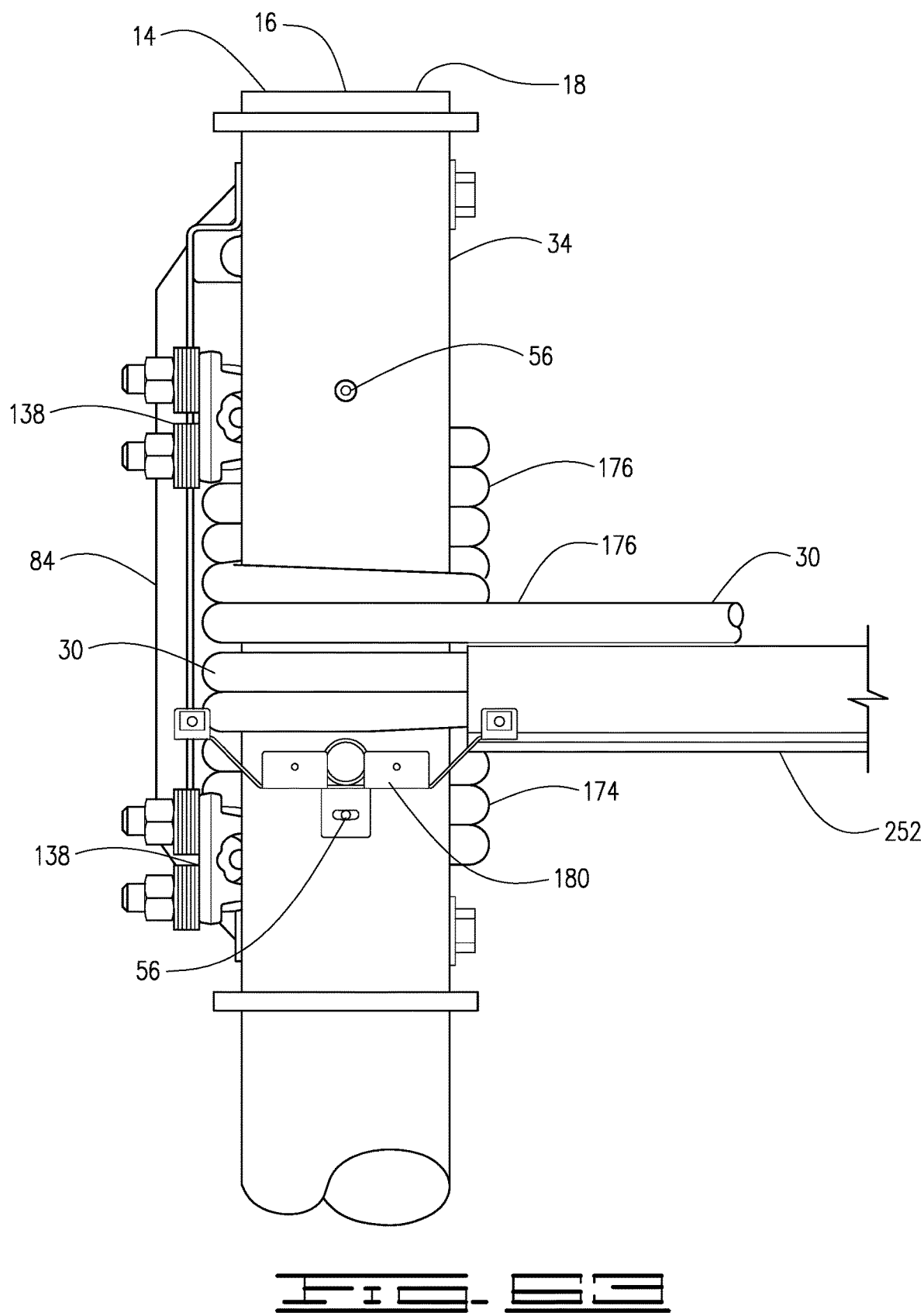
Figure 54:
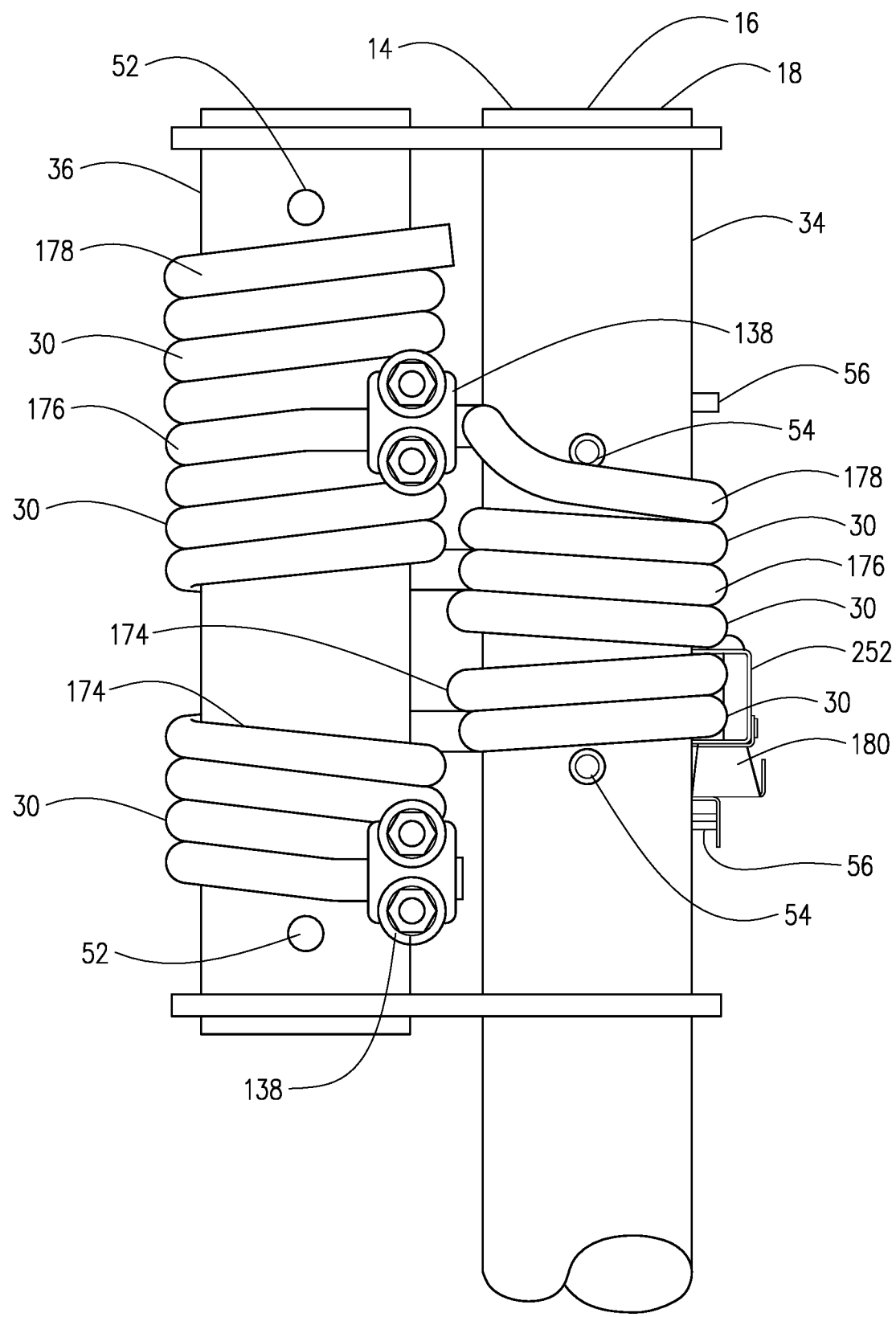

In the next stage of assembly, a second cable 176 is installed on each post 14 that will form the barrier 10. The clamp 84 is first loosened, and the second cable 176 is then wrapped around the first end post 18, as shown in FIG. 61. The installation steps and wrapping configuration for the second cable 176 at the first end post 18 are preferably identical to those described with reference to the first cable 174. Once the second cable 176 has been wrapped at the first end post 18, a clip 138 is installed on the second cable 176 adjacent its end 32, in the same manner described reference with the first cable 174. The clamp 84 may then be tightened, resulting in the configuration shown in FIG. 62. The installed positioning of the second cable 176, including its spike 160 and clip 138, and the second restraining element 134 is identical to that previously described with reference to the first cable 174 and the first restraining element 132.

The second cable 176 is next extended atop the lower cable cover 252 toward the next adjacent intermediate post 22, as shown in FIG. 63. The extended second cable 176 is wrapped at the column 66 of the intermediate post 22, as shown in FIG. 73. The installation steps and wrapping configuration for the second cable 176 at the intermediate post 22 are preferably identical to those described with reference to the first cable 174.

The installation steps just described are repeated with the second cable 176 at each successive intermediate post 22 that will form the barrier 10. When the second cable 176 reaches the second end post 20, the same installation steps described with reference to the first end post 18 are performed.

In the next stage of assembly, a third cable 178 is installed on each post 14 that will form the barrier 10. The clamp 84 is loosened, and the third cable 178 is wrapped at the first end post 18, as shown in FIG. 64. The installation steps and wrapping configuration for the third cable 178 at the first end post 18 are preferably identical to those described with reference to the first cable 174.

Figure 65:
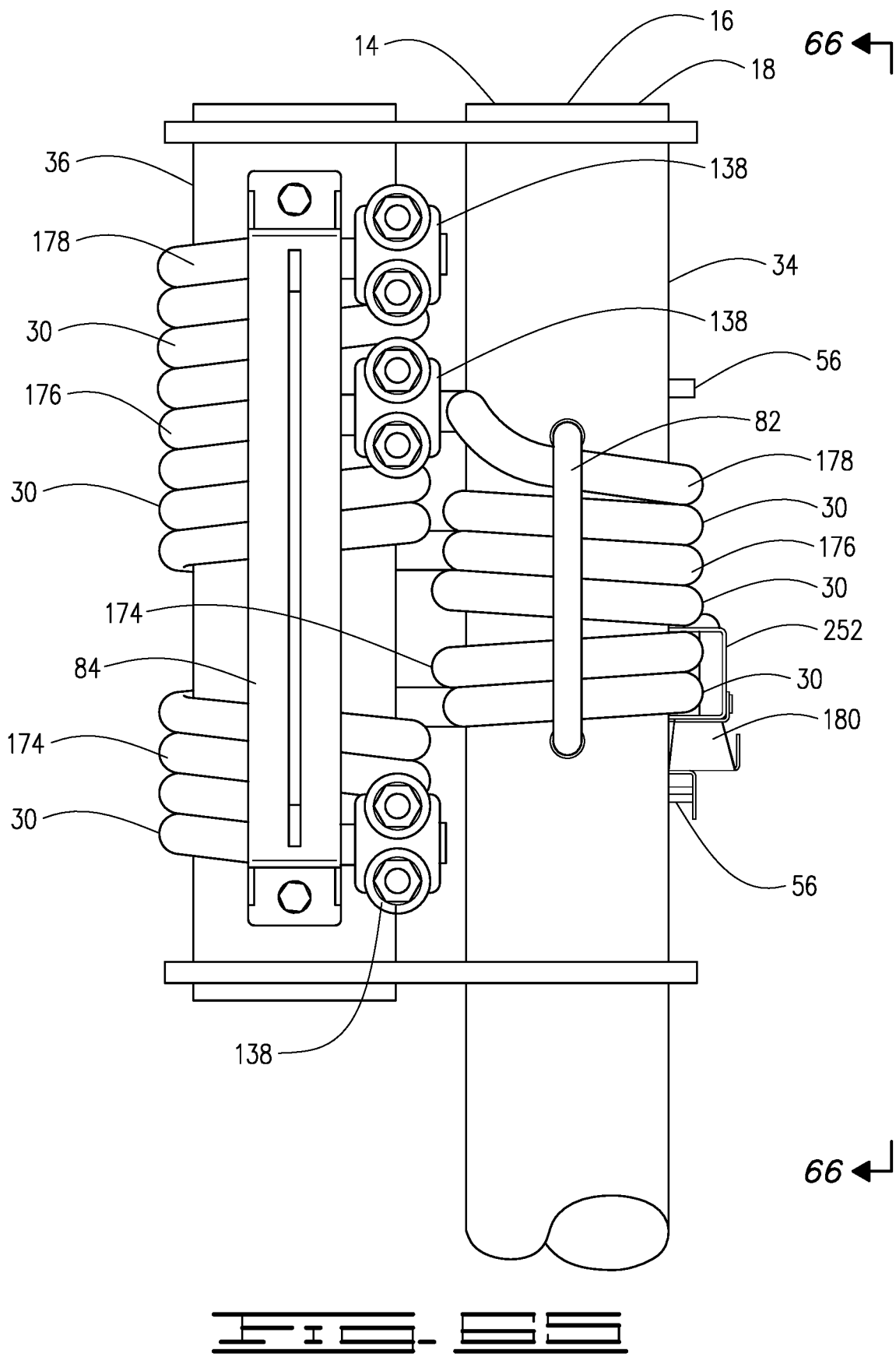
Figure 55:
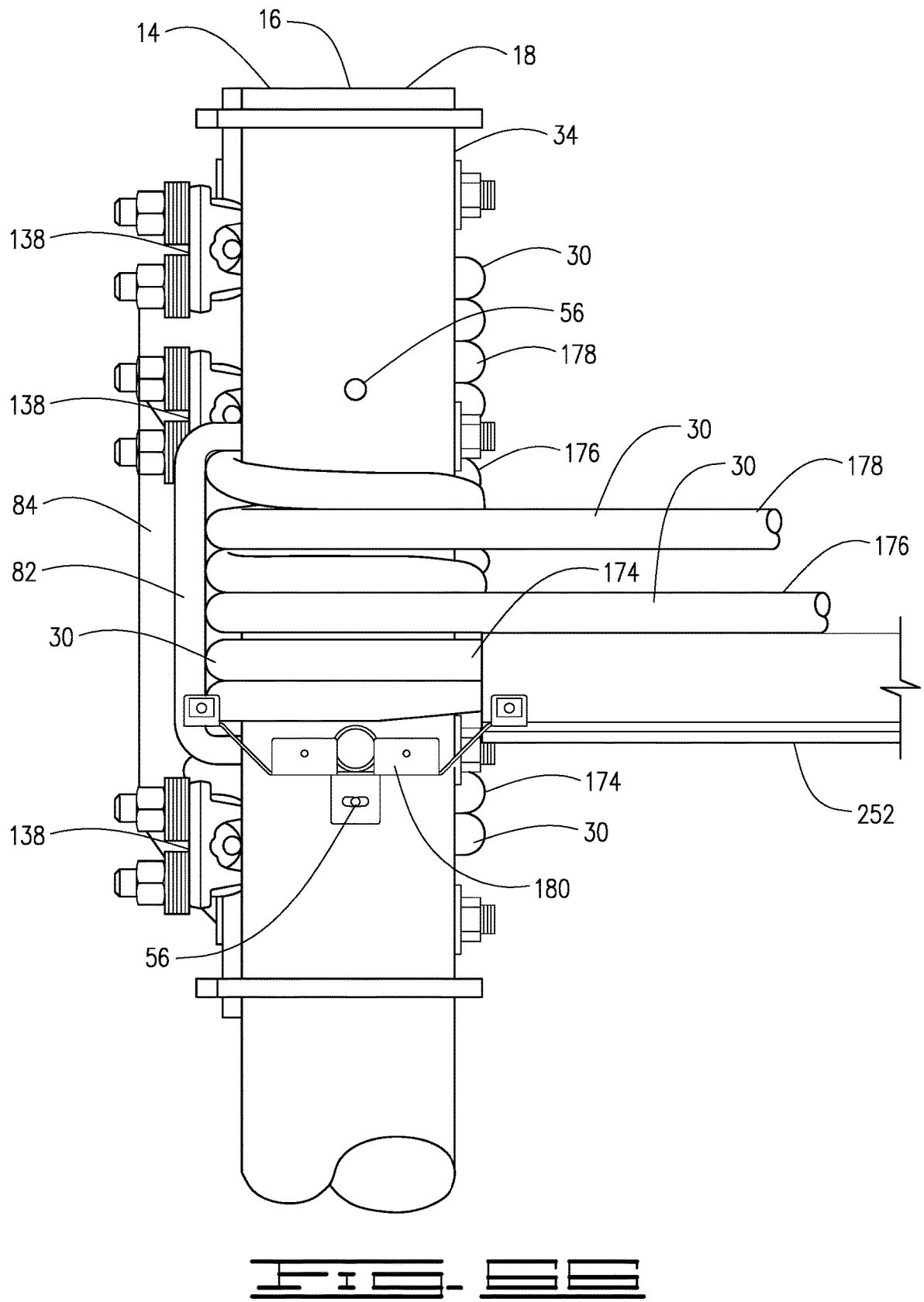

Once the third cable 178 has been wrapped at the first end post 18, the clamp 84 is tightened for the last time, as shown in FIGS. 65 and 66. A clip 138 is installed adjacent the end 32 of the third cable 178, in the same manner described with reference with the first cable 174. The installed positioning of the third cable 178, including its spike 160 and clip 138, and the third restraining element 136 is identical to that previously described with reference to the first cable 174 and the first restraining element 132.

At the first column 34, a U-bolt 82 is inserted through the aligned front U-bolt openings 54, and positioned in overlying relationship to the three wrapped cables 30. The threaded ends of the U-bolt 82 emerge from the first column 34 at the rear U-bolt openings. Nuts (not shown) are installed on the threaded ends and tightened against the first column 34 to hold the U-bolt 82 in place.

The third cable 178 is next extended atop the second cable 176 toward the next adjacent intermediate post 22, as shown in FIG. 66. The extended third cable 176 is wrapped at the column 66 of the intermediate post 22, as shown in FIG. 73. The installation steps and wrapping configuration for the third cable 178 at the intermediate post 22 are preferably identical to those described with reference to the first cable 174.

Figure 74:
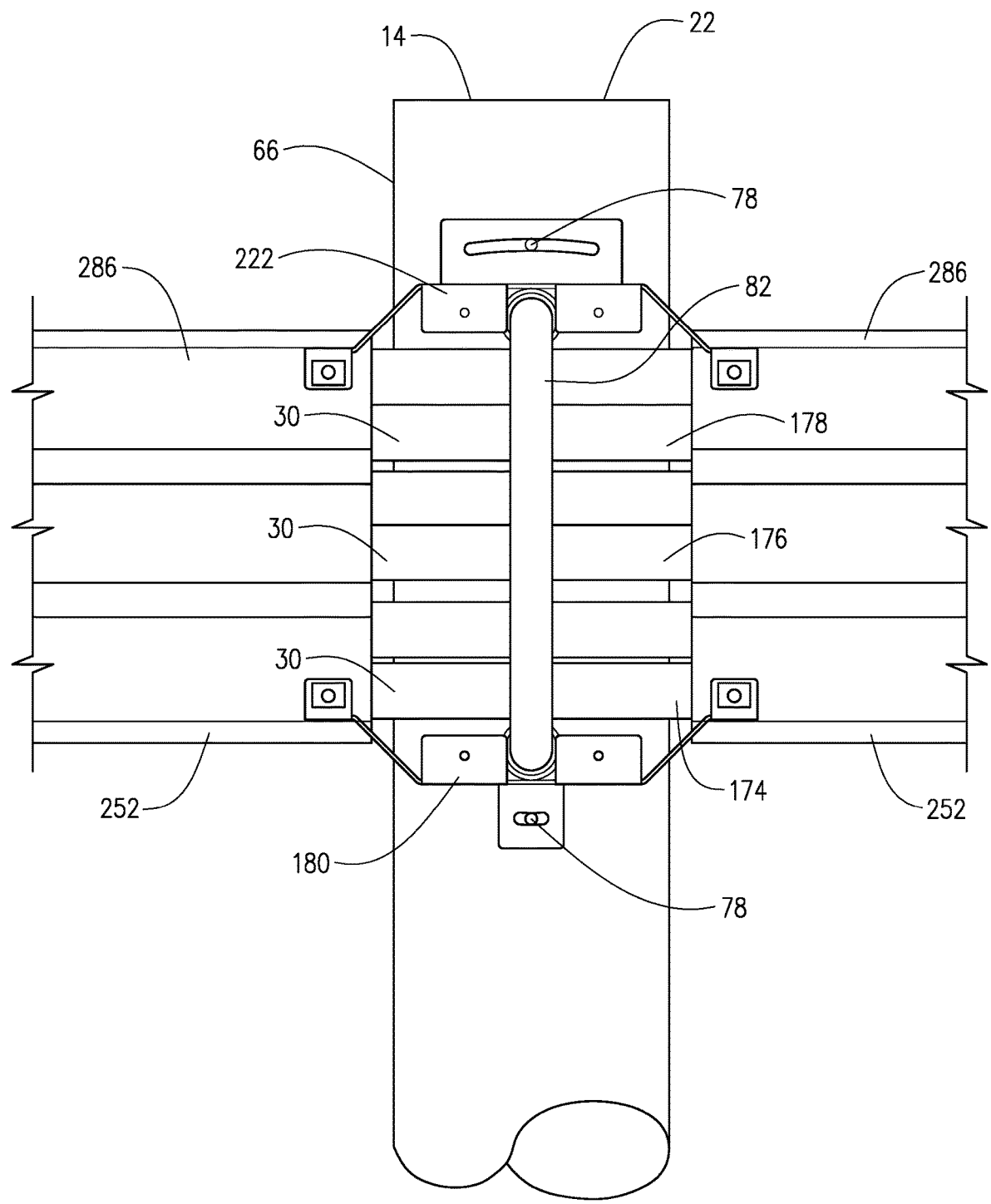

As shown in FIG. 74, a U-bolt 82 is installed on the column 66 of the next adjacent intermediate post 22. The U-bolt 82 is inserted through the aligned front U-bolt openings 76, and positioned in overlying relationship to the three wrapped cables 30. Before entering the lower front U-bolt opening 76, the lower leg of the U-bolt 82 also passes through the aligned tubular member 220 of the lower hanger 180. The threaded ends of the U-bolt 82 emerge from the intermediate post 22 at the rear U-bolt openings. Nuts (not shown) are installed on the threaded ends and tightened against the intermediate post 22 to hold the U-bolt 82 in place.

The installation steps just described are repeated with the third cable 178 and a U-bolt 82 at each successive intermediate post 22 forming the barrier. When the third cable 178 reaches the second end post 20, the same installation steps described with reference to the first end post 18 are performed.

In the next preferred stage of assembly, an upper cable cover 286 is positioned between each adjacent pair of posts 14 that will form the barrier 10. An upper cable cover 282 should not be positioned until each post 14 of the adjacent pair has been wrapped by the second and third cables 176 and 178. After an upper cable cover 286 has been positioned, that portion of the second cable 176 that extends between the adjacent posts 14 should be positioned within its second bay 312. That portion of the third cable 178 that extends between the adjacent posts 14 should be positioned within its third bay 322.

Figure 67:
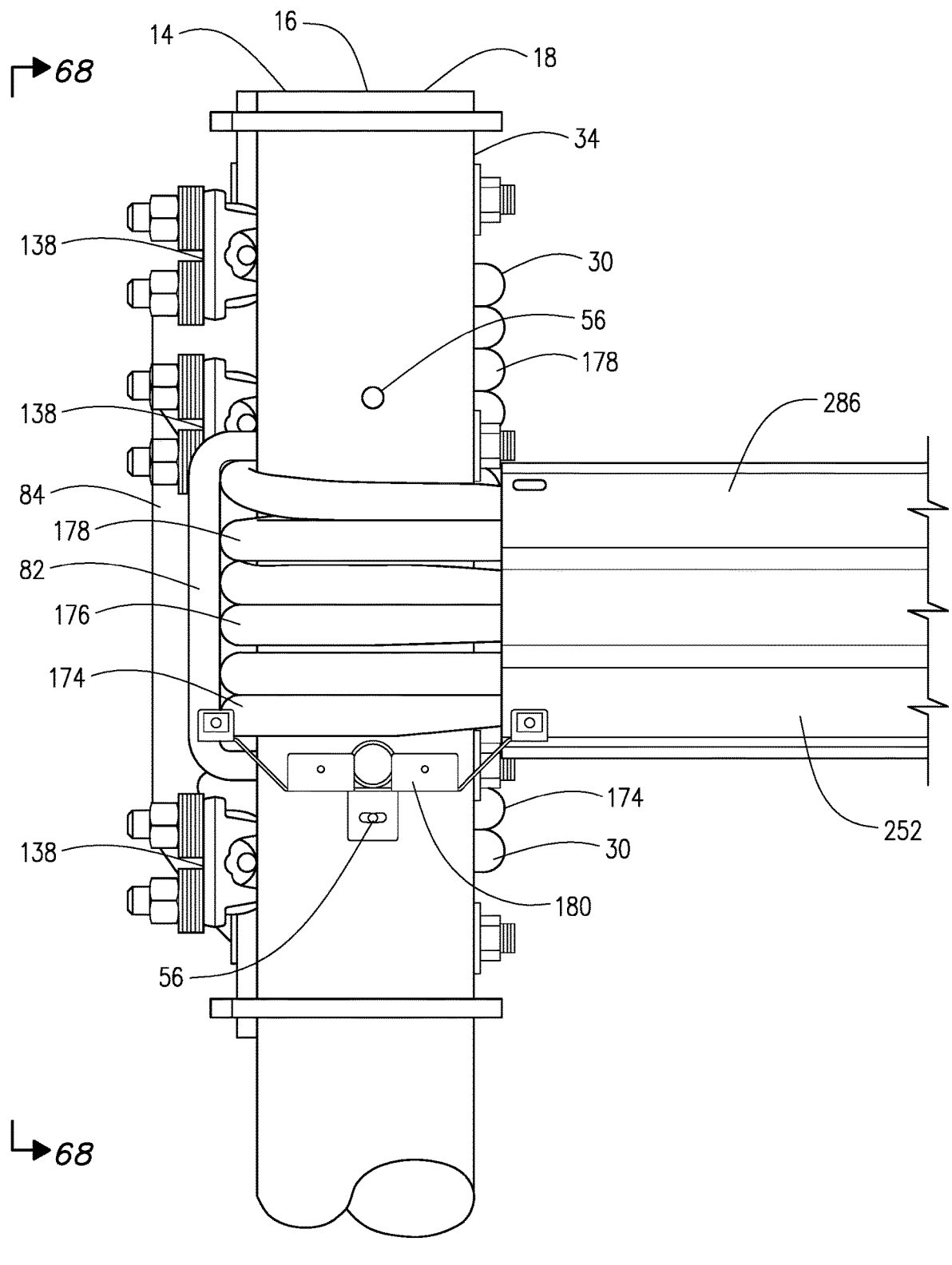

Initially, an upper cable cover 286 is positioned between the first end post 18 and the next adjacent intermediate post 22, as shown in FIGS. 67 and 68. The upper cable cover 286 is stacked atop the previously-installed lower cable cover 252. The second cable 176 is inserted through the elongate 314 and positioned within the second bay 312. The third cable 178 is inserted through the elongate opening 324 and positioned within the third bay 322.

The steps just described are repeated by positioning an upper cable cover 268 between each successive adjacent pair of intermediate posts 22 that will form the barrier 10. The second and third cables 176 and 178 are then positioned within respective bays 312 and 322 of that upper cable cover 286. When the second end post 20 is reached, a final upper cable cover 286 is installed between the second end post 20 and its adjacent intermediate post 22. The second and third cables 176 and 178 are then positioned within respective bays 312 and 322 of the final upper cable cover 286. Installation of the final upper cable cover 286 follows the same steps as the initial upper cable cover 286 installed at the first end post 18.

Next, an upper hanger 222 is installed on each post 14 that will form the barrier 10. The upper hanger 180 should not be installed on a post 14 until after the upper cable cover or covers 286 that will adjoin it have been positioned.

At the first end post 18, an upper hanger 222 is positioned such that its arcuate opening 226 is aligned with the upper standoff 56 on the first column 34, as shown in FIG. 69. One or more fasteners are used to secure the upper hanger 222 to the underlying first end post 18. In one embodiment, each fastener comprises a bolt and lock washer combination. The lock washer is positioned under the bolt head, and the bolt is inserted through the opening 226. The bolt is threaded into the upper standoff 56, such that its head presses the lock washer and upper hanger 222 against the standoff 56.

Because some adjustment of the upper hanger 22 may be required later, the bolt is preferably not tightened at this stage.

The installation steps just described are repeated by installing an upper hanger 222 on each intermediate post 22 that will form the barrier 10. At each intermediate post 22, the upper hanger 222 is positioned such that its arcuate opening 226 is aligned with the upper standoff 78, as shown in FIG. 74. When the second end post 20 is reached, a final upper hanger 222 is installed, using the same steps described with reference to the first end post 18.

Next, a post cover 232 is installed on each post 14 that will form the barrier 10, and each upper hanger 222 is secured to its adjoining upper post covers 286, as well as to its associated post cover 232.

At the first end post 18, the fastener that secures the lower hanger 180 to the lower cable cover 252 is temporarily removed. The lower hanger 180 and cable cover 252 are supported such that the fastener openings 212 and 266 remain aligned. A post cover 232 is positioned over the lower cable cover 252 such that a lowermost fastener opening 250 is aligned with the fastener openings 266 and 212. The removed fastener is then reinserted through the aligned openings 250, 266 and 212. Each of the lowermost fastener openings 248 of the post cover 232 is next aligned with a corresponding fastener opening 218 formed in a mounting tab 216 of the lower hanger 180. A fastener (not shown) is inserted through each pair of aligned openings.

An opening 212 in the upper hanger 222 is aligned with the adjacent fastener opening 298 in the upper cable cover 286. The post cover 232 is positioned over the upper cable cover 286 such that an uppermost fastener opening 250 is aligned with the other two openings. A fastener (not shown) is inserted through the aligned openings.

Each upper fastener openings 248 of the post cover 232 is next aligned with a corresponding fastener opening formed in the mounting tab of the upper hanger 222. A fastener (not shown) is inserted through each pair of aligned openings.

Figure 70:
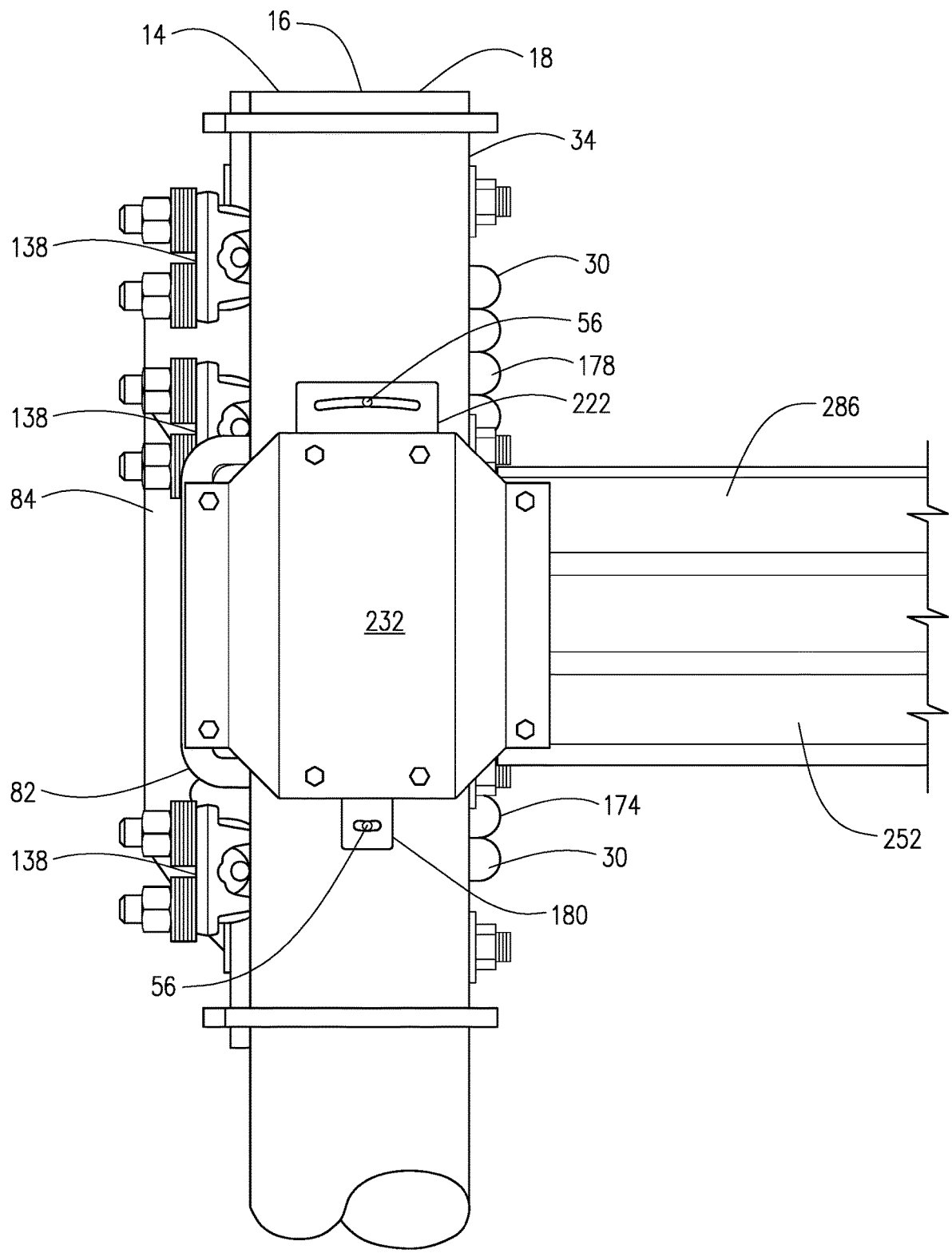

The fasteners used to interconnect the post cover 232, the hangers 180 and 222, and the cable covers 252 and 286 are preferably thread rolling screws. To facilitate positioning adjustments that may be needed to establish the needed alignments, these fasteners should not be tightened until all have been installed. The fastener securing the upper hanger 222 to the underlying first end post 18 should remain loose during these steps for the same reason. Once the hangers 180 and 222 have been attached to the post covers 252 and 286, and once the post cover 232 has been installed, all of the cited fasteners may be tightened. The installed upper cable cover 286 is shown at the first end post 18 in FIG. 70.

Figure 75:
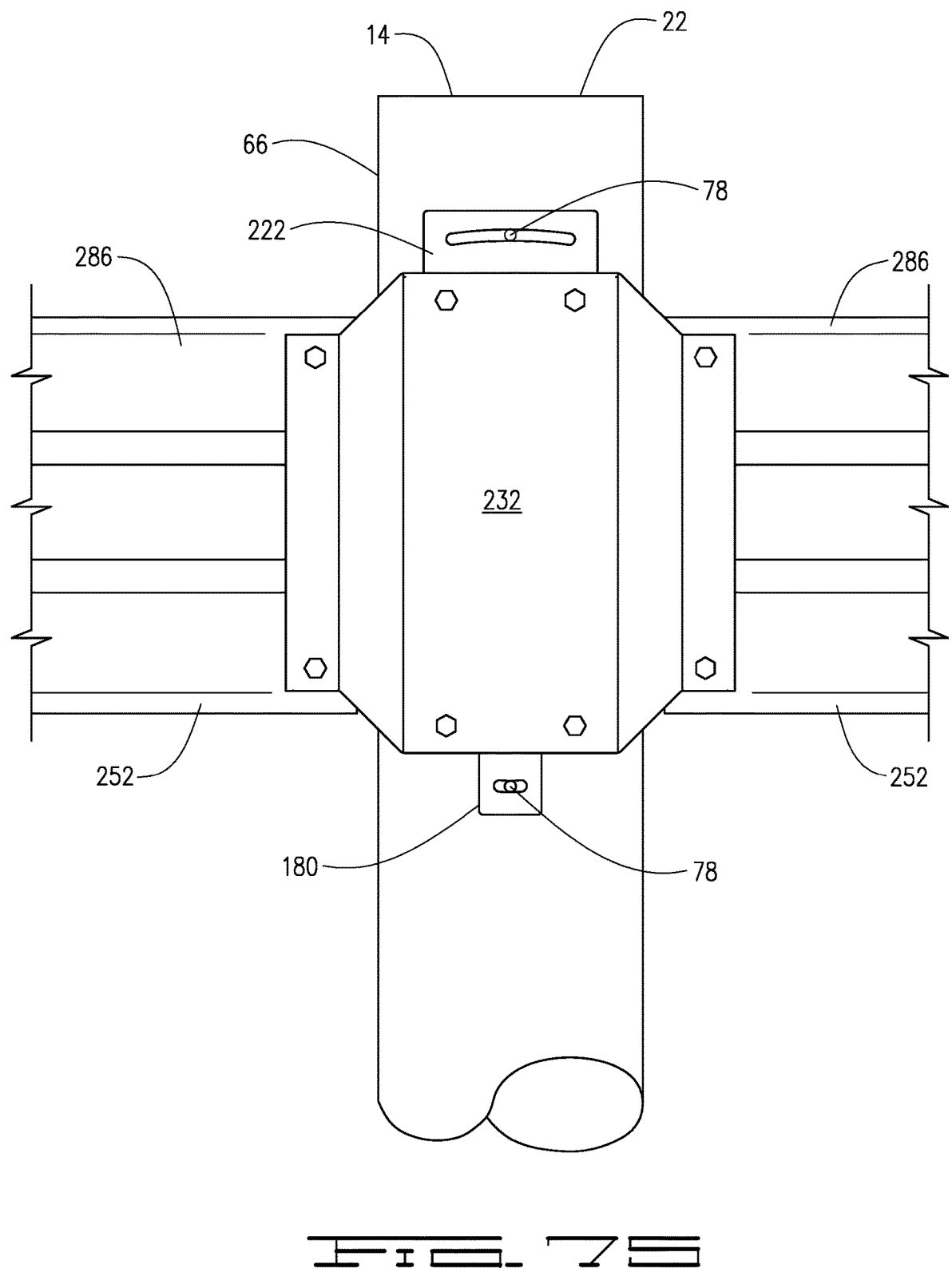

The installation steps just described are repeated with a post cover 232 at each successive intermediate post 22 that will form the barrier 10. The installation steps are identical to those described with reference to the first end post 18, except that the post cover 232 is attached at each side, rather than at a single side, to an adjoining upper cable cover 286. An upper cable cover 286 installed at an intermediate post 22 is shown in FIG. 75.

When the second end post 20 is reached, a final post cover 232 is installed, and the upper hanger 222 is secured to the single upper cable covers 286 that adjoins it. The installation steps at the second end post 20 are identical to those described with reference to the first end post 18.

After assembly as described above, the upper portions of each end post 16 and each intermediate post 22 may be enclosed by a housing 338, as shown in FIGS. 1 and 2. Preferably, each housing 338 is formed from a thermoplastic material.

Figure 79:
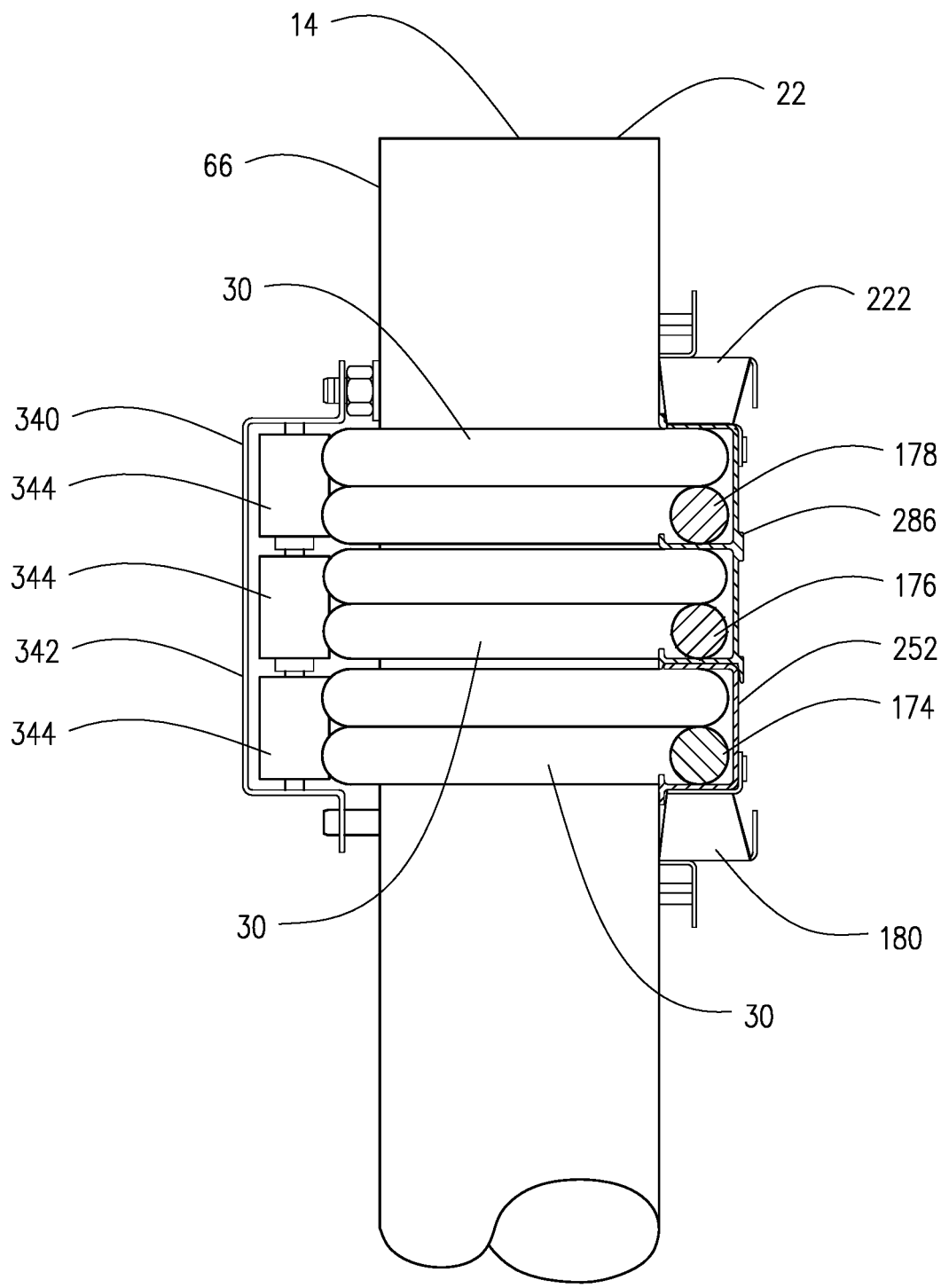

Optionally, a cable tensioner 340, shown in FIGS. 76 and 77, may be used to maintain tension in the cables 30 at an intermediate post 22 during assembly of the barrier 10. The cable tensioner 340 comprises a frame 342 that supports a plurality of rotatable rollers 344. Each roller 344 is preferably mounted eccentrically. The frame 342 has fastener openings 346 that register with the rear U-bolt openings in the intermediate post 22. As shown in FIGS. 78 and 79, the cable tensioner 340 is installed on the projecting legs of the installed U-bolt 82 and held in place by same fasteners that hold the U-bolt 82. The rollers 344 engage the cables 30 and maintain tension therein. The cable tensioner 340 may be removed after assembly steps at an intermediate post 22 are complete.

As the foregoing disclosure illustrates, the barrier 10 includes several sets of identical components. One component from the set is installed by identical steps either at each successive post 14, or between each successive adjacent pair of posts 14. In the case of the cables 30, a single component is installed by identical steps at each successive post 14. In either instance, except as noted, there is no need for any component, or any set of components, to be fully installed before the next stage of assembly begins. As installation of one component type continues at one end of the barrier 10, installation of another component type may begin at the opposite end of the barrier 10.

For example, even before the first cable 174 has been fully extended to the second end post 20, the next stage of assembly may begin at the first end post 18 and its nearby intermediate posts 22. Similarly, even before the last lower cable cover 252 has been installed at the second end post 20, the next stage of assembly may begin at the first end post 18 and its nearby intermediate posts 22.

While the order of assembly steps described here is preferred, other orders of steps may be used as well.

The foregoing description assumes that each intermediate post of the barrier 10 is aligned with both end posts 16. In some instances, however, an intermediate post may be situated at a corner of a barrier, and thus cannot be aligned with both end posts. In that event, an intermediate post formed as a cornering post (not shown) may be used in lieu of an intermediate post 22.

A cornering post is wrapped by each cable in substantially the same way as an intermediate post 22. However, hangers and standoffs may need to be provided in different numbers than are used on an intermediate post 22. In one embodiment, two pairs of standoffs and two pairs of hangers may be installed on a cornering post. Each pair of hangers supports a different pair of cable covers, and each pair of standoffs supports a different pair of hangers. Likewise, the post cover installed a cornering post may have a different shape and size than the post cover 232. In another embodiment, the hangers may have shapes and sizes different from those of the hangers 180 and 222. Installation steps should be changed to accommodate these differences.

In an optional modification of the barrier 10, not shown in the Figures, each end post is formed from multiple columns that may or may not be interconnected by a brace. Each column is situated within the footprint of the same single footing, as in the barrier 10. However, each column is independently embedded at its base within the footing, below terrain level. This structure contrasts with the barrier 10, where only the first column 34 is embedded within the footing 26. In another optional modification, also not shown in the Figures, each cable forms windings that extend around more than one of the columns forming an end post, rather than around only one column.

A first kit may be formed from a plurality of posts 14, including two end posts 16, and a plurality of cables 30. The posts 14 may further comprise at least one intermediate post 22. A second kit may be formed from a plurality of cables 30, a plurality of spikes 160, a plurality of posts 14, including a pair of end posts 16, and a plurality of clamps 84. The second kit may further comprise a plurality of clips 138.

The barrier 10 includes several features that cooperate to increase the resistance of the barrier 10 to penetration by a moving vehicle. Wrapping of each cable 30 around a post 14, such that the cable 30 is conformed to the outer surface of that post 14, produces a capstan-like structure. When the barrier 10 experiences an impact, the force transmitted down the cable 30 is dissipated at each successive intermediate post 22 around which the cable 30 is wrapped. Moreover, the end posts 16 are designed with multiple columns, thereby permitting a greater number of cable windings than would be possible with a single-column end post. Should any vehicular impact not be fully dissipated at the intermediate posts 22, multiple cable windings at the end post can assist in dissipating any residual force from the impact. The clamps 84, clips 138, and spikes 160 help to assure that the cables 30 will be held fast at the end posts 16 should an impact occur.

Unless otherwise stated herein, any of the various parts, elements, steps and procedures that have been described should be regarded as optional, rather than as essential. Changes may be made in the construction, operation and arrangement of these parts, elements, steps and procedures without departing from the spirit and scope of the invention as described in the following claims.

The invention claimed is:

1. A barrier, comprising:
   a post having a projecting standoff supported thereon; and
   a hanger, comprising:
      a body having a rear edge that interconnects opposed side edges;
      a positioning tab projecting from adjacent the rear edge and having an arcuate opening formed therein; and
      a pair of opposed arms extending from the opposed side edges, each arm having a free end that supports a flat cover attachment site;
   the hanger being suspended from the post such that the standoff registers with the arcuate opening.

2. The barrier of claim 1 in which the body is flat and in which each cover attachment site is orthogonal to the body.

3. The barrier of claim 1 in which the body and the positioning tab are flat and arranged in orthogonal relationship.

4. The barrier of claim 1 in which the body has opposed upper and lower sides and in which the positioning tab extends adjacent the upper side and the first and second arms extend adjacent the lower side.

5. The barrier of claim 1 in which the body has opposed upper and lower sides, in which the positioning tab extends adjacent the upper side, and in which a tubular member is supported by the lower side.

6. The barrier of claim 1 in which the opening follows a concave path that opens toward the body.

7. The barrier of claim 1 in which the body, arms and cover attachment sites are formed as a single piece.

8. The barrier of claim 1 in which each arm further comprises:
   a flat terminal section that is bounded in part by that arm's free end, and having an edge;
   and in which each arm's cover attachment site joins and depends from the said edge.

9. The barrier of claim 1 in which the body has a front edge in opposed relationship to its rear edge, and in which each arm's cover attachment site is situated adjacent from the front edge of the body.

10. The barrier of claim 1 in which the body has a front edge in opposed relationship to its rear edge, and further comprising:
    a pair of spaced mounting tabs that join and depend from the front edge of the body.

11. The barrier of claim 10 in which the body has opposed upper and lower sides, the positioning tab extends adjacent the upper side and the mounting tabs join and depend from the lower side.

12. A barrier, comprising:
    a post;
    a lower hanger supported by the post and comprising:
       a body having a rear edge that interconnects opposed side edges;
       a positioning tab projecting from adjacent the rear edge and having an arcuate opening formed therein; and
       a pair of opposed arms extending from the opposed side edges, each arm having a free end that supports a flat cover attachment site;
    an upper hanger supported by the post and comprising:
       a body having a rear edge that interconnects opposed side edges;
       a positioning tab projecting from adjacent the rear edge and having an arcuate opening formed therein; and
       a pair of opposed arms extending from the opposed side edges, each arm having a free end that supports a flat cover attachment site;
    in which the openings of the lower and upper hangers share a common center of curvature.

13. A barrier, comprising:
    a hanger, comprising:
       a body having a rear edge that interconnects opposed side edges;
       a positioning tab projecting from adjacent the rear edge and having an arcuate opening formed therein; and
       a pair of opposed arms extending from the opposed side edges, each arm having a free end that supports a flat cover attachment site; and
    a post from which the hanger is suspended, the post having a projecting standoff supported thereon, the standoff registering with the arcuate opening.

* * * * *